(12) United States Patent
Arnetoli

(10) Patent No.: US 10,645,871 B2
(45) Date of Patent: May 12, 2020

(54) LINE-TYPE GRASS CUTTING HEAD WITH CUTTING BLADE

(71) Applicant: ARNETOLI MOTOR S.R.L., Reggello (IT)

(72) Inventor: Fabrizio Arnetoli, Reggello (IT)

(73) Assignee: ARNETOLI MOTOR S.R.L., Reggello (FI) (IT)

( * ) Notice: Subject to any disclaimer, the term of this patent is extended or adjusted under 35 U.S.C. 154(b) by 39 days.

(21) Appl. No.: 15/538,011

(22) PCT Filed: Dec. 16, 2015

(86) PCT No.: PCT/IB2015/059658
§ 371 (c)(1),
(2) Date: Jun. 20, 2017

(87) PCT Pub. No.: WO2016/103117
PCT Pub. Date: Jun. 30, 2016

(65) Prior Publication Data
US 2017/0339825 A1    Nov. 30, 2017

(30) Foreign Application Priority Data

Dec. 22, 2014 (IT) .................... FI2014A0300

(51) Int. Cl.
*A01D 34/416* (2006.01)
*A01D 34/73* (2006.01)

(52) U.S. Cl.
CPC ..... *A01D 34/4166* (2013.01); *A01D 34/4163* (2013.01); *A01D 34/733* (2013.01)

(58) Field of Classification Search
CPC .............. A01D 34/4166; A01D 34/733; A01D 34/4163
See application file for complete search history.

(56) References Cited

U.S. PATENT DOCUMENTS

| 3,477,214 A | 11/1969 | Rogers |
| 4,124,938 A | 11/1978 | Ballas, Sr. |
| 4,183,138 A * | 1/1980 | Mitchell ............. A01D 34/4163 30/276 |
| 4,189,833 A * | 2/1980 | Kwater ............. A01D 34/4163 30/276 |
| 4,513,563 A | 4/1985 | Roser et al. |
| 4,790,071 A * | 12/1988 | Helmig ............. A01D 34/4166 30/276 |
| 6,298,642 B1 | 10/2001 | Harb |

(Continued)

FOREIGN PATENT DOCUMENTS

| EP | 0 585 720 A1 | 3/1994 |
| EP | 1364571 A2 | 11/2003 |

(Continued)

*Primary Examiner* — Hwei-Siu C Payer
(74) *Attorney, Agent, or Firm* — McGlew and Tuttle, P.C.

(57) ABSTRACT

The grass cutting head (1), configured for rotation around a rotation axis, comprises a housing (3) for a cutting line (F); a space (5) inside the housing for winding a stock of cutting line; at least one hole (3B) in a side wall (3A) of the housing (3), through which the cutting line (F) passes from the inner space (5) towards the outside of the housing; At least one cutting blade (21) with at least one cutting edge (23) is associated with the housing (3) of the grass cutting head (1).

20 Claims, 47 Drawing Sheets

(56) References Cited

U.S. PATENT DOCUMENTS

| | | | | |
|---|---|---|---|---|
| 6,446,345 | B1* | 9/2002 | Tsunoda | A01D 34/4163 30/276 |
| 8,769,831 | B2* | 7/2014 | Duvall | A01D 34/4166 30/122 |
| 8,973,274 | B2* | 3/2015 | Proulx | A01D 34/4166 30/122 |
| 9,078,394 | B2* | 7/2015 | Harless | A01D 34/416 |
| 9,363,946 | B2* | 6/2016 | Pellenc | A01D 34/416 |
| 10,149,433 | B2* | 12/2018 | Wyne | A01D 34/733 |
| 10,225,981 | B2* | 3/2019 | Kitamura | A01D 34/4166 |
| 2002/0189107 | A1* | 12/2002 | Arnetoli | A01D 34/416 30/276 |
| 2009/0100815 | A1* | 4/2009 | Kitamura | A01D 34/4166 56/1 |
| 2010/0132200 | A1 | 6/2010 | Tomita | |
| 2012/0246945 | A1 | 10/2012 | Harless et al. | |
| 2014/0150267 | A1* | 6/2014 | Sowell | A01D 34/4166 30/123 |
| 2015/0359172 | A1* | 12/2015 | Nelson | A01D 34/733 30/276 |
| 2017/0215338 | A1* | 8/2017 | Arnetoli | A01D 34/4166 |
| 2017/0339825 | A1* | 11/2017 | Arnetoli | A01D 34/4166 |
| 2018/0020615 | A1* | 1/2018 | Alliss | A01D 34/4163 30/276 |

FOREIGN PATENT DOCUMENTS

| | | |
|---|---|---|
| EP | 1997364 A1 | 12/2008 |
| FR | 2712136 A1 | 5/1995 |
| GB | 2000672 A | 1/1979 |

* cited by examiner

LINE-TYPE GRASS CUTTING HEAD WITH CUTTING BLADE

FIELD OF THE INVENTION

The embodiments disclosed herein relate to grass cutting heads and especially to line-type grass cutting heads.

BACKGROUND ART

Usually, so-called grass cutting heads are used to cut vegetation, for example grass, hedges or the like; these heads are applied to the drive shaft of a bush cutter actuated by an electric motor, an internal combustion engine or other actuating member, for example a hydraulic or mechanical arm actuated by means of a farm machine such as a tractor or the like. The fast rotation of the grass cutting head drives into rotation cutting members, with which the head is provided and which act on the vegetation, cutting it.

In some prior art heads, cut is performed by means of a so-called cutting line, usually made of plastic, for example polyamide (nylon), and housed in a housing of the cutting head that forms an inner space to stock the cutting line. One or more ends of the line project from the grass cutting head; when the head rotates at high speed around its rotation axis, driven by the bush cutter drive shaft, the ends are tensioned due to the effect of the centrifugal force. Thus, the cutting line, tensioned by the centrifugal force, acts on the vegetation and cuts it.

In some applications, the bush cutter is provided with a cutting blade to cut, for example, hedges, small shrubs or the like.

According to the size and resistance of the vegetation, it is necessary to have available different cutting tools or heads, which can be interchanged on the same bush cutter.

Some grass cutting heads are configured to use alternatively a cutting line or one or more cutting blades. EP-A-1364571 discloses a head of this type, wherein the cutting line is disabled when the cutting blades, pivotally mounted on the grass cutting head, are used. When the blades are disabled, the cutting line can be used. These heads do not allow the two cutting members (line and blades) to be used at the same time.

Some grass cutting heads are configured so as to use simultaneously one or more cutting lines and one or more cutting blades in combination. Some grass cutting heads comprise, in combination, cutting members, such as polyamide lines, and cutting blades, usually pivotally mounted on the grass cutting head. These combined heads often use short segments of cutting line, which are anchored at an end thereof to the grass cutting head and shall be replaced when broken. In some cases, the head is formed by the same blade, provided with anchoring points for the cutting lines. Examples of grass cutting heads of this type are described in US-A-2012/0246945; U.S. Pat. No. 4,513,563; EP-A-1997364; U.S. Pat. No. 6,298,642.

GB-A-2000672 discloses a grass cutting head formed by an overturned cup-shaped body that can be coupled to the drive shaft of a bush cutter and covers a cutting line winding spool. Short rectangular blades are pivotally mounted at the sides of the cup-shaped body; when the grass cutting head is driven into rotation, the blades move in radial direction due to the centrifugal force, and cut the vegetation similarly to the line projecting from the spool. This head is poorly efficient and very unsafe for the user.

US-A-2010/0132200 discloses a grass cutting head comprised of a plate forming a cutting line winding spool. Radial cutting blades are mounted on the plate. Also this grass cutting head is poorly efficient, uncomfortable and unsafe for the user.

FR-A-2712136 discloses a grass cutting head with a housing wherein the cutting line is arranged, projecting from the housing by a certain length. The inside of the housing is not shown, and no line-supplying system, i.e. line winding or unwinding system, is described. Below the housing, at a certain axial distance therefrom, a blade with cutting edges is fastened, to which pivoting auxiliary blades are fixed. The structure of the grass cutting head disclosed in FR-A-2712136 is such that the cutting line is necessarily arranged at a large distance from the ground, due to the blade mounting mechanism, below the cutting line housing, which mechanism increases the axial dimension of the grass cutting head. Moreover, as members are not provided to control the cutting line elongation, in order to replace the cutting line length projecting from the housing the user shall handle the grass cutting head in the area where the cutting blades are arranged, and this makes the use of this grass cutting head unsafe and dangerous.

There is therefore a need for a grass cutting head that completely or at least partially overcomes one or more of the drawbacks of the prior art heads.

SUMMARY OF THE INVENTION

According to embodiments disclosed herein, a line-type grass cutting head is provided, configured for rotation around a rotation axis and comprising a housing for a cutting line, inside which an inner space is provided for housing a spool for winding a stock of cutting line.

"Cutting line" means any linear member, for instance made of plastic, or of metal or other material.

The housing furthermore comprises at least one hole in a side wall thereof, through which the cutting line extends from the inner space towards the outside of the housing. In some embodiments described herein, at least one cutting blade with at least one cutting edge is rigidly fastened to the housing of the grass cutting head. The blade rigidly rotates with the grass cutting head.

A cutting line elongation mechanism is associated with the spool, and may have an actuating button projecting from the housing. Generally, the button may project from the lower part of the head, i.e. from the part projecting towards the ground when the head is in use. The cutting blade may be arranged so as to partially or entirely surround the button and/or the line winding spool arranged inside the housing. The button may project below with respect to the plane where the blade lies. In case the blade annularly extends by 360°, as in some embodiments described below, it may have a central passage, for example a hole, through which either the button of the cutting line elongation mechanism or the spool extends, or both.

This allows to have a grass cutting head comprising two types of cutting members (line and blade), wherein the line may be elongated safely, without the need for the user to touch areas of the head where the blade cutting edges are arranged. Moreover, the blade position with respect to the cutting line housing, and, thus, with respect to the plane where the cutting line lies during the head operation, is better and more efficient with respect to the prior art grass cutting heads.

The housing may be of plastic or synthetic resin, for example nylon or other plastic material, and is preferably molded. In some embodiments, the housing is completely or partly made of a composite material, for example reinforced synthetic resin. The reinforcing material may be glass fiber, carbon fiber, Kevlar or other suitable material. In other embodiments, the housing is made of synthetic or plastic material filled, for instance, with powders or fillers. Moreover, the housing may be made of metal, for example steel or light alloy or other metals, and manufactured by means of injection molding, for instance. In some embodiments, the housing may be made of different materials combined together, for example partly made of plastic and/or composite or filled material and partly made of metal.

The cutting blade may be made of metal, for example steel or aluminum or light alloys. To provide particularly performing embodiments, the cutting blade may have inserts of hard material, for example carbides, applied onto a base of less hard material, such as steel, aluminum or light alloys.

In other embodiments, the cutting blade is made of plastic.

In other embodiments, the blade is made of different materials combined together, for example made partly of plastic and partly of metal.

In some embodiments, the cutting blade extends annularly, entirely surrounding the rotation axis of the grass cutting head. For example, the cutting blade may be disc-shaped, with an edge provided with a smooth or toothed cutting edge, either on the entire extension thereof, or on single portions. The outer edge of the cutting blade is usually round. In other embodiments, the outer edge of the cutting blade is at variable distance from the rotation axis; namely, it has, for example, cutting edge portions extending in a spiral-like way. This allows having a more gradual cutting action.

In some embodiments, the cutting blade has an annular body, fastened to the housing of the grass cutting head and surrounding the rotation axis thereof.

The grass cutting head may have several cutting blades. For example, two cutting blades may be provided. In some embodiments, the two cutting blades are arranged spaced from one another along the rotation axis of the grass cutting head. For example, two approximately disc-shaped blades may be provided, coaxial with, and axially spaced from, each other. In other embodiments, two cutting blades are provided, coplanar with each other and not completely surrounding the rotation axis of the grass cutting head.

In some embodiments, the grass cutting head has a dome-shaped housing, to which a ring is coupled, which can complete the inner space where the line winding spool is arranged. In some embodiments, the cutting blade is mounted between the dome-shaped housing and the ring, for example by means of screws. In other embodiments, the cutting blade is mounted by means of rivets or snap-fit systems; it may be even welded, for example, to metal inserts provided in the housing. In other embodiments, the cutting blade is co-molded with the housing, namely it is inserted in a mold, where the material for injection molding of the housing is then injected.

In some embodiments, the housing has a dome-shaped portion with an annular edge or projection that projects radially. The cutting blade may be mounted between the annular edge or projection and a ring, by means of screws that extend through holes provided in the cutting blade.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated.

There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood by following the description and the accompanying drawing, which shows non-limiting practical embodiments of the invention. More in particular, in the drawing.

DETAILED DESCRIPTION OF EMBODIMENTS

Figure 1:
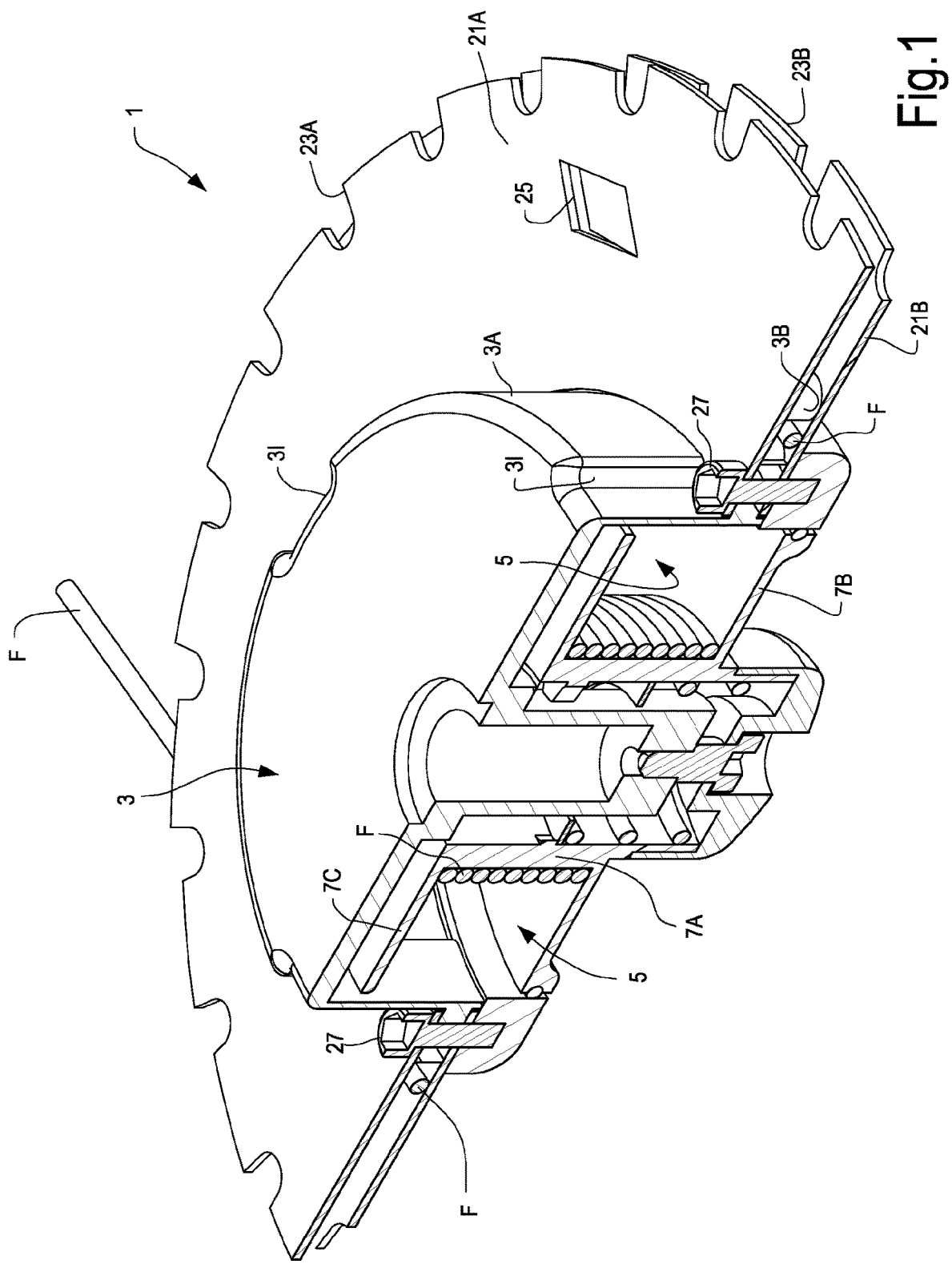
FIG. 1 is an axonometric cross-section of a first embodiment of a grass-cutting head.

The detailed description below of example embodiments is made with reference to the attached drawings. The same reference numbers in different drawings identify the equal or similar elements. Furthermore, the drawings are not necessarily to scale. The detailed description below does not limit the invention. The protective scope of the present invention is defined by the attached claims.

In the description, the reference to "an embodiment" or "the embodiment" or "some embodiments" means that a particular feature, structure or element described with reference to an embodiment is comprised in at least one embodiment of the described object. The sentences "in an embodiment" or "in the embodiment" or "in some embodiments" in the description do not therefore necessarily refer to the same embodiment or embodiments. The particular features, structures or elements can be furthermore combined in any adequate way in one or more embodiments.

In the description below, the terms "upper", "above", "high", "lower", "below", "low", and the like refer to the head in working position, with the rotation axis approximately orthogonal to the ground.

A first embodiment of a grass cutting head is shown in FIGS. 1-4. The grass cutting head, indicated as a whole with number 1, comprises a housing 3 for a cutting line F that can be wound in an inner space 5 of the housing to form a cutting line stock. The housing 3 comprises an upper dome with a side wall 3A, where holes or channels 3B may be provided, through which the cutting line F passes from the inner space 5 towards the outside of the head 1. In some embodiments, the holes or channels 3B are shaped approximately like portions of a spiral, so that the cutting line F exits from the housing 3 according to an approximately tangential direction, instead of a radial direction.

In some embodiments, in the inner space 5 of the housing 3 a spool 7 is arranged, around which the cutting line F is wound. The spool 7 has a body 7A. In some embodiments, the spool 7 also has a first flange 7B and, as the case may be, a second flange 7C. In some embodiments, the body 7A has an axial cavity 7D allowing the spool 7 to be inserted onto a central column 9 integral with the housing 3 of the grass cutting head 1. In some embodiments, the spool 7 slides axially according to the double arrow f7 (see FIGS. 3 and 4) parallel to the rotation axis A-A of the grass cutting head 1, for the purposes described below.

In some embodiments, an elongation mechanism for the cutting line F, known per se, is associated with the spool 7. The elongation mechanism may comprise a compression spring 11, arranged coaxially with the spool 7, for example between a ring 13 integral with the column 9 and a button 7E that is either part of the spool 7 or is associated therewith, and preferably projecting underneath from the housing 3 of the grass cutting head 1.

In some embodiments, the button 7E is fastened to the central column 9 of the grass cutting head 1 by means of a screw member, schematically indicated with 15, or other similar member, in such a way to allow the spool 7 to move axially according to f7 with respect to the housing 3.

As it is known, the spool 7 may be provided with teeth (not shown in detail) co-acting with respective teeth of the housing 3 of the grass cutting head 1 to allow the gradual and stepped elongation of the cutting line F by means of the alternate sliding of the spool 7 according to the double arrow f7, wherein this movement is provided by pushing the button 7E, for example by pressing, in use, the grass cutting head 1 against the ground.

As it will be better described with reference to further embodiments, the line may be also elongated manually; in this case, the elongation mechanism described above is not provided.

In some embodiments, the housing 3 is closed at the bottom by the flange 7B of the spool 7. A gasket 17 may be provided between the inner wall of the housing 3 and the perimeter edge of the flange 7B. In other embodiments, the housing 3 is closed by a lid, separate with respect to the spool 7.

In the embodiment illustrated in FIGS. 1-4, the grass cutting head 1 also comprises a blade cutting system, in addition to the line cutting system. In the illustrated embodiment, the grass cutting head 1 comprises a first cutting blade 21A and a second cutting blade 21B. Advantageously, the cutting blades 21A and 21B are approximately disc-shaped. Advantageously, the two cutting blades 21A, 21B are coaxial with each other and spaced from each other along the rotation axis A-A of the grass cutting head 1. In some embodiments, the cutting blades 21A, 21B are arranged in such a position with respect to the housing 3 that the exit holes 3B for the cutting line F are positioned between the two cutting blades 21A, 21B. In this way, the cutting line F may exit the grass cutting head 1 between the two cutting blades 21A, 21B, as schematically shown in FIG. 1.

In some embodiments, as shown in particular in FIG. 1, the cutting blades 21A, 21B have a round cutting edge 23A, 23B. In the embodiment illustrated in FIGS. 1-4, the cutting edge of the two cutting blades 21A, 21B is toothed. In other embodiments, the cutting edge may be smooth, or have differently shaped teeth. In the illustrated embodiment the teeth are asymmetric, but in other embodiments they may be symmetric, for example shaped like a trapezoid or an isosceles triangle.

In the embodiment illustrated in the figures, the teeth extend uniformly along the whole round perimeter of the cutting blades 21A, 21B. In other embodiments, different teeth or different cutting edges may be provided; for example, a variable radius pattern may be provided and/or a non-uniform distribution of teeth or cutting edges, for instance teeth or cutting edges subdivided into sectors, interrupted by means of non-cutting portions of the blades 21A, 21B.

The cutting blades 21A, 21B may be made of metal, either a ferrous metal such as steel, or a non-ferrous one. In some embodiments, the cutting blades are made of synthetic material, for example plastic, or of composite material, for example synthetic resin (plastic) filled or reinforced for instance with powders such as ceramic, metal, or glass powders, or glass fibers, carbon fibers or powders, Kevlar fibers or other fillers suitable to increase the mechanical strength of the cutting blade. In some embodiments, the cutting blades may have small plates or other elements or inserts, for example welded, made of carbides or other hard metals.

The above mentioned materials may be also used for the cutting blades described with reference to the embodiments illustrated below.

The housing 3 of the cutting head may be made of metal, for instance a light metal, such as steel or an alloy thereof. In other embodiments, the housing 3 of the grass cutting head 1 is made of molded plastic. The spool 7 is preferably made of molded plastic.

The cutting blades 21A, 21B may be used to cut shrubs or other vegetation having wood parts that cannot be cut using the cutting line F.

In some embodiments, in order to prevent the cutting line F from being damaged due to the chips generated by the cutting blades 21A, 21B, one or more chip breakers are arranged between the two cutting blades 21A, 21B. In the illustrated embodiment, see in particular FIG. 2, two chip breakers 25 are provided. These chip breakers may be constituted by tabs formed by the same metal sheet forming the cutting blades 21A, 21B, folded towards the inside of the annular space delimited by the two cutting blades 21A, 21B arranged over each other.

In some embodiments, the cutting blades 21A, 21B are mounted on the housing 3 of the grass cutting head by means of screws 27. In some embodiments, the housing 3 comprises an annular collar or projection 3R, radially projecting towards the outside of the side wall 3A of the housing 3. The two cutting blades 21A, 21B may be applied to the two sides of the annular projection 3R, i.e. to the two faces thereof orthogonal to the rotation axis A-A of the grass cutting head 1. The annular projection 3R may have through holes for screws 27 suitable to fasten the cutting blades 21A, 21B onto the housing 3 of the grass cutting head 1. In some embodiments, the blades are fastened by means of a ring 29 with threaded holes 29A engaged by the screws 27. The ring 29 is applied against the lower cutting blade 21B, that is thus locked between the annular projection 3R and the ring 29 by tightening the screws 27. In other embodiments, the lower blade is locked by means of nuts arranged below the annular projection 3R, whereas the cutting blade 21A is locked by the head of the screws 27 and by the annular projection 3R.

In case a ring 29 is provided, it may form, together with the annular projection 3R, the exit channels 3B for the cutting line F. In case these channels are shaped like a spiral portion, also the annular projection 3R may have a radially outer edge shaped like a spiral, i.e. with a gradually increasing diameter. In case two or more holes or channel 3B are provided (like in the example illustrated in the drawing), the annular projection 3R may have two or more spiral-shaped portions, one in correspondence of each exit channel or hole 3B for the cutting line F.

Figure 2:
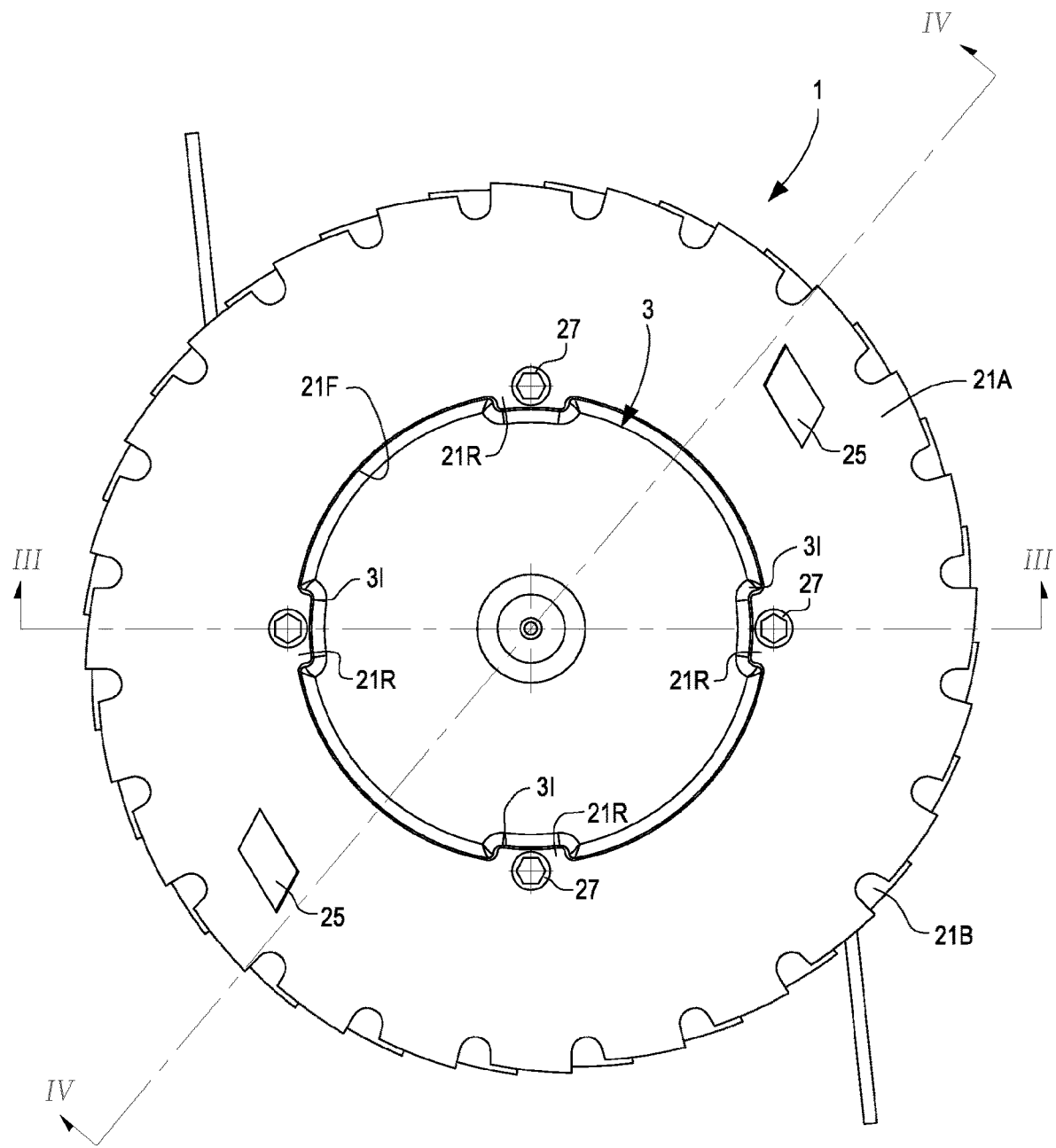
FIG. 2 is a plan view according to II-II of FIGS. 3 and 4 of the head of FIG. 1.
Figure 3:
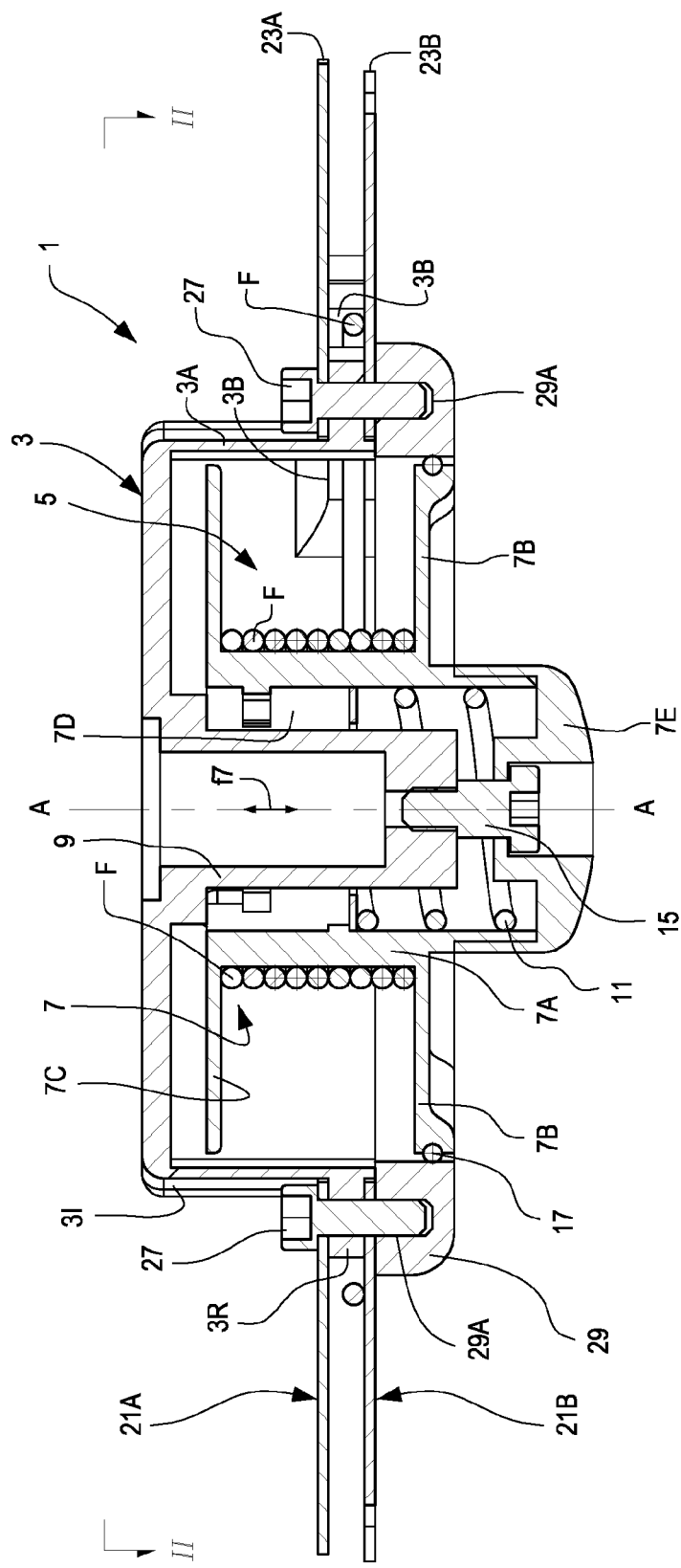
FIGS. 3 and 4 are cross-sections according to and IV-IV of FIG. 2.
Figure 4:
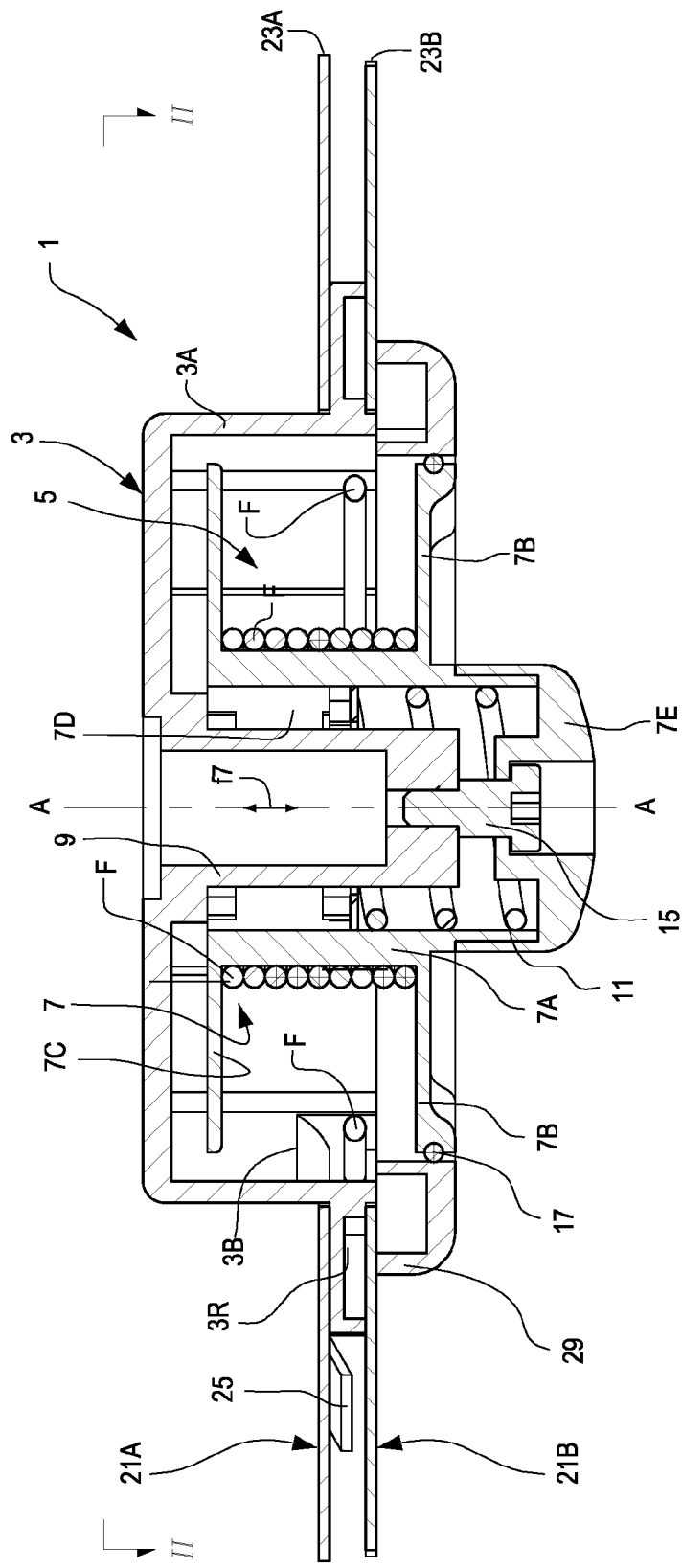

Each cutting blade 21A, 21B may suitably be provided with an annular body with a central hole, see in particular the plan view of FIG. 2. The hole is shown at 21F and is sized so as to allow the cutting blades 21A, 21B to be inserted outside and around the body of the housing 3.

In some embodiments, the housing 3 comprises recesses 31 extending substantially parallel to the rotation axis A-A of the grass cutting head 1 and advantageously arranged in correspondence of the screws 27. The cutting blades 21A, 21B may have inner radial projections 21R projecting from a round edge defining the hole 21F. In this way, a splined torsional coupling is provided between the cutting blades 21A, 21B and the housing 3 of the grass cutting head 1, and this coupling allows a better torque transmission between the housing 3 and the cutting blades 21A, 21B.

The housing may be fastened to the end of a shaft of a bush cutter or other mover, for example a mechanical or hydraulic arm, transmitting the rotation to the grass cutting head.

The conformation of the housing 3 and the disc-shaped cutting blades 21A, 21B, with the central hole 21F engaging the housing 3 of the grass cutting head 1, allows a very safe construction of the grass cutting head 1. In fact, even in case the screws 27 accidentally break, the cutting blades 21A, 21B are not moved away from the rotation axis A-A of the grass cutting head 1 due to the centrifugal force; namely, they remain fastened to the housing 3 and the column 9 of the grass cutting head 1.

FIGS. 5-9 show a further embodiment of a grass cutting head, indicated as a whole with number 101 and comprising a housing 103 with a dome-shaped portion having a side wall 103A.

A space 105 is provided inside the housing 103 to wind a stock of cutting line F. The cutting line is wound, for example, around a spool 107 that has a central body 107A, a first flange 107B and a second flange 107C, as the case may be. The body 107A of the spool 107 is inserted onto a column 109 provided inside the housing 103 and integral therewith. A compression spring is also provided, for example a helical spring 111, to resiliently bias the spool 107 with respect to the housing 103. The spool 107 is provided with upper teeth 107D and lower teeth 107E, co-acting with corresponding abutments provided in, or integral with, the housing 103, thus forming an elongation mechanism for the cutting line F, known in se.

A button 108, applied below the housing 103 of the grass cutting head 1 and axially sliding with respect thereto, is configured to act onto the spool 107, so as to control an alternate movement thereof according to the double arrow f107 parallel to the rotation axis A-A of the grass cutting head 101, to control the cutting line elongation movement.

Exit holes 103B are provided in the side wall 103A of the housing 103 for the ends of the cutting line F wound around the spool 107. These holes 103B may extend inside an annular projection 103R of the housing 103. In some embodiments, as shown in particular in the plan view of FIG. 6, the annular projection 103R actually has a pattern shaped like spiral portions, so that portions of cutting line F passing through the holes 103B of the housing 103 exits from the housing according to an approximately tangential direction.

Figure 8:
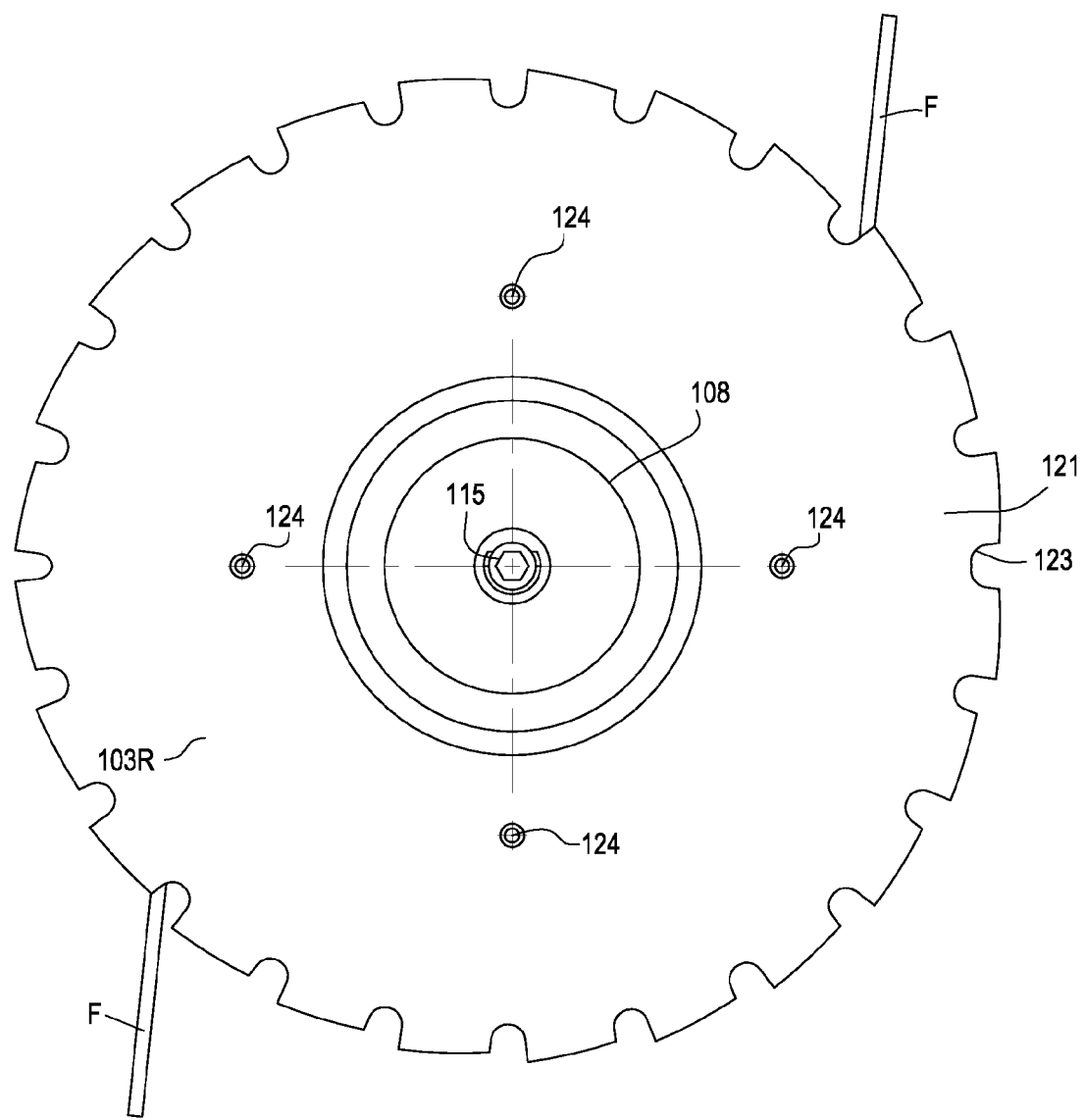
FIG. 8 is a view from the bottom according to VIII-VIII of FIG. 7.

Moreover, the grass cutting head 1 comprises a cutting blade 121 that can be advantageously disc-shaped, as shown in particular in the plan view of FIG. 8. In the illustrated embodiment, the cutting blade 121 has a toothed cutting edge 123. In other embodiments, different configurations of the cutting edge are possible, for instance a smooth cutting edge or a cutting edge with triangular teeth.

In the embodiment illustrated in the figures, the teeth extend uniformly along the whole round perimeter of the cutting blades 121A, 121B. In other embodiments, different teeth or different cutting edges may be provided; for example, a variable radius pattern may be provided and/or a non-uniform distribution of teeth or cutting edges, for instance teeth or cutting edges subdivided into sectors, interrupted by means of non-cutting portions of the blades 121A, 121B.

In the illustrated embodiment, the cutting blade 121 is fixed to the housing 103 of the grass cutting head 101 by means of screws 127. The screws 127 pass through holes parallel to the rotation axis A-A of the grass cutting head 101 and provided in the annular edge 103R, and engage threaded holes 124 provided in the cutting blade 121 (FIG. 8), or nuts (not shown) applied on the lower face of the cutting blade 121. Moreover, in some embodiments the disc-shaped cutting blade 121 has, in addition to the holes 124, a central hole 126, shown in particular in FIG. 9. When mounted, as shown in particular in FIG. 5, an end 109A of the central column 109 integral with the housing 103 is inserted in the hole 126 of the cutting blade 121. A screw member or insert 115 may be fastened at the end 109A. This member or insert keeps the button 108 fastened to the column 109 and, therefore, to the housing 103 of the head 101.

In some embodiments, the cutting blade 121 also comprises a series of through holes 128 (see FIG. 9), co-acting with the teeth 107E provided on the lower face of the flange 107B of the spool 107. The compression spring 111 biases the spool 107 in the axial position where the teeth 107E enter the holes 128 of the cutting blade 121. In this way, the spool 107 rotates integrally with the housing 103 and the blade 121 of the grass cutting head 103. By pushing the button 108 co-acting with the spool 107, the spool moves away from the cutting blade 121 against the elastic force of the compression spring 111, until the teeth 107E exit from the holes 128 of the cutting blade 121, thus releasing the spool 107 with respect to the housing 103. If this occurs while the grass cutting head 1 rotates, the centrifugal force causes the rotation of the spool 107 with respect to the housing 103. This rotation is angularly limited thanks to the cooperation between the upper teeth 107D of the spool 107 and upper abutments (not shown) integral with the housing 103 and offset with respect to the holes 128. In this way, every time the spool 107 makes an axial stroke according to the double arrow f107 with respect to the housing 103, the spool 107 rotates angularly, with respect to the housing 103, by an angle equal to the offset angle between the abutments of the housing 103 and the holes 128. This causes a gradual unwinding of the cutting line F, which exits gradually from the housing 103 of the grass cutting head 101. It is thus possible to replace the length of worn or broken portions of cutting line F projecting from the cutting head 101.

Figure 5:
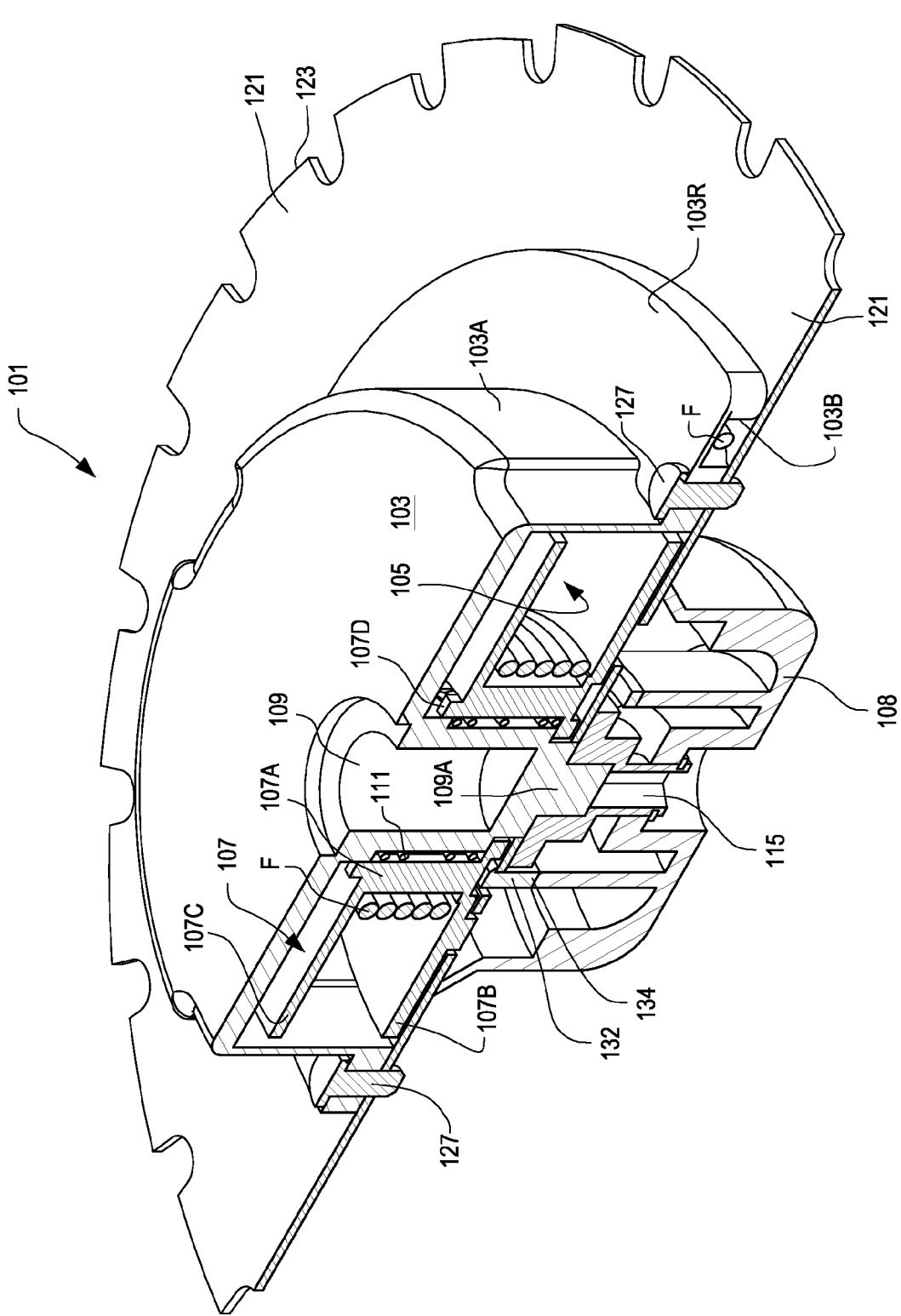
FIG. 5 is an axonometric cross-section of a further embodiment of a grass-cutting head.
Figure 6:
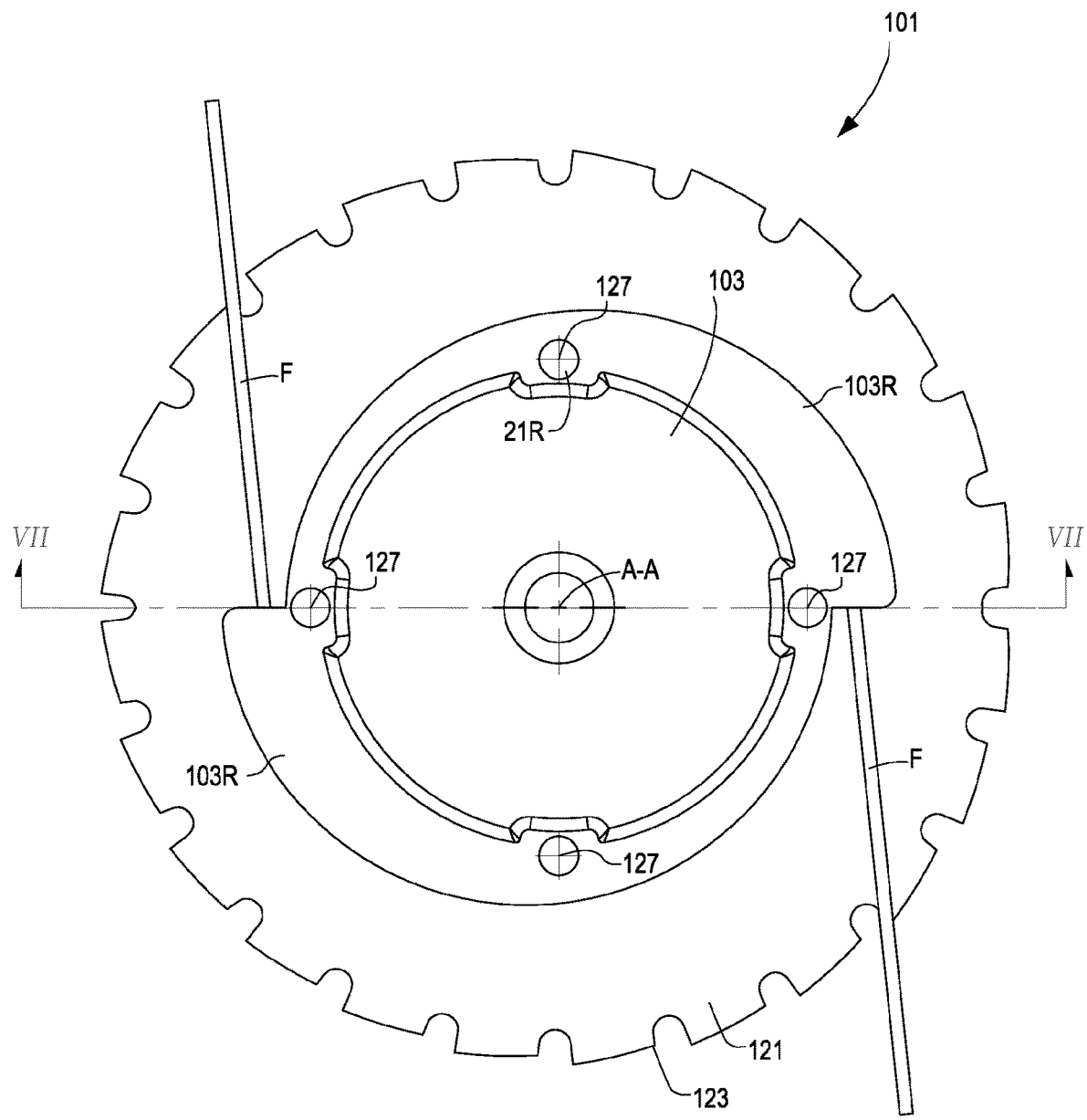
FIG. 6 is a plan view of the head of FIG. 5.
Figure 7:
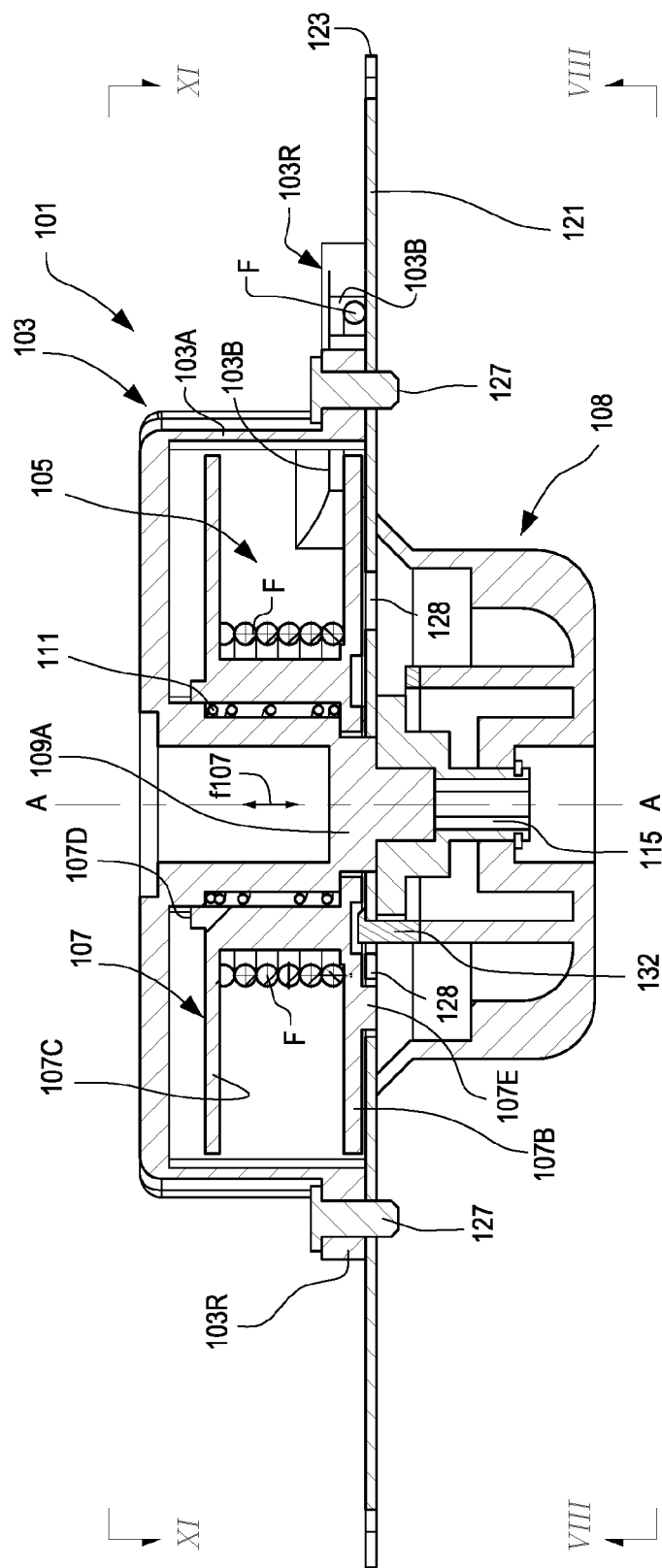
FIG. 7 is a cross-section according to VII-VII of FIG. 6.
Figure 9:
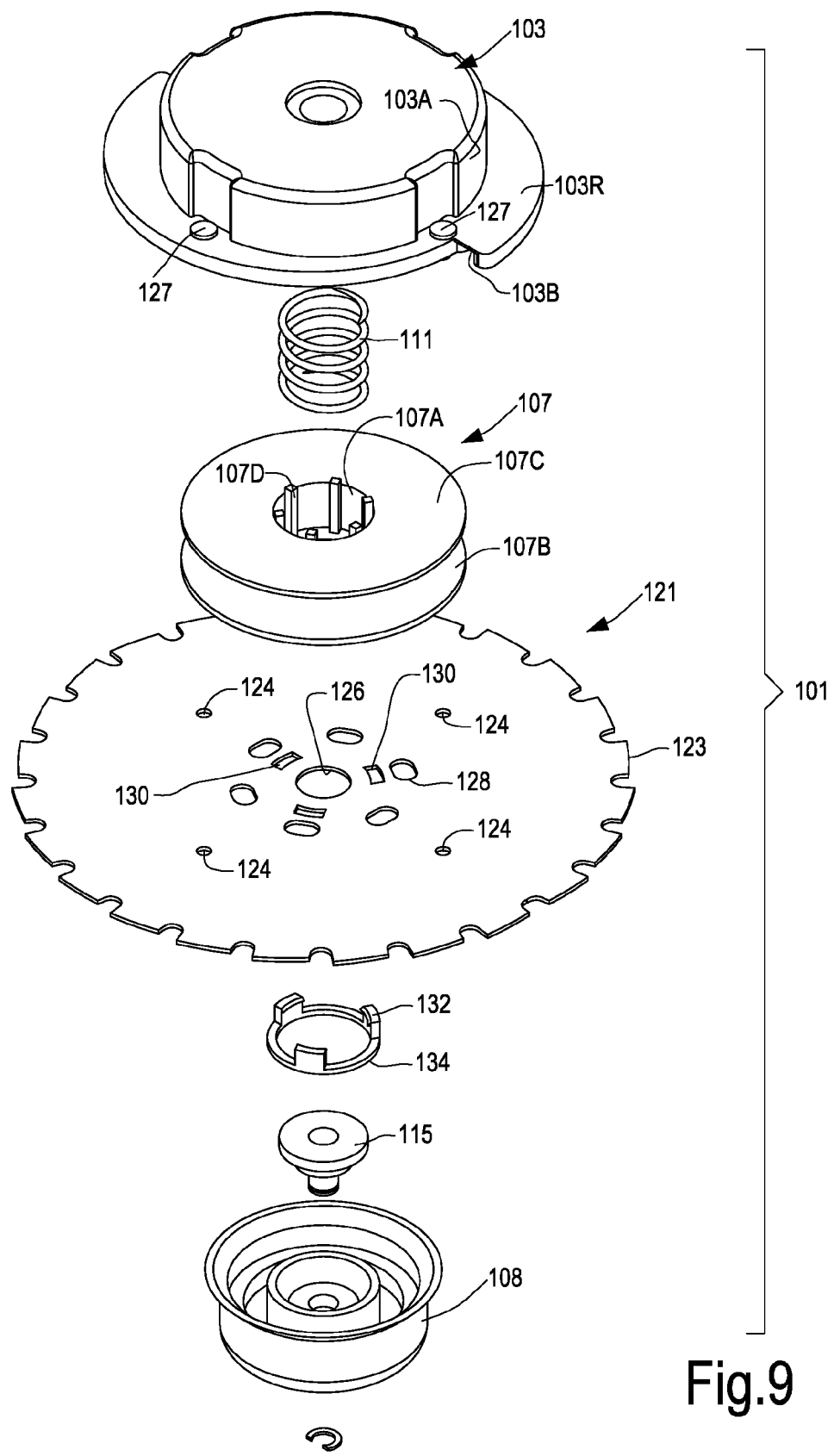
FIG. 9 is an exploded axonometric view of the grass cutting head of FIGS. 5-8.
Figure 10:
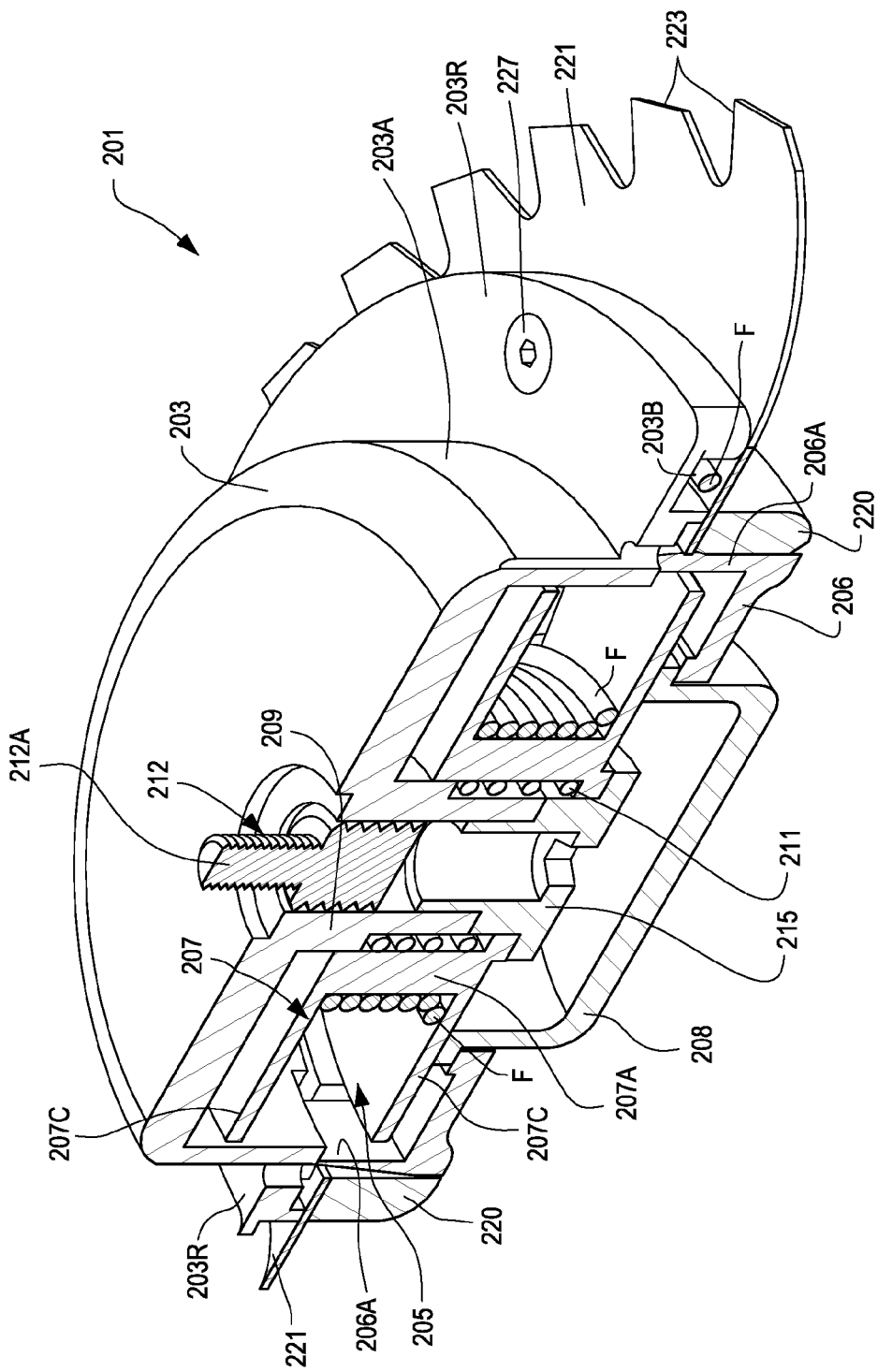
FIG. 10 is an axonometric cross-section of a further embodiment of a grass-cutting head.

In the illustrated embodiment, in addition to the central hole 126, the threaded holes 124 and the holes 128 for the teeth 107E of the spool 107, the cutting blade 121 also has further holes or openings 130 (see in particular FIGS. 5, 7, and 9). Through the further holes 130 appendices 132 pass of a ring 134 arranged between the button 108 and the spool 107. The appendices 132, passing through the holes 130, co-act with the lower face of the spool 107, pushing it upwards against the force of the compression spring 111 when the button 108 is pushed from the outside. Movement of the button 108 can be allowed by deflection of an elastic lip, shown in the drawing, applied to the button 108, or forming an integral part thereof, that rests onto and presses the cutting blade 121, also acting as a barrier against debris.

FIGS. 10-14 show a further embodiment of a grass cutting head 201. The grass cutting head 201 comprises a dome-shaped housing 203, with a side wall 203A, through which holes 203B extend for the passage of a cutting line F, a stock whereof is formed in the inner space 205 of the housing 203.

As in the previous embodiments, the holes 203B are shaped like spiral channels, so that the ends of the cutting line F may project from the grass cutting head 201 according to an approximately tangential direction. In other embodiments, the holes 203B may be radial.

In this embodiment, like in the embodiments described above, the number of holes may be different than two; for example, only one hole may be provided. The holes are preferably two and, in some cases, more than two, for a better dynamic balance of the grass cutting head. In this case, two or more cutting lines may be wound around the spool arranged in the grass cutting head, and each line may project from the grass cutting head with one or both ends. In some embodiments, the spool is provided with one or more intermediate flanges, in order to separate from one another the cutting lines wound on the spool.

In the embodiment illustrated in FIGS. 10-14, the cutting line F is wound around a spool 207 that has a lower flange 207B and an upper flange 207C radially projecting with respect to a central body 207A. The central body 207A has a through hole so as to be inserted onto a column 209 that may be integral with the housing 203, for example made in a single piece therewith.

A compression spring 211 is arranged between an abutment provided on the column 209 and an abutment provided on the spool 207. The compression spring resiliently pushes the spool 207 downwardly towards a rest position, where the spool rests against an insert 215 that can be screwed in the central column 209.

FIGS. 10-14 also show a threaded shaft 212; at one side, the shaft engages a hole of the central column 209 and, at the other side, projects with a threaded portion 212A configured to engage a corresponding threaded hole of a drive shaft (not shown). The coupling between the threaded shaft 212 and the grass cutting head 201 allows to transmit the torque of the drive shaft engaged by the shaft 201 to the grass cutting head 201.

In other embodiments, the shaft 201 has a threaded hole instead of a male threaded portion 212A, so as to allow the coupling to a drive shaft having an end, which is male threaded, instead of female threaded.

A similar threaded shaft (with male or female thread) may be provided in the previously described embodiments.

Instead of a screw coupling, a, bayonet coupling may be provided, or any other coupling system suitable to transmit motion and torque.

The flanges 207C and 207B of the spool 207 are provided with teeth 207D and 207E projecting at the top and at the bottom, in a direction parallel to the rotation axis A-A of the grass cutting head 201. The teeth 207D and 207E may co-act with abutments integral with the housing 203; the reference number 204 (FIG. 14) indicates the lower abutments co-acting with the teeth 207E. The upper abutments co-acting with the teeth 207D are not shown in the drawing.

The assembly of the teeth 207D, 207E, the corresponding upper and lower abutments, offset with respect to one another, and the compression spring 211, forms a line elongation device known in se, and therefore not described in detail.

A button 208, projecting at the bottom from the grass cutting head 201, is fastened to the latter so as to co-act with the spool lower flange 207B. By pushing the button 208 from the outside, it is possible to push the spool 207 upwards against the force of the compression spring 211, moving the spool according to the double arrow f207 and thus causing the elongation of the cutting line F, as already described with reference to the previous embodiments.

The housing 203 may be closed by means of a lower annular lid 206 having a central hole 206F, through which the button 208 projects.

The annular lid 206 (see in particular FIG. 14) may have coupling or constraining members for the coupling to the housing 203. In the illustrated embodiment, the coupling members of the annular lid 206 are constituted by elastic appendices 206A. In other embodiments, the annular lid 206 may be fixed to the housing 203 in a different way, for example by means of screws, a bayonet-like coupling, or other coupling mechanism.

In addition to the side wall 203A, the housing 203 also comprises a ring 220 that forms the lower part of the same housing 203 and is fixed, by means of screws 227, to the remaining part of the housing 203, below a shaped annular projection 203R. The function of the screws 227 is to fasten the upper part of the housing 203 and the ring 220 together. A cutting blade 221 is interposed and locked between the housing 203 and the ring 220. In this way, the cutting blade is clamped to the grass cutting head 201 by means of the screws 227.

The elastic appendices 206A of the annular lid 206 engage cavities 210 provided by the coupling between the housing 203 and the lower ring 220.

Figure 11:
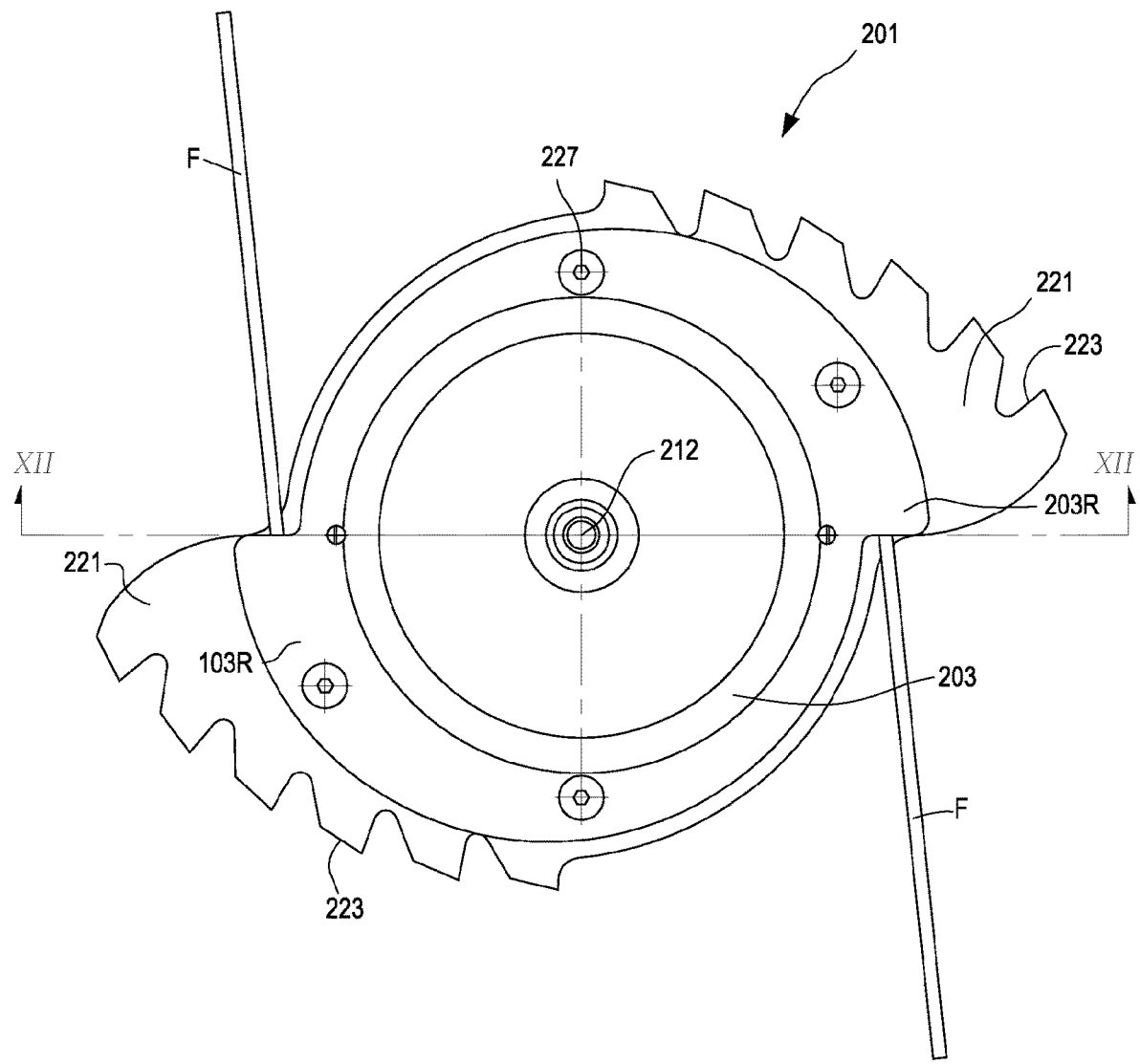
FIG. 11 is a plan view according to XI-XI of FIG. 12.
Figure 12:
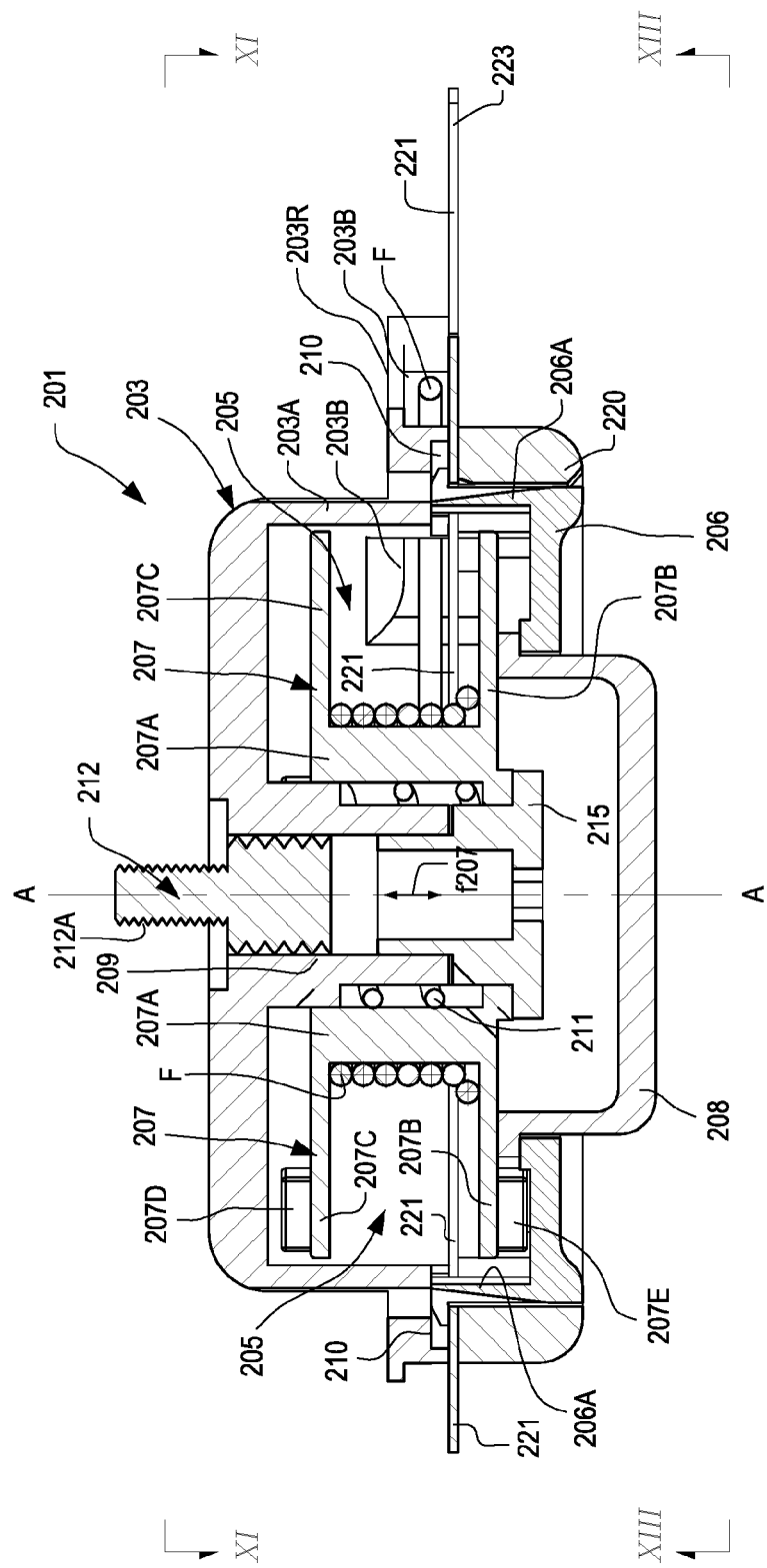
FIG. 12 is a section according to XII-XII of FIG. 11.
Figure 13:
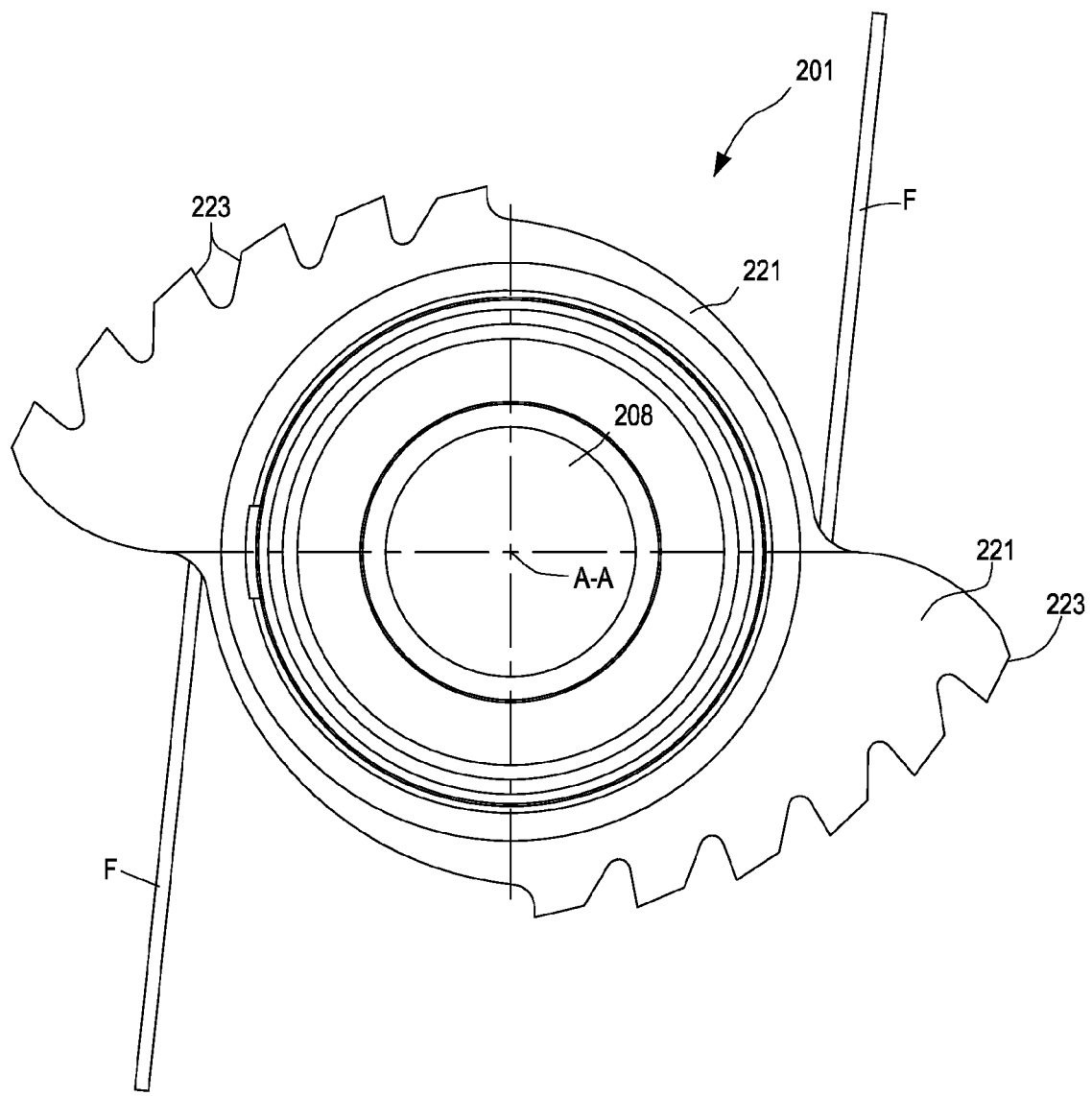
FIG. 13 is a view from the bottom according to XIII-XIII of FIG. 12.
Figure 14:
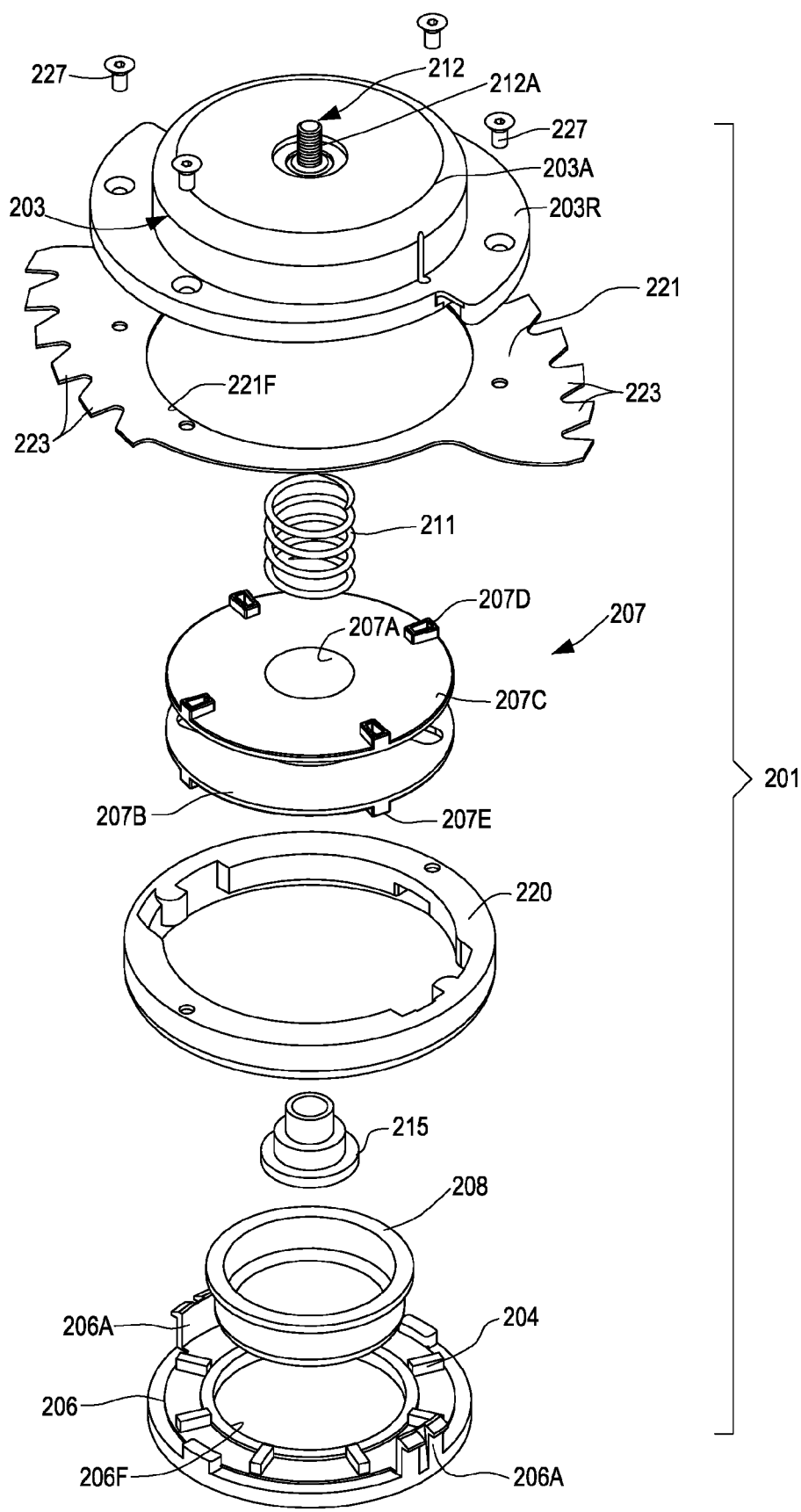
FIG. 14 is an axonometric exploded view of the grass cutting head of FIGS. 10-13.

The cutting blade 221 has toothed sectors with respective cutting edges 223, as shown in particular in FIGS. 11 and 14. In other embodiments, the cutting blade 221 may have a cutting edge extending like a circle around the whole cutting blade 221.

In the illustrated embodiment, the toothed sectors with the cutting edge 223 of the cutting blade 221 are arranged in correspondence of the portions of the annular projection 203R of the housing 203 that project radially farthest; the sectors have a pattern with gradually increasing radius, following the spiral pattern of portions of the annular projection 203R of the housing 203. In these portions of the annular projection 203R, the holes or channels 203B are provided to guide the exit of the cutting line F.

Similarly to the cutting blades 21A, 21B and 121 illustrated in the embodiments described above, also the cutting blade 221 has an annular body. The annular body of the cutting blade 221 has a central hole 221F that, when mounted, allows the passage of the spool 207 and of the elastic appendices 206A of the annular lid 206 closing the housing 203 at the bottom.

In this embodiment, similarly to the previously described embodiments, the cutting blade 221 is fixed to the grass cutting head 201 by means of screws 227. In case these screws break, this does not represent a risk for the user, as the cutting blade 221 has an annular body entirely surrounding the rotation axis A-A of the head 201 as well as the central column 209 and the insert 215 completing it. In case of breakage of components of the grass cutting head 201, the blade 221 is thus prevented from being radially projected due to the centrifugal force.

Figure 15:
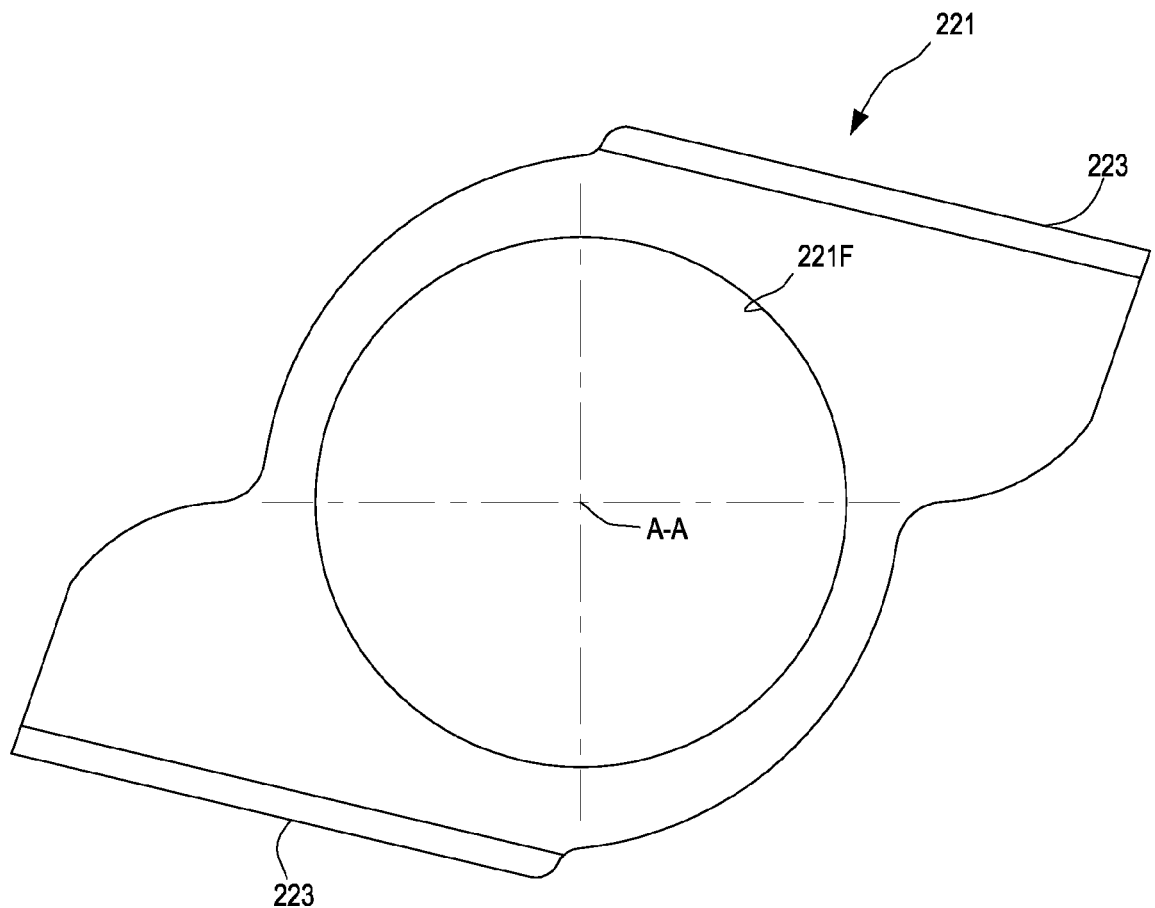
FIG. 15 is a plan view of an alternative cutting blade for the grass cutting head of FIGS. 10-14.

FIG. 15 shows a cutting blade 221 that can be used in the grass cutting head described with reference to FIGS. 10-14, with a differently shaped cutting edge 223. In this case again, the blade 221 has a cutting edge subdivided into two sectors; however, they are not provided with cutting teeth but with substantially rectilinear cutting edges. Reference 221F indicates again the central hole of the annular body of the cutting blade 221.

Figure 16:
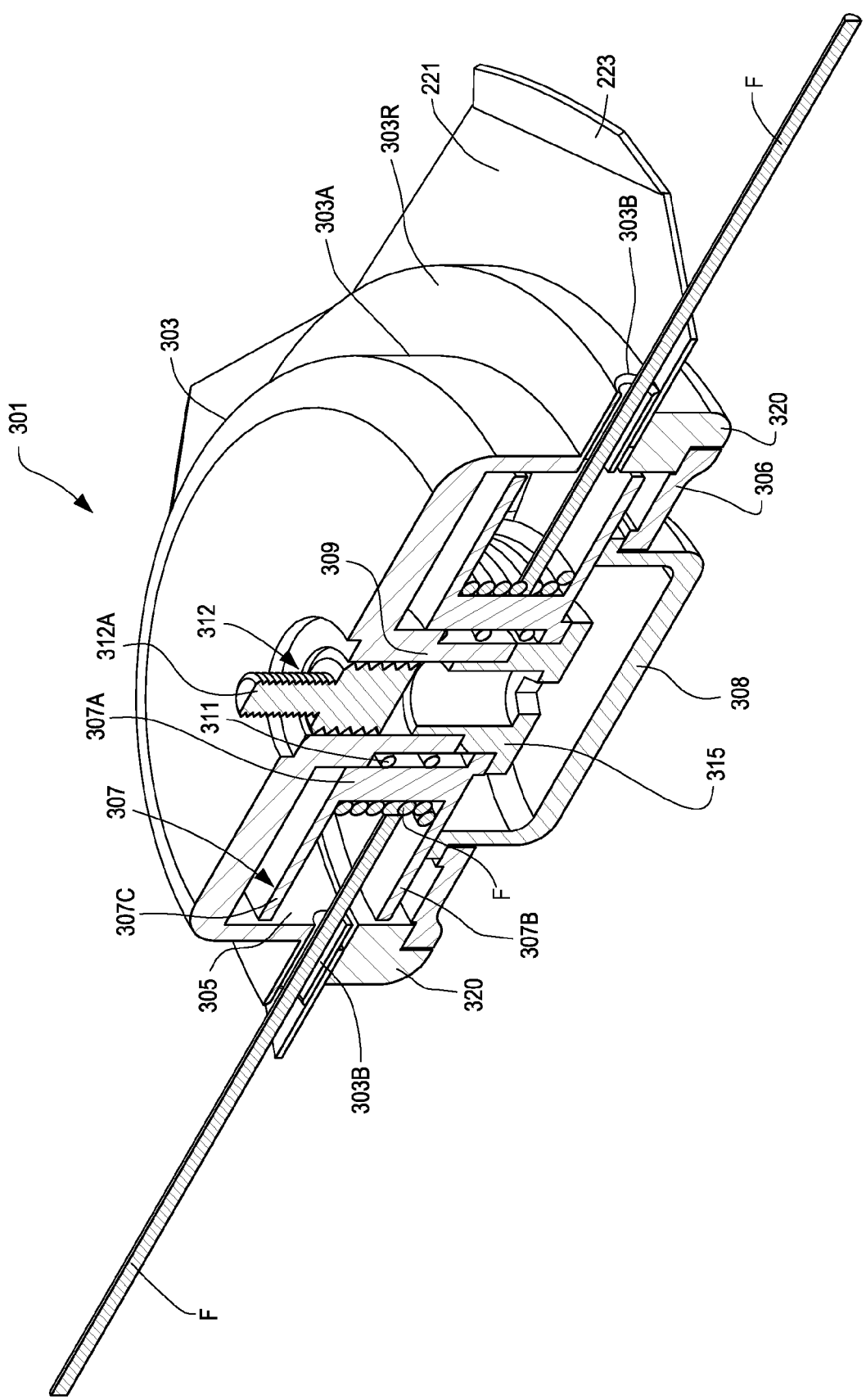
FIG. 16 is an axonometric cross section of a further embodiment of a grass cutting head.
Figure 17:
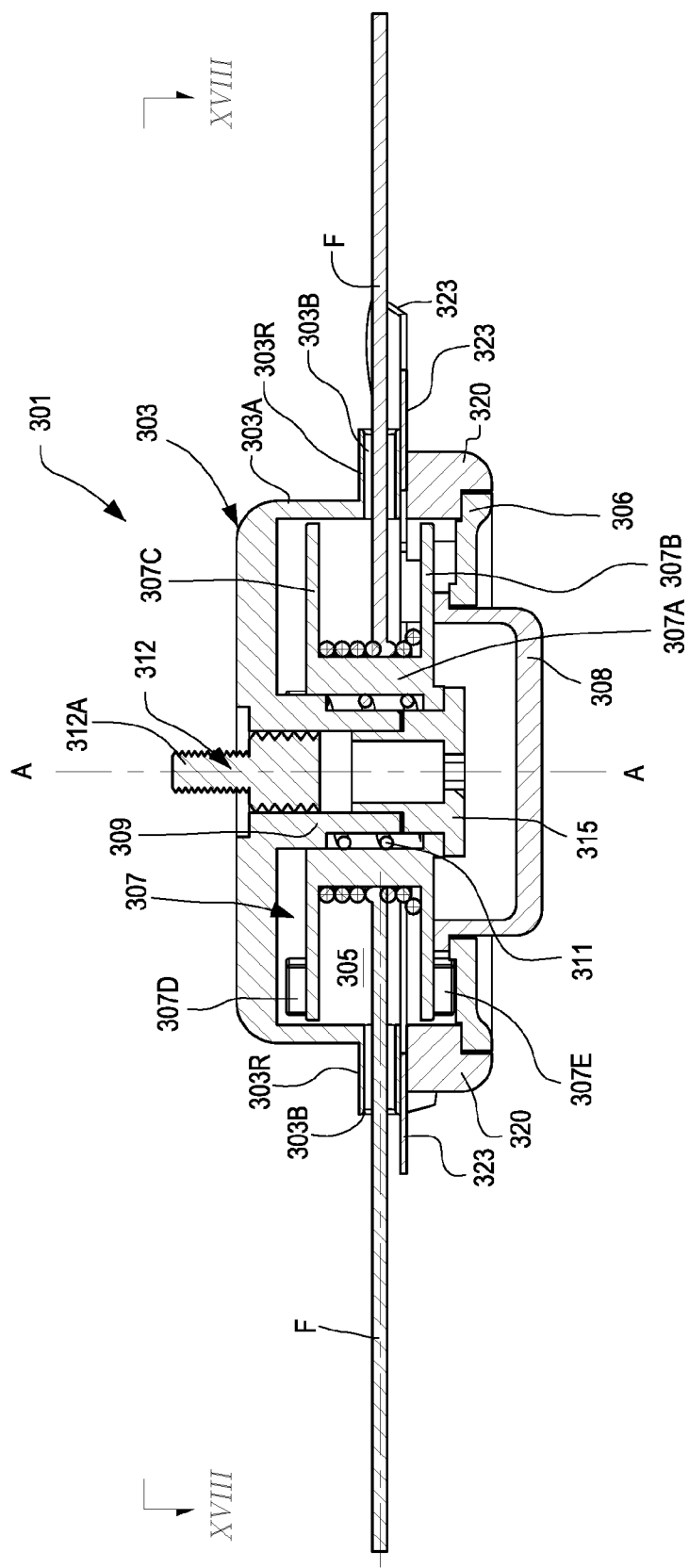
FIG. 17 is a cross-section according to XVII-XVII of FIG. 18.
Figure 18:
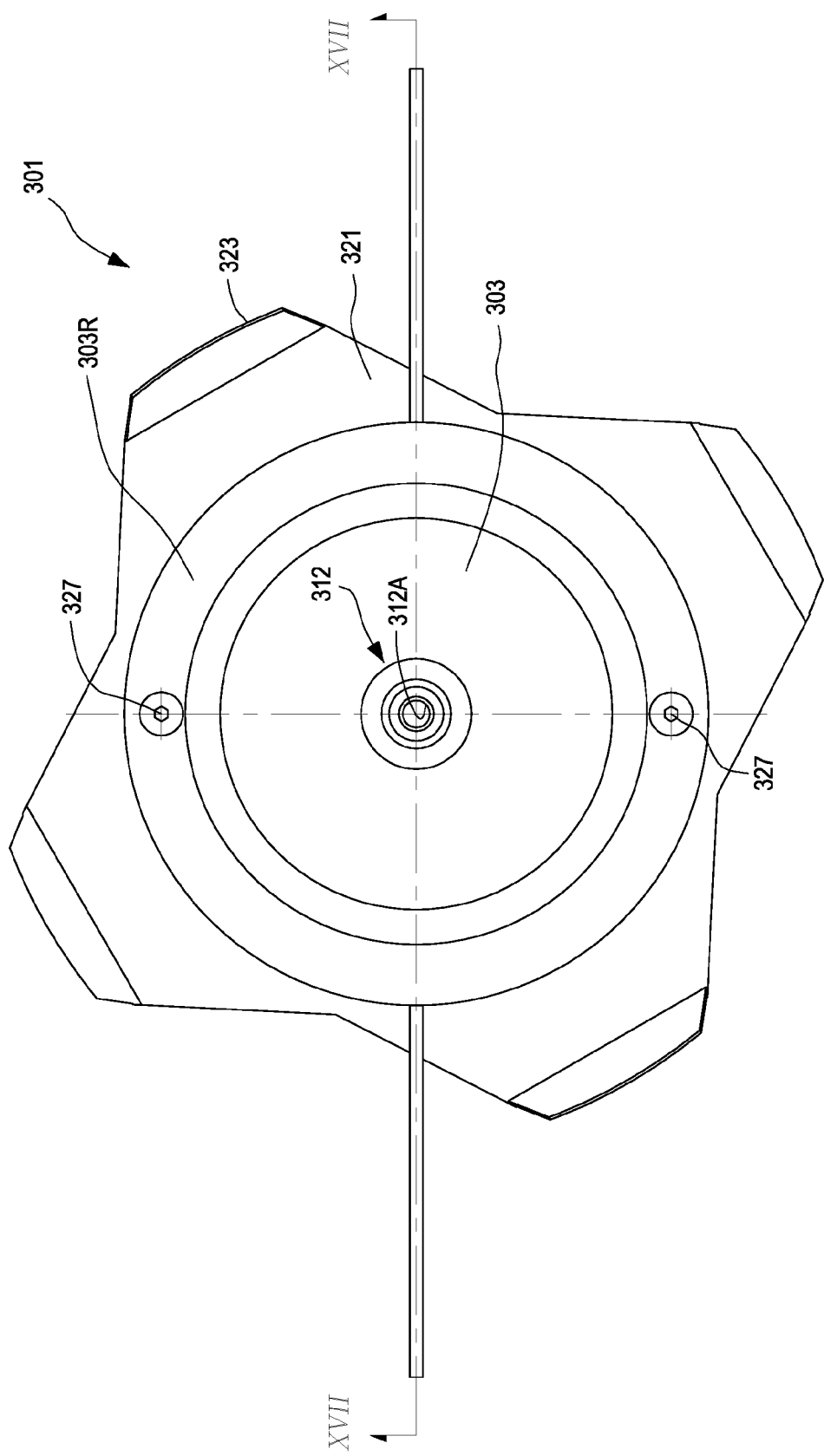
FIG. 18 is a plan view according to XVIII-XVIII of FIG. 17.

FIGS. 16-18 show a further embodiment of a grass cutting head with a configuration similar to that illustrated with reference to FIGS. 10-14. The same or equivalent parts to those of the embodiment illustrated in FIGS. 10-14 are indicated with the same reference numbers increased by 100. For example, the head of FIGS. 16-18 is indicated as a whole with 301, and has a housing 303 with a side wall 303A, where an inner space 305 is defined for a stock of cutting line F. The ends of the cutting line F can exit, for instance, through holes 303B provided in the side wall of the housing 303. Differently from the embodiments described above, in the embodiment of FIGS. 16-18 the holes 303B for the cutting line F are radial and are formed in an annular projection 303R of the housing 303 that may have a constant outer radius, instead of a variable radius as in the previous embodiments.

Reference number 308 indicates a button to control the movements of the spool 303 parallel to the rotation axis A-A of the grass cutting head 301. Thanks to the movements imparted to the spool 303, the cutting line F is gradually elongated against the resilient force of a compression spring 311 housed between the spool body 307A and a column 309 integral with the housing 303. Reference number 312 indicates a pin for coupling the grass cutting head 301 to the drive shaft (not shown) of a bush cutter or other machine. The threaded end of the shaft 312 is indicated with 312A. Reference 315 indicates an insert defining the lower abutment for the spool 307 pushed by the compression spring 311. The insert 315 is fixed to the column 309, for example by means of a thread, and forms the end part thereof.

The housing 303 is completed, at the bottom, by a ring 320 that is fastened to the annular projection 303R, for example by means of screws 327 or by means of other coupling systems, such as rivets, welding or the like. A cutting blade 321 is kept between the annular projection 303R and the ring 320. The cutting blade 321 may be provided with cutting sectors with respective cutting edges 323.

The holes 303B, through which the cutting line F exits radially, can be provided in the annular projection 303R of the housing 303, so that the cutting line F is adjacent to the upper surface of the cutting blade 221, as shown in particular in the cross-section of FIG. 17.

The housing 303 may be closed, at the bottom, by means of an annular lid 306 that can engage the upper part of the housing 303 by means of elastic tabs, not shown and similar to the elastic tabs or elastic appendices 206A illustrated with reference to the previous embodiment.

Figure 20:
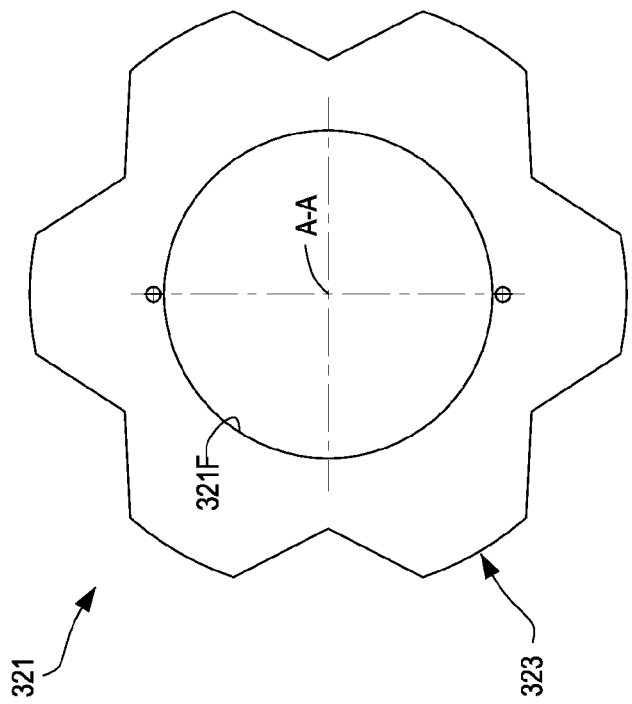
FIGS. 19 and 20 are plan views of alternative cutting blades for the grass cutting head of FIGS. 16-18.
Figure 19:
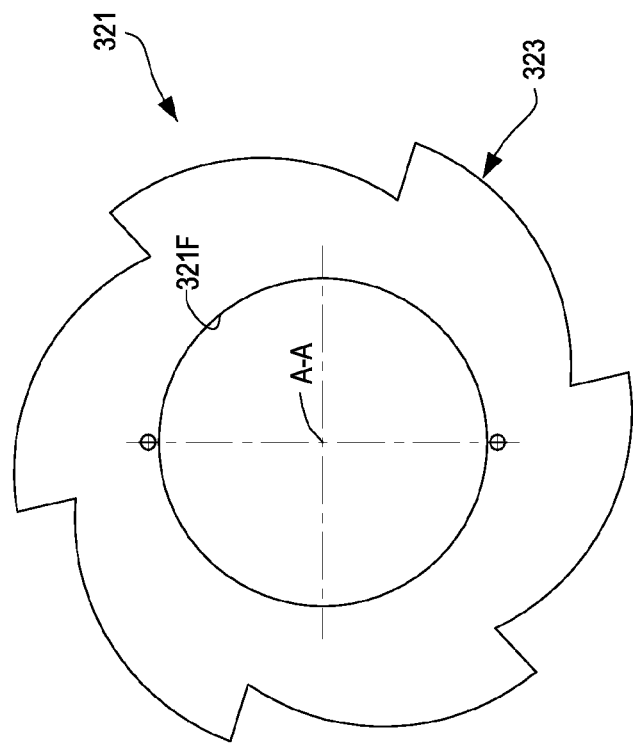
Figure 21:
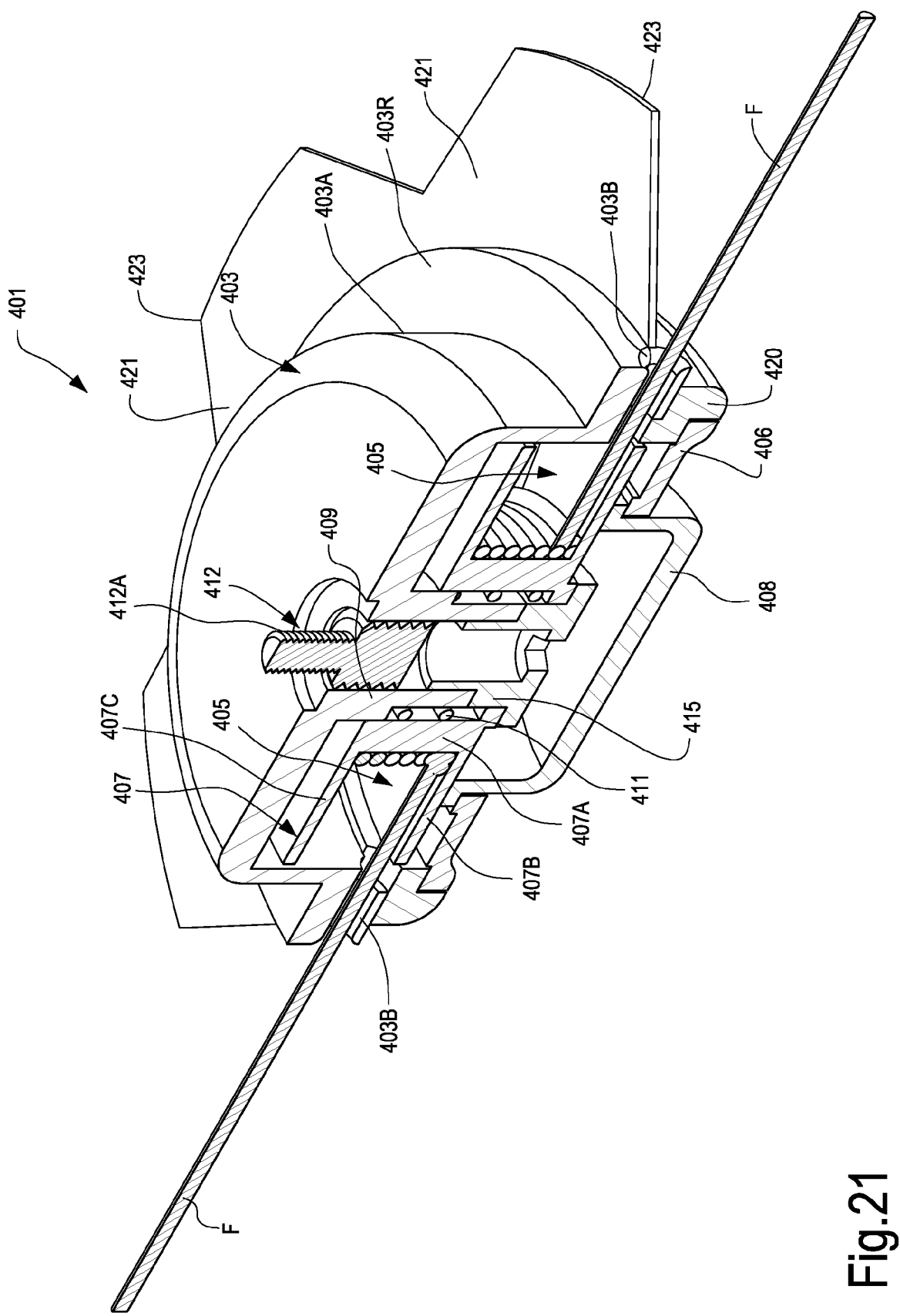
FIG. 21 is an axonometric view of a further embodiment of a grass-cutting head.
Figure 22:
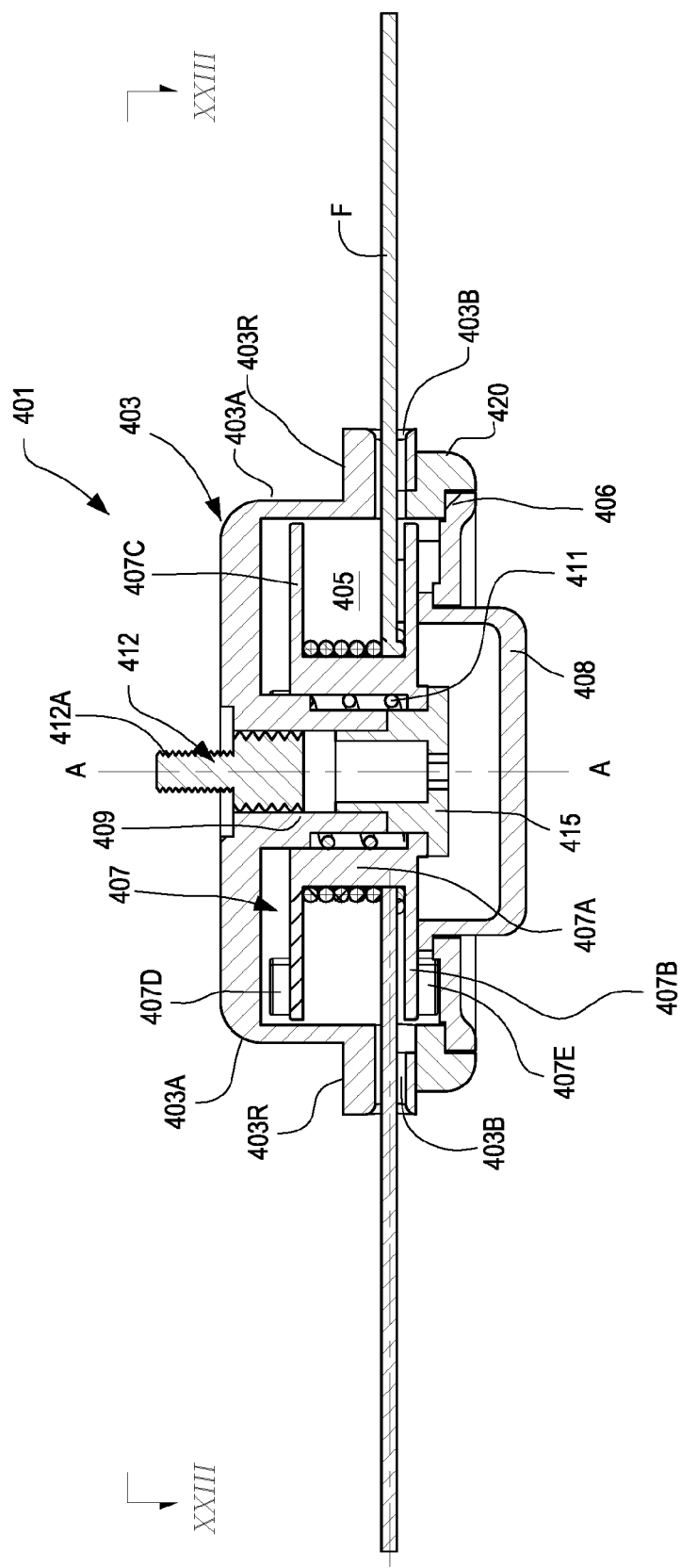
FIG. 22 is a cross-section according to XXII-XXII of FIG. 23.
Figure 23:
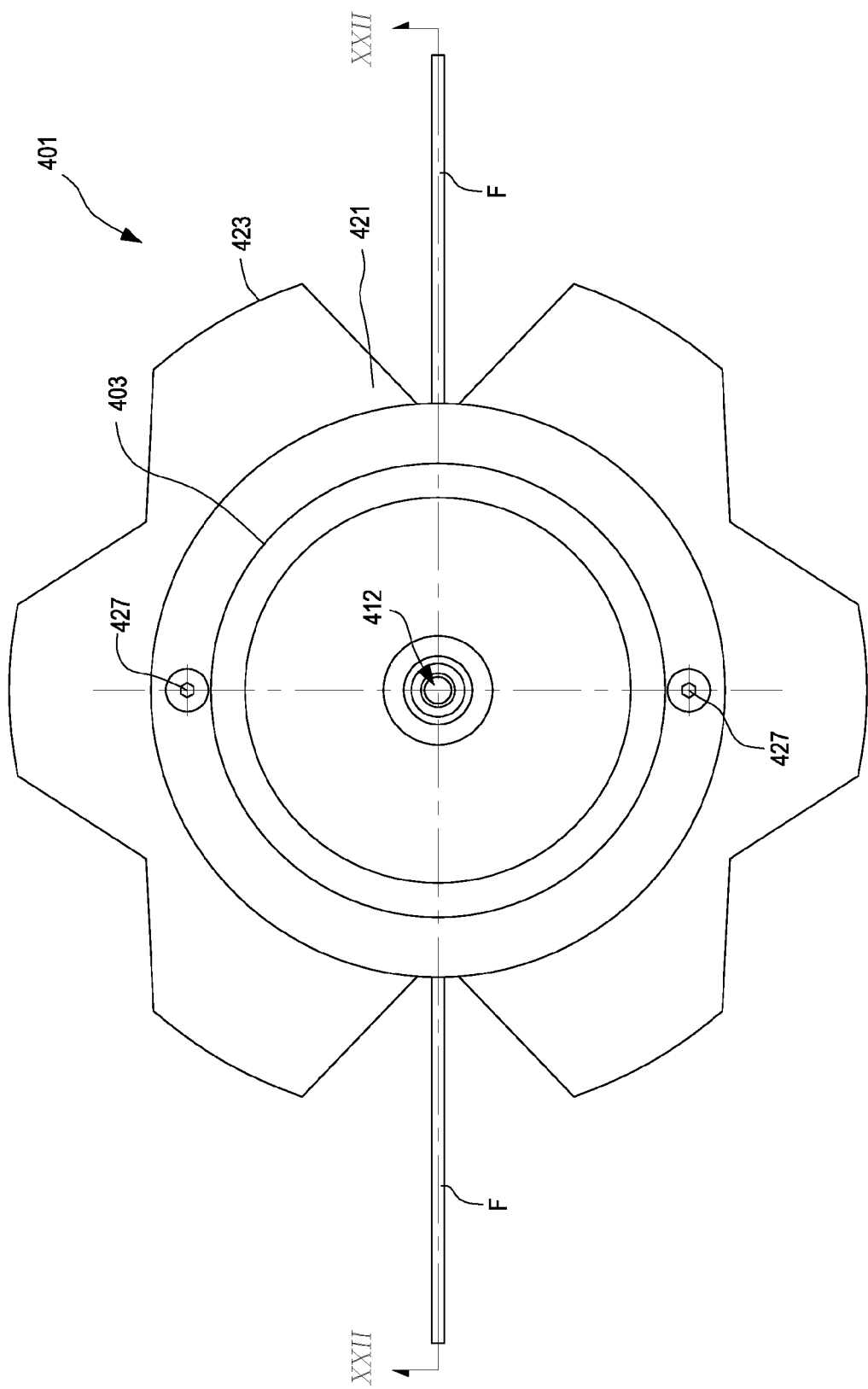
FIG. 23 is a plan view according to XXIII-XXIII of FIG. 22.

FIGS. 19 and 20 show alternative embodiments of cutting blades 321 that can be used in the grass cutting head of FIGS. 16-18. The cutting blades of FIGS. 19 and 20 have a different cutting edge 323. In general, however, the cutting blade 321 has an annular body entirely surrounding the rotation axis A-A of the grass cutting head 301, so that, in case of breakage of components of the grass cutting head 301, the cutting blade 321 remains fastened to the axial components, and especially to the central column 309 completed by the insert 315 of the grass cutting head 301. In FIGS. 19 and 20, reference number 321F indicates the central hole of the annular body of the respective cutting blades 321.

FIGS. 21-24 show a further embodiment of a grass cutting head, indicated as a whole with reference 401. The same or equivalent parts to those described with reference to FIGS. 16 to 20 are indicated with the same reference numbers increased by 100.

The number 403 indicates the dome-shaped housing of the cutting head 401, and 403A indicates the side part thereof, where holes 403B are provided for the exit of the cutting line F. In this embodiment, the holes 403B have radial extension. The spool, arranged inside a space 405 defined by the housing 403, is indicated with 407. 407A indicates the spool body inserted onto a column 409 integral with the housing 403. References 407B and 407C indicate the flanges of the spool 407.

Reference number 415 indicates an insert, fixed to the central columns 409, for instance screwed to it.

Figure 24:
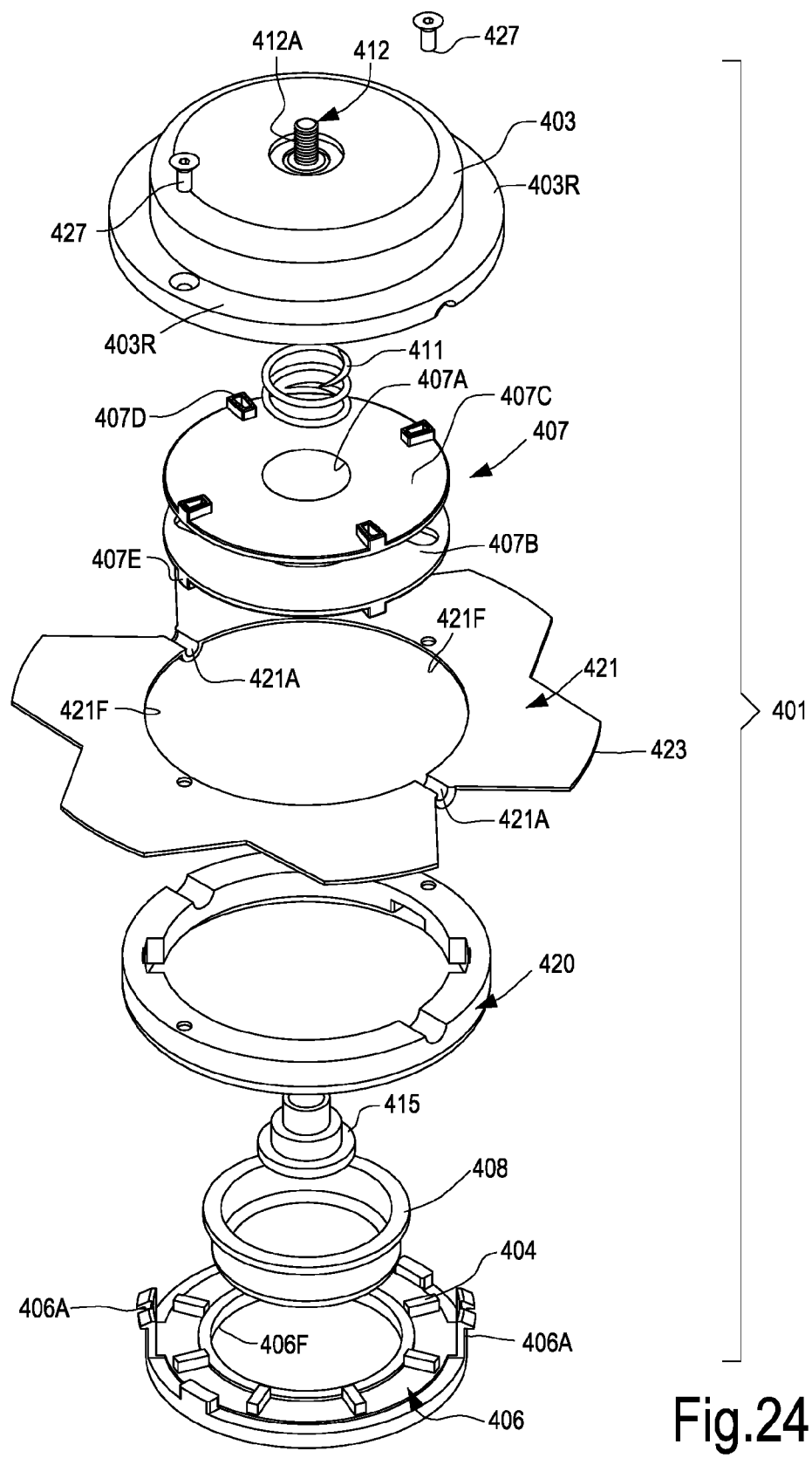
FIG. 24 is an axonometric exploded view of the grass cutting head of FIGS. 21-23.
Figure 25:
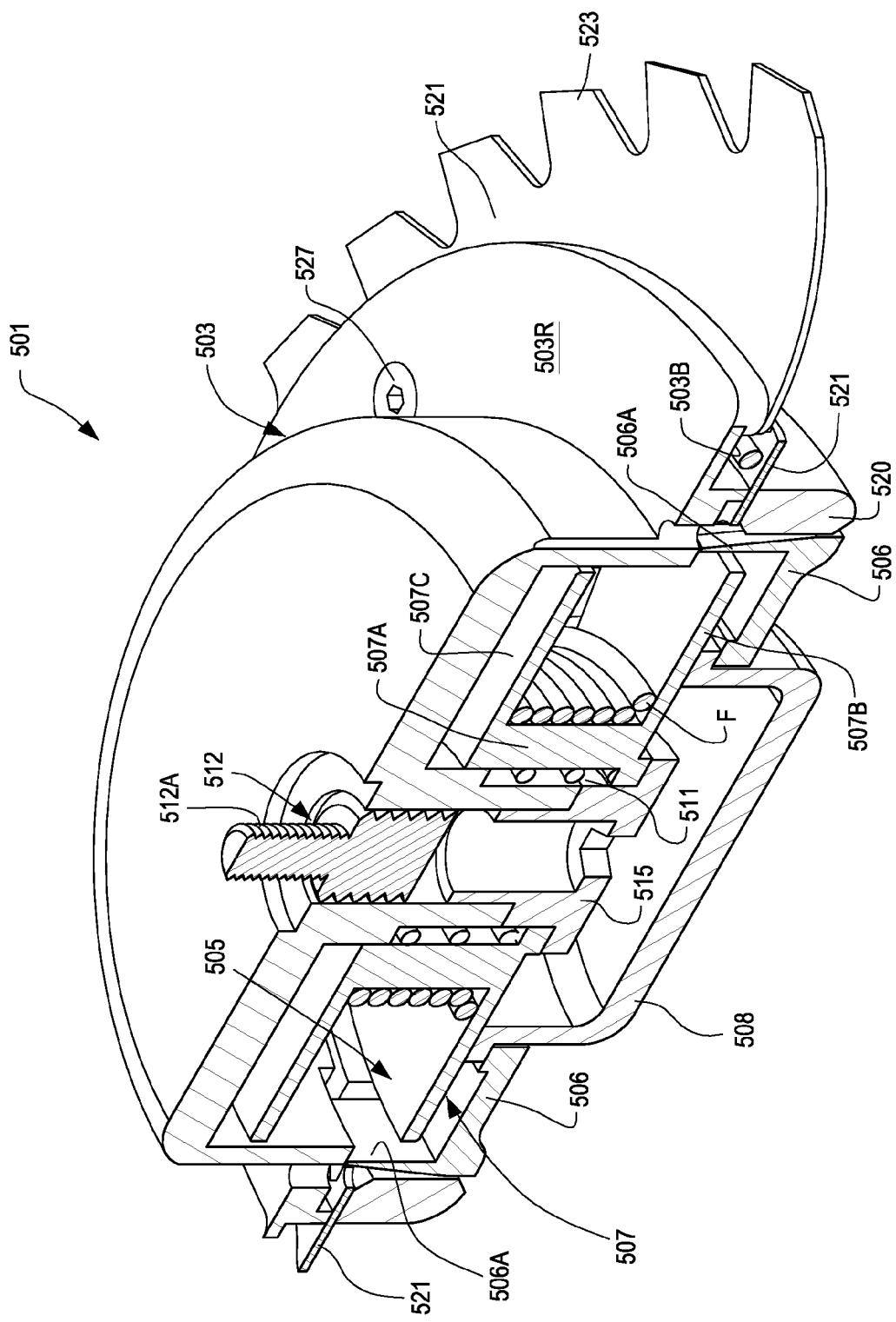
FIG. 25 is an axonometric cross-section of a further embodiment of a grass cutting head.
Figure 26:
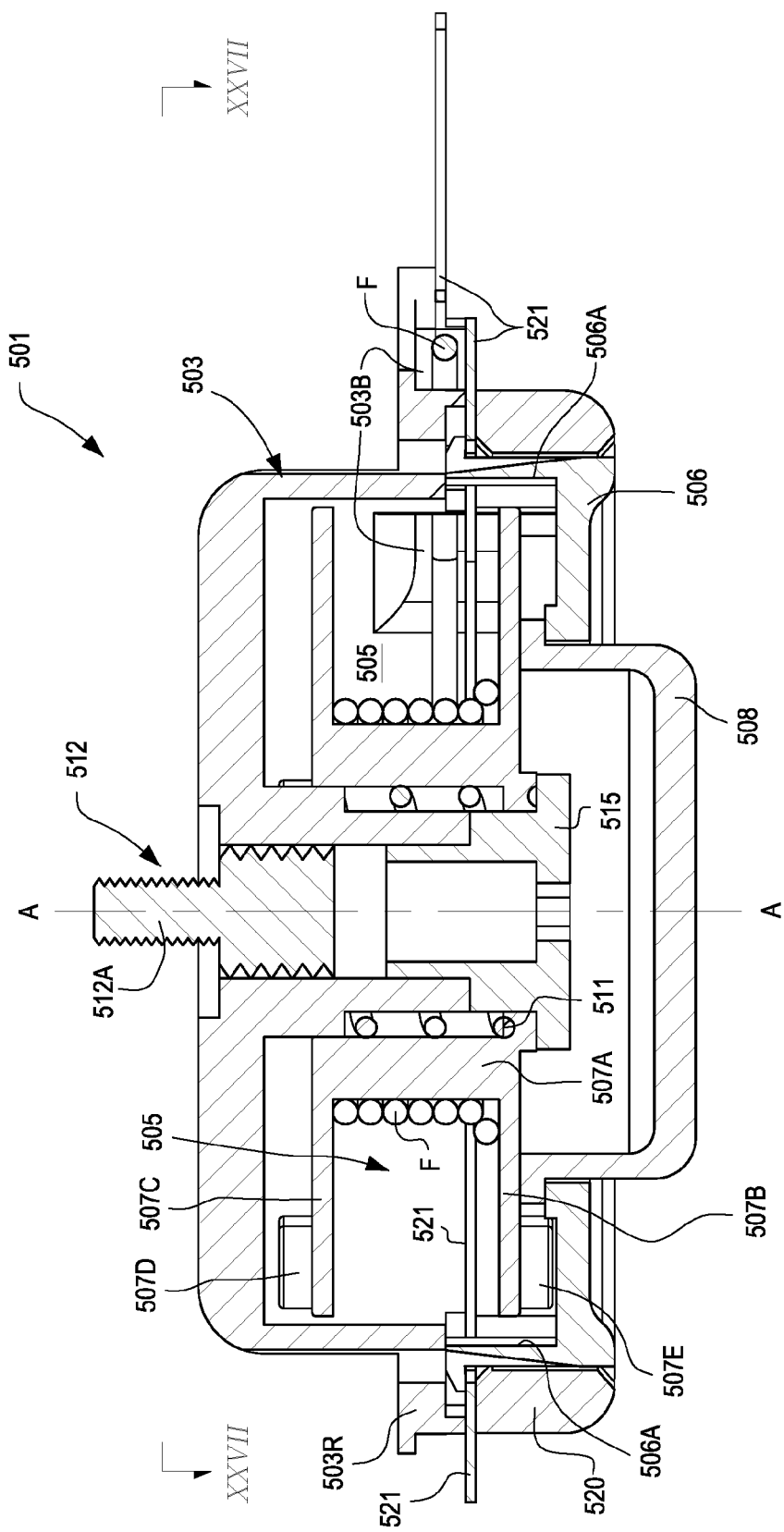
FIG. 26 is a cross-section according to XXVI-XXVI of FIG. 27.
Figure 27:
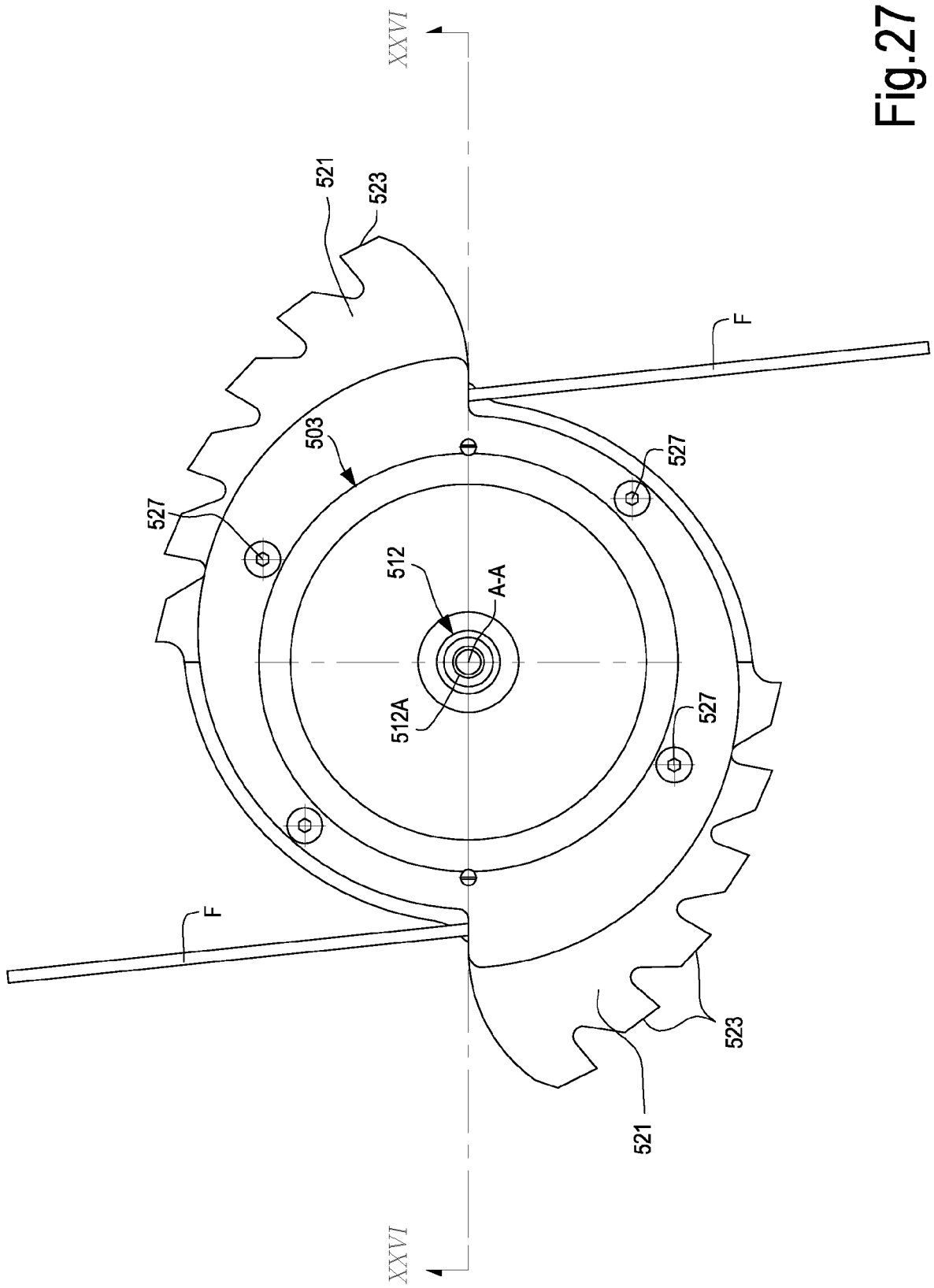
FIG. 27 is a plan view according to XXVII-XXVII of FIG. 26.

In the embodiment of FIGS. 21-24, the cutting blade 421 comprises recesses 421A defining guides for the radial passage of the cutting line (see especially FIG. 24).

As in the previous embodiments, the cutting blade 421 comprises a continuous annular body with a central hole 421F, so that the cutting blade 421 surrounds the rotation axis A-A of the grass cutting head 421.

The cutting blade 421 may be fastened to the grass cutting head 401 by means, for example, of screws 427, which extend through holes of a radial projection 403R and engage threaded holes of a ring 420. The cutting blade 421 is held by means of the screws 427 between the radial edge 403R of the housing 403 and the ring 420.

FIGS. 25-28 illustrate a further embodiment of a grass cutting head similar to the embodiment illustrated in FIGS. 10-14. The same or equivalent components are indicated with the same reference numbers used in FIGS. 10-14, increased by 300, and will not be described in detail.

Figure 28:
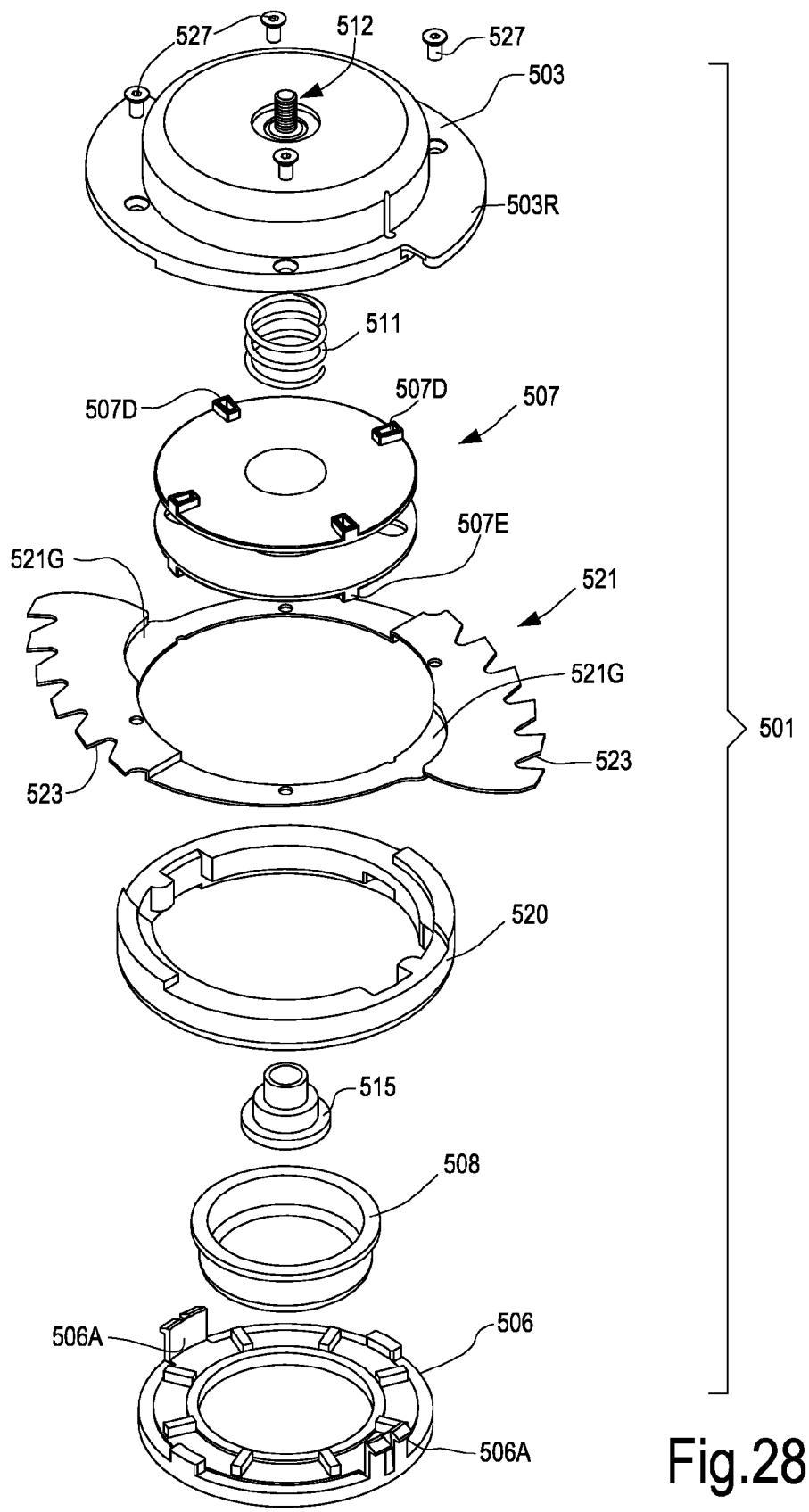
FIG. 28 is an axonometric exploded view of the grass cutting head of FIGS. 25-27.
Figure 29:
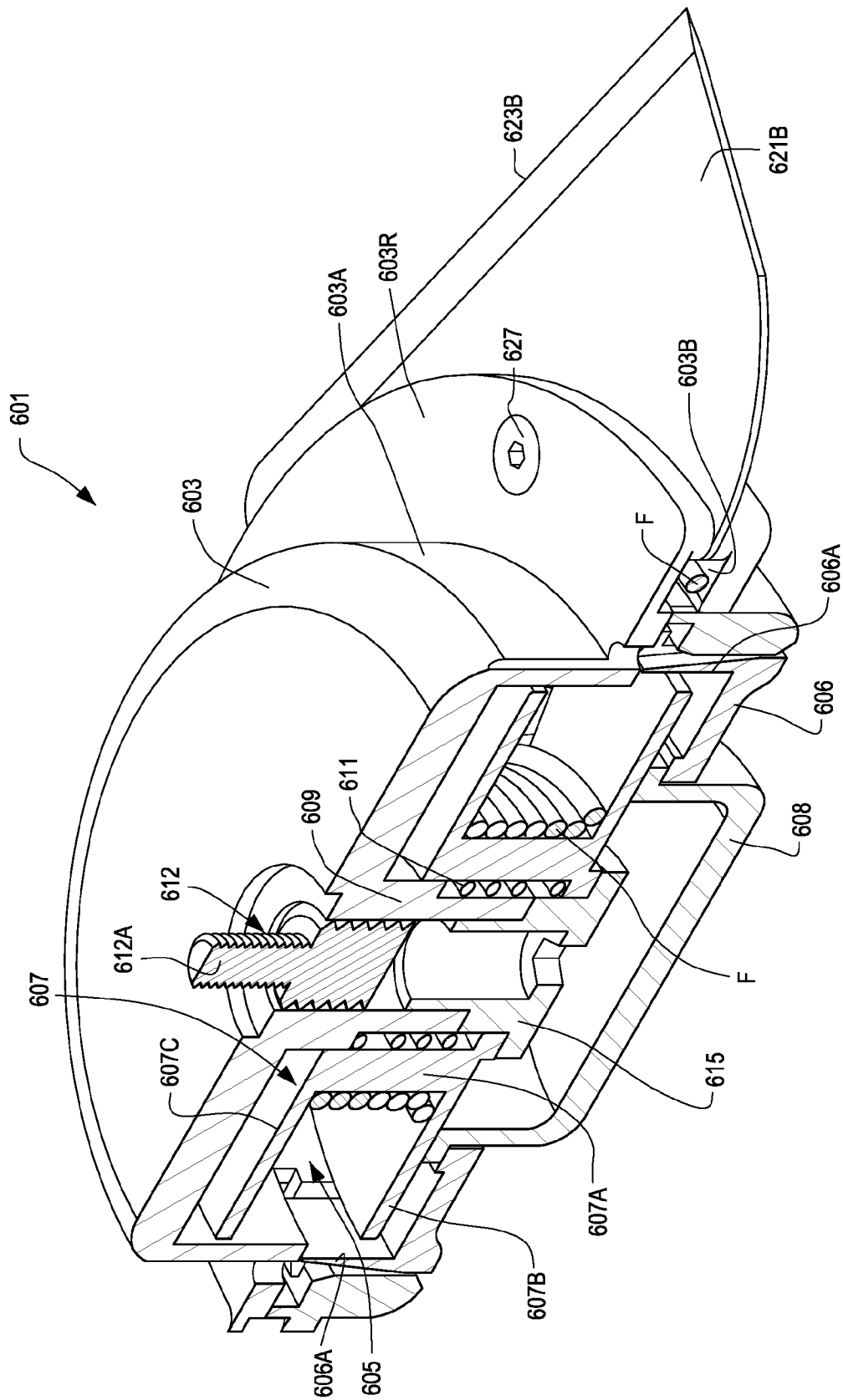
FIG. 29 is an axonometric cross-section of a further embodiment of a grass-cutting head.
Figure 30:
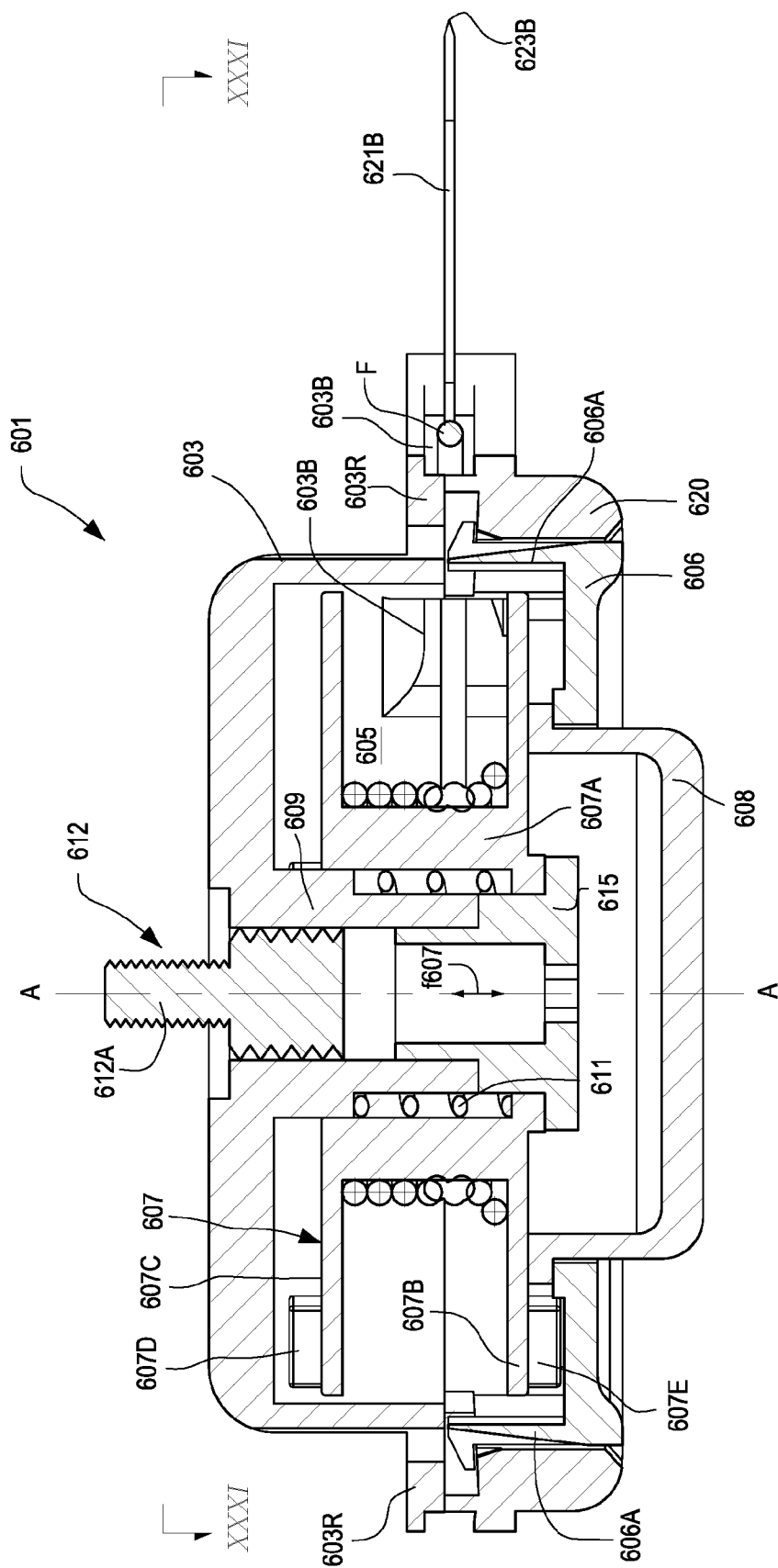
FIG. 30 is a cross-section according to XXX-XXX of FIG. 31.
Figure 31:
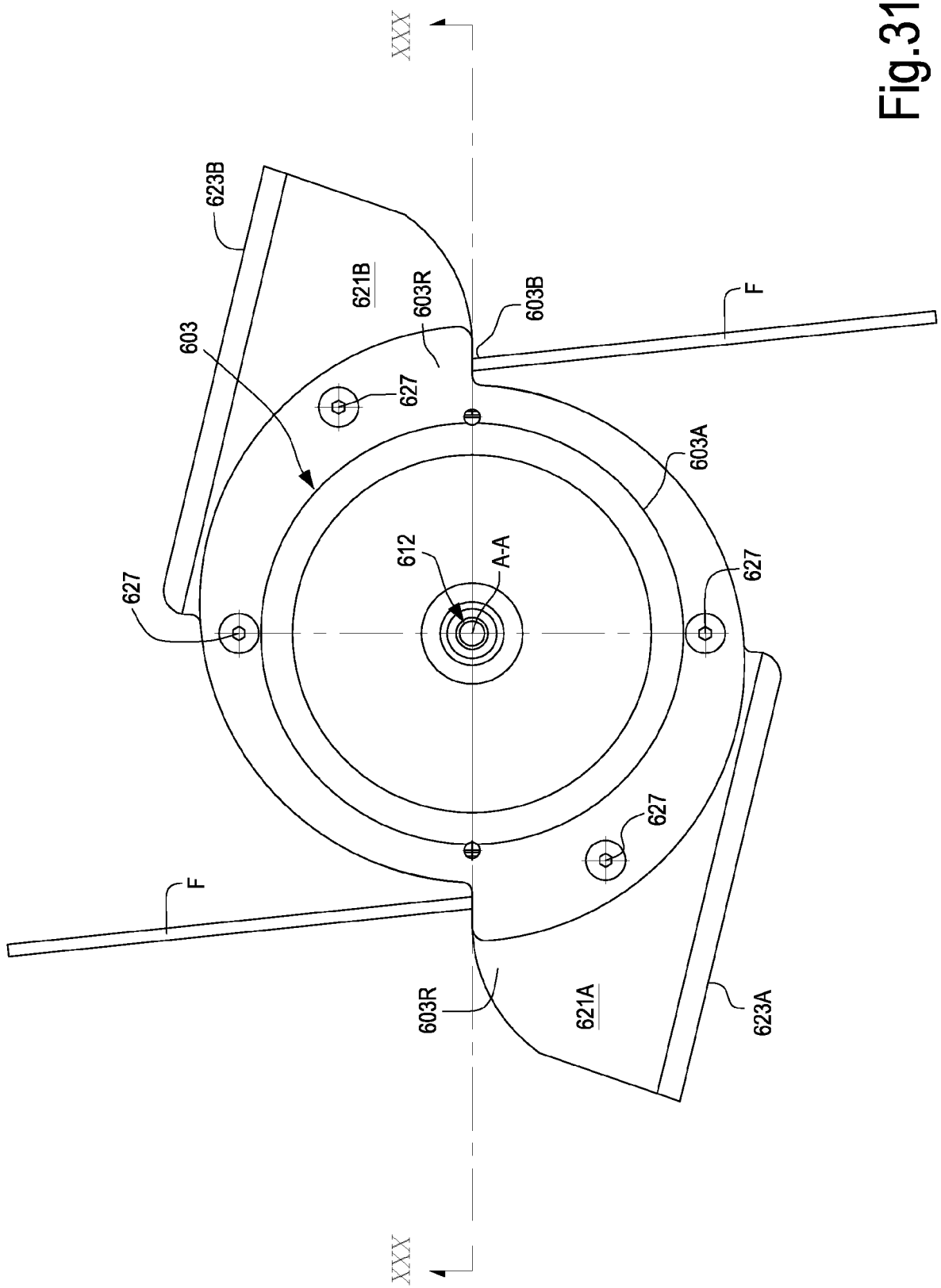
FIG. 31 is a plan view according to XXXI-XXXI of FIG. 30.
Figure 32:
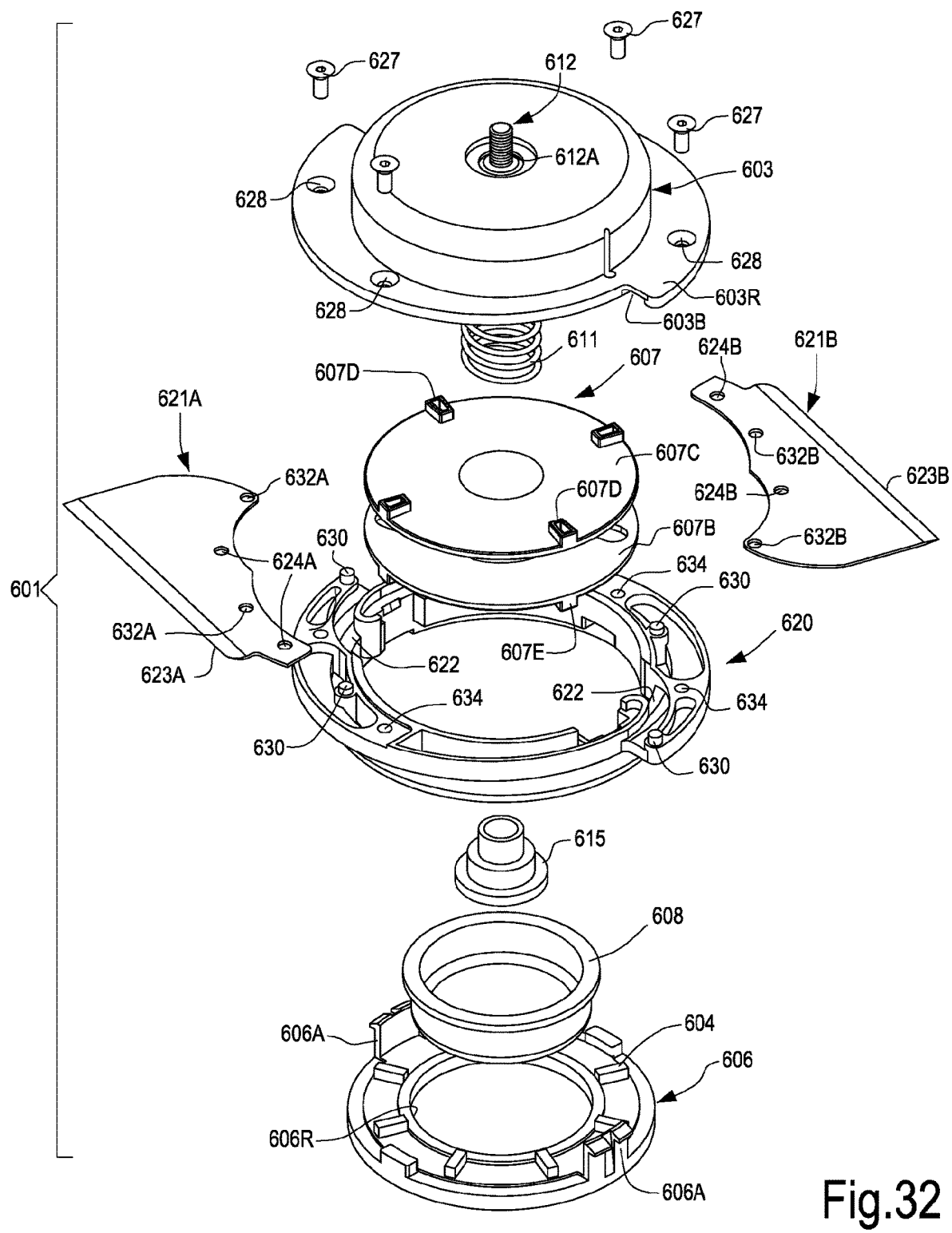
FIG. 32 is an axonometric exploded view of the grass cutting head of FIGS. 29-31.

The embodiment of FIGS. 10-14 differs from that of FIGS. 25-28 in the shape of the cutting blade 521. In the embodiment of FIGS. 25-28, as shown in particular in the exploded view of FIG. 28, the cutting blade 521 is not planar, namely it extends on more levels, see also the cross-section of FIG. 26. The cutting line F follows a path from the inside of the housing 503 towards the outside, partially delimited by a step 521G formed by the cutting blade 521 (FIG. 28).

The cutting sectors with cutting edges 523 of the cutting blade 521 are arranged on a different plane with respect to the plane of the remaining part of the annular body of the cutting blade 521. The ring 520, holding the cutting blade 521 on the housing 503 by means of screws 527, has a corresponding shape, with lowered areas and projecting areas on the upper surface of the ring 520, which are inserted in the corresponding shape of the cutting bade 521.

A further embodiment of a grass cutting head is shown in FIGS. 29-35.

In this embodiment, the grass cutting head is indicated as a whole with number 601 and has a dome-shaped housing 603 with a side wall 603A and an annular projection 603R. The annular projection 603 R may advantageously have a variable diameter, so as to define a spiral profile, as shown in particular in FIGS. 31 and 32.

A space 605 for a stock of cutting line F is defined inside the housing 603. Cutting line ends exit from the inner space 605 through holes 603B of the housing 603. The holes 603B have a tangential extension, i.e. they form guide spiral channels, and extend inside the annular projection 603R.

Inside the space 605 of the housing 603, a spool 607 is housed, around which a stock of cutting line F can be wound. The spool 607 may have a body 607A, a first flange 607B and a second flange 607C. The central body 607A of spool 607 can be inserted onto a column 609 integral with the housing 603. An insert 651 can be fastened to the column 609, for example by means of a thread, and can form the lower part of the same column 609.

A compression spring 611, for example a helical spring, can be arranged around the column 609. The spring elastically pushes the spool 607 to abut against an annular projection of the insert 610.

The column 609 can be engaged by a shaft 612 having a threaded end portion 612A to fasten the grass cutting head 601 to a drive shaft of a bush cutter, not shown. In other embodiments, the male threaded portion 612A may be replaced with a female thread.

The housing can be closed at the bottom by means of an annular lid 606 having elastic appendices 606A, by means of which the lid 606 is constrained to the remaining part of the grass cutting head 601 and, in particular, to the housing 603.

The lid 606 may have a central hole 606F (FIG. 32), through which a button 608 may project, resting against the lower flange 607B of the spool 607. Like in the embodiments described above, the button 608 can be used to move the spool 607 axially according to the double arrow f607 inside the housing 603 of the head 601, so as to elongate the cutting line F. The movement according to the arrow f607 is obtained by pushing the button 608 against the force of the compression spring 611, so that the spool rotates in a stepped manner with respect to the housing 603, and the cutting line F is thus elongated. To this end, as already described and known, the spool 607 can comprise appendices 607D and 607E projecting from the outer faces of the flanges 607C and 607B respectively. The teeth 607D and 607E co-act with abutments provided in the housing 603 and in the annular lid 606. The abutments co-acting with the teeth 607E of the spool 607 are indicated with 604 in FIG. 32. The abutments in the housing 603 are not shown.

The housing 603 is fastened to a lower ring 620, completing the spool housing, inside which the space 605 for the cutting line stock is defined. The housing 603 is fastened to the ring 620 for example by means of screws 627 inserted in through holes 628 provided in the annular projection 603R of the housing 603. The screws 627 engage threaded holes 630 provided in the ring 620.

In some embodiments, the ring 620 may have passages 622 that complete the holes 603B for the exit of the cutting line F.

Two cutting blades 621A, 621B are fastened between the ring 620 and the dome-shaped part of the housing 603. Each cutting blade 621A, 621B has a cutting edge 623A, 623B. In the illustrated embodiment, the cutting edges 623A, 623B are rectilinear, but it should be understood that in other embodiments toothed cutting edges may be provided, or cutting edges of other suitable shape.

The two cutting blades 621A, 621B, when mounted, are substantially coplanar with each other.

The cutting blades 621A, 621B are locked by means of the screws 627 passing through holes 624A, 624B provided in the cutting blades 621A, 621B.

In some embodiments, the ring 620 has pins 630 that are inserted in corresponding through holes 632A, 632B of the cutting blades 621A, 621B. The pins 630 and the through holes 632A, 632B in the cutting blades 621A, 621B facilitate the positioning of the blades with respect to the ring 620 and, thus, with respect to the grass cutting head 601.

Figure 33:
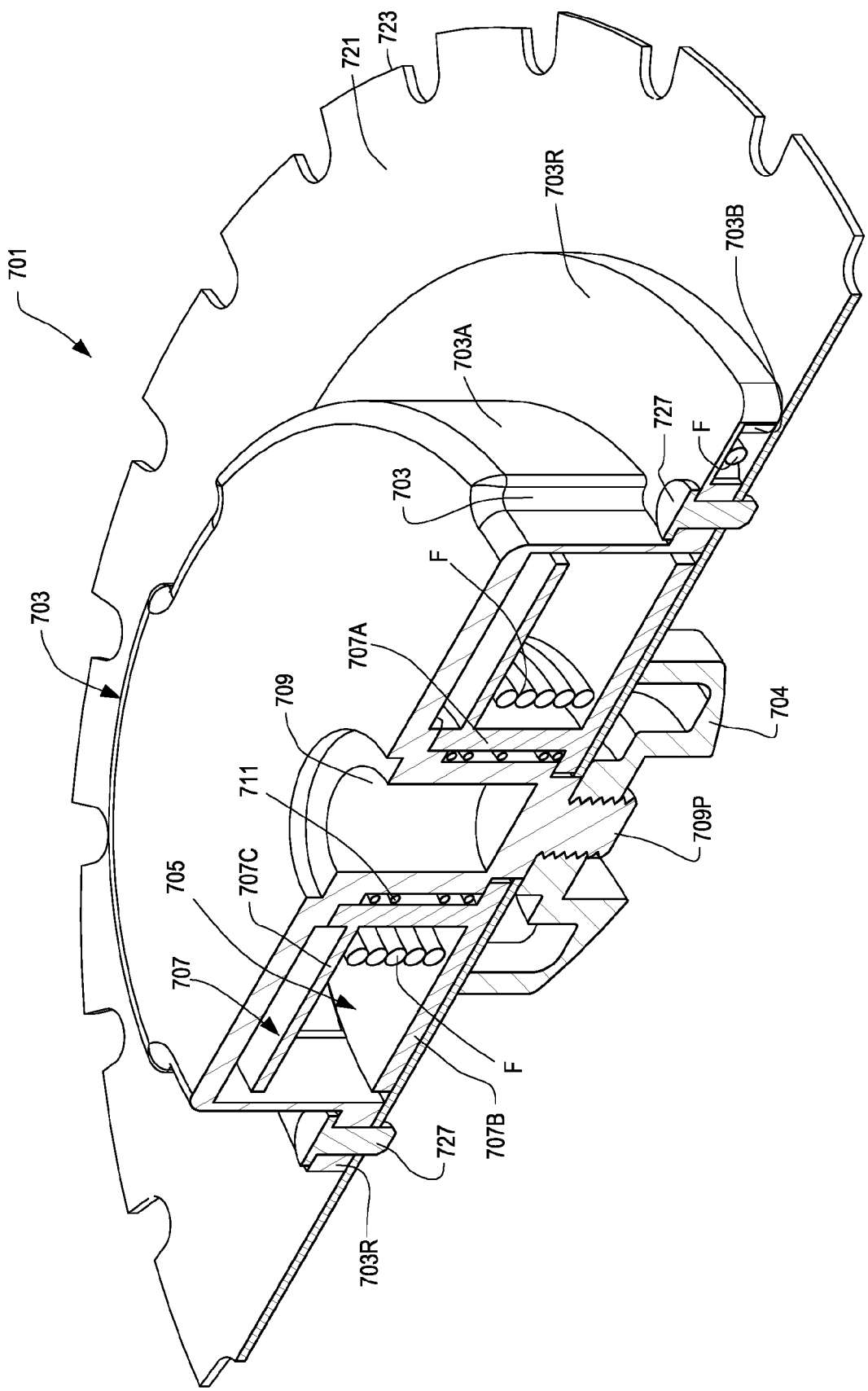
FIGS. 33-36 show a further embodiment of a grass cutting head.
Figure 34:
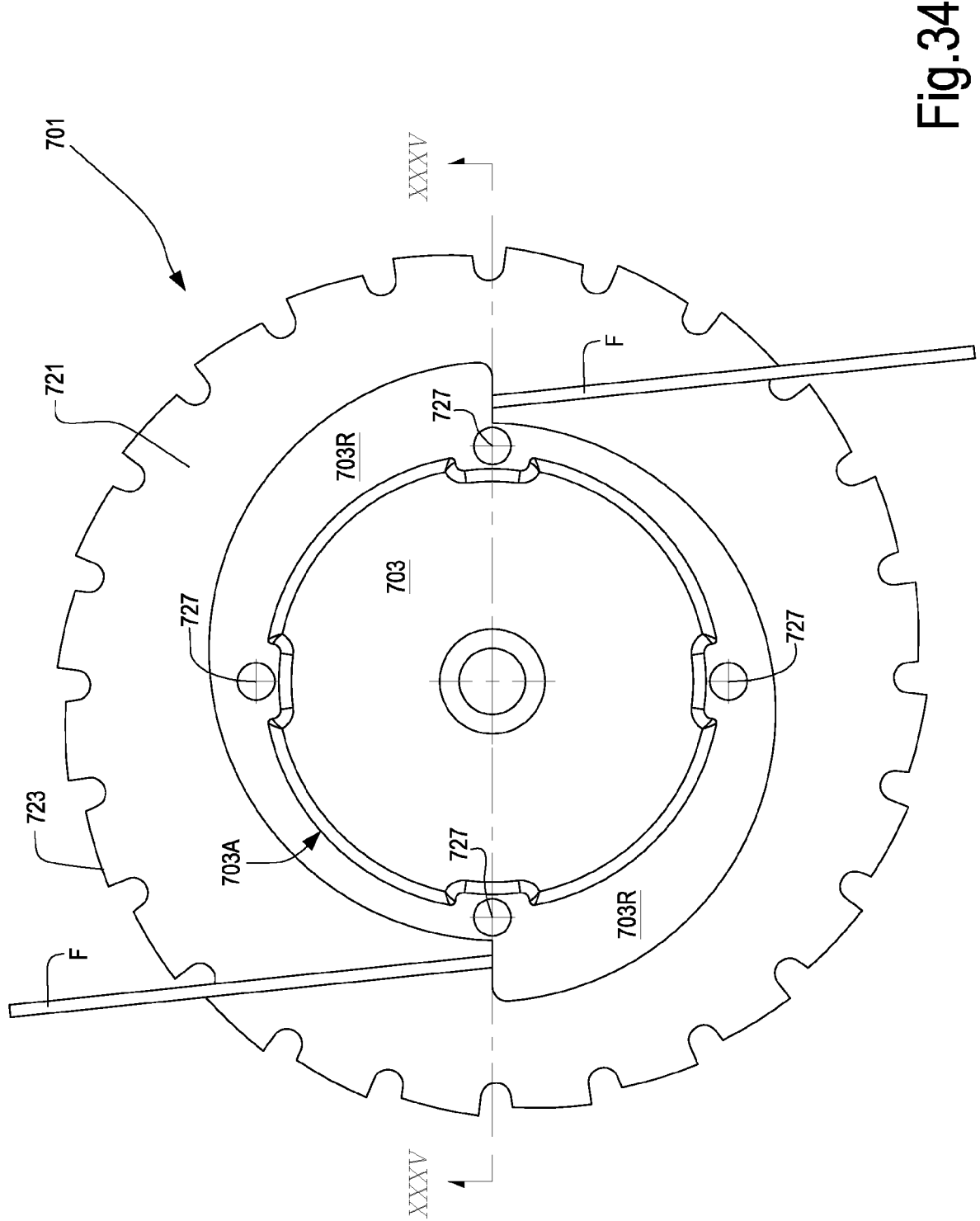
Figure 35:
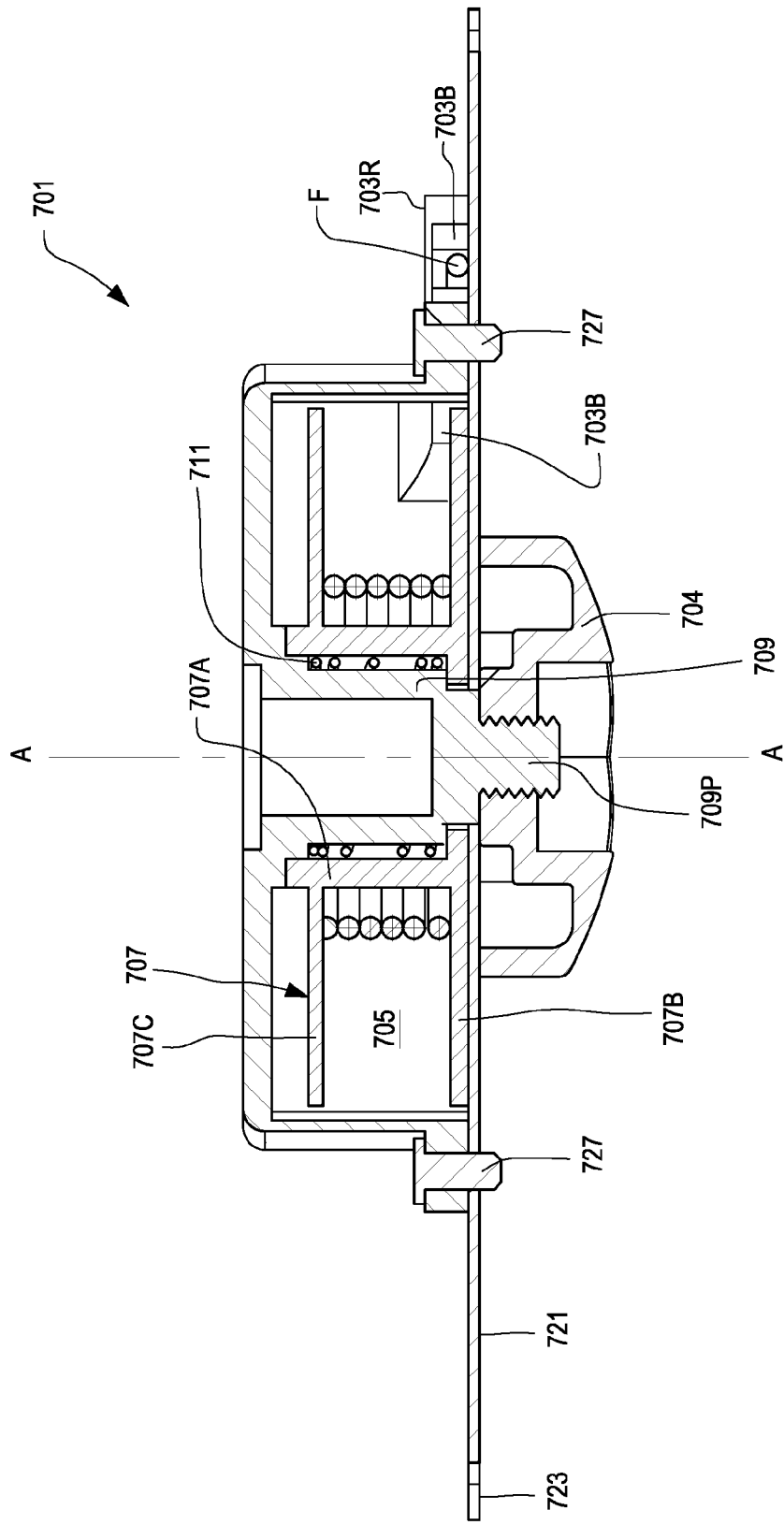
Figure 36:
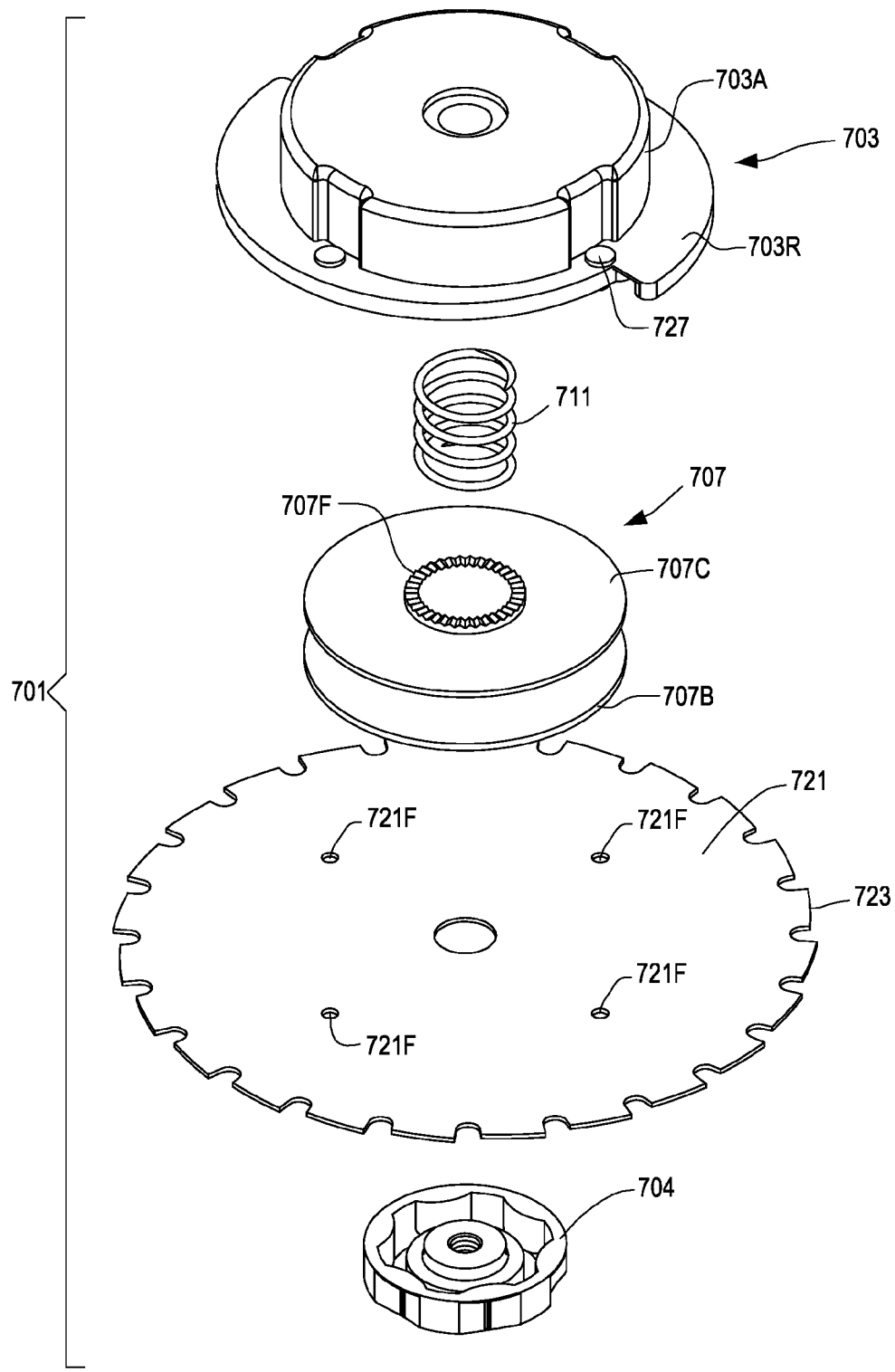

FIGS. 33-36 show a further embodiment of the grass cutting head, wherein FIG. 33 is an axonometric cross-section, FIG. 34 is a plan view, FIG. 35 is a cross-section according to XXXV-XXXV of FIG. 34, and FIG. 36 is an exploded axonometric view.

The same or equivalent parts to those of the embodiment illustrated in FIGS. 29-32 are indicated with the same reference numbers increased by 100.

The grass cutting head is indicated as a whole with 701 and comprises a dome-shaped housing 703 with an annular projection or collar 703R extending from a substantially cylindrical wall 703A. The projection or collar 703R extends like spiral portions. The projection or collar 703R can define exit holes or channels 703B for the cutting line F.

A space 705 for a stock of cutting line F is defined inside the housing 703. In some embodiments, the cutting line F is wound around a spool 707. The spool 707 can comprise a body 707A, from which a first flange 707B and, if necessary, a second flange 707C can extend.

In some embodiments, the spool 707 is mounted coaxially with a central column 709 extending from the upper wall of the housing 703. In some embodiments, a compression spring 711 can be arranged between the body 707A and the column 709. In some embodiments, the column 709 ends with a threaded pin 709P, to which a knob 704 is screwed. The knob 704, screwed to the threaded pin 709P, is suitable to hold, on the housing 703, a cutting blade 721 that can be provided with a cutting edge 723, for example a toothed cutting edge. The knob 704 axially fixes the cutting blade 721 on the housing 703, while the spool 707 is held between the cutting blade 721 and the upper part of the housing 703. Front teeth 707F provided on the central body 707A or on the flange 707C can engage corresponding inner front teeth provided in the upper wall of the housing 703, in order to fasten torsionally the housing 703 to the spool 707, this latter being locked axially, by means of the knob 704, against the upper wall of the housing 703.

Pins, screws or other elements, indicated with 727, engaged by the annular collar or projection 703R and engaging holes 721F of the cutting blade 721 (see FIG. 36) can be provided for a better torsional coupling between the cutting blade 721 and the housing 703 of the grass cutting head 701.

The grass cutting head 701 provides for manual elongation of the broken or worn cutting line F. To elongate the cutting line F projecting from the channels or holes 703B, the knob 704 is partially unscrewed, so that the compression spring 711 pushes the spool 707 away from the upper wall of the housing 703, moving downwards also the cutting blade 721 by an entity sufficient to release the front teeth 707F of the spool 707 from the corresponding inner front teeth provided in the housing 703 and not shown. Once the front teeth 707F have been released, the cutting line may be unwound by taking the ends thereof projecting from the housing 703 (see FIG. 34) and pulling them outwards so as to cause the rotation of the spool 707 in unwinding direction until the desired length of projecting portions of cutting line F is achieved. Then, the knob 704 is screwed again.

Therefore, differently from the embodiments described above, in this case the cutting line elongation is manual.

FIGS. 37-40 illustrate a further embodiment of a grass cutting head according to the subject matter disclosed herein. The same or equivalent parts to those of the embodiment illustrated in FIGS. 29-32 are indicated with the same reference numbers increased by 200.

Figure 37:
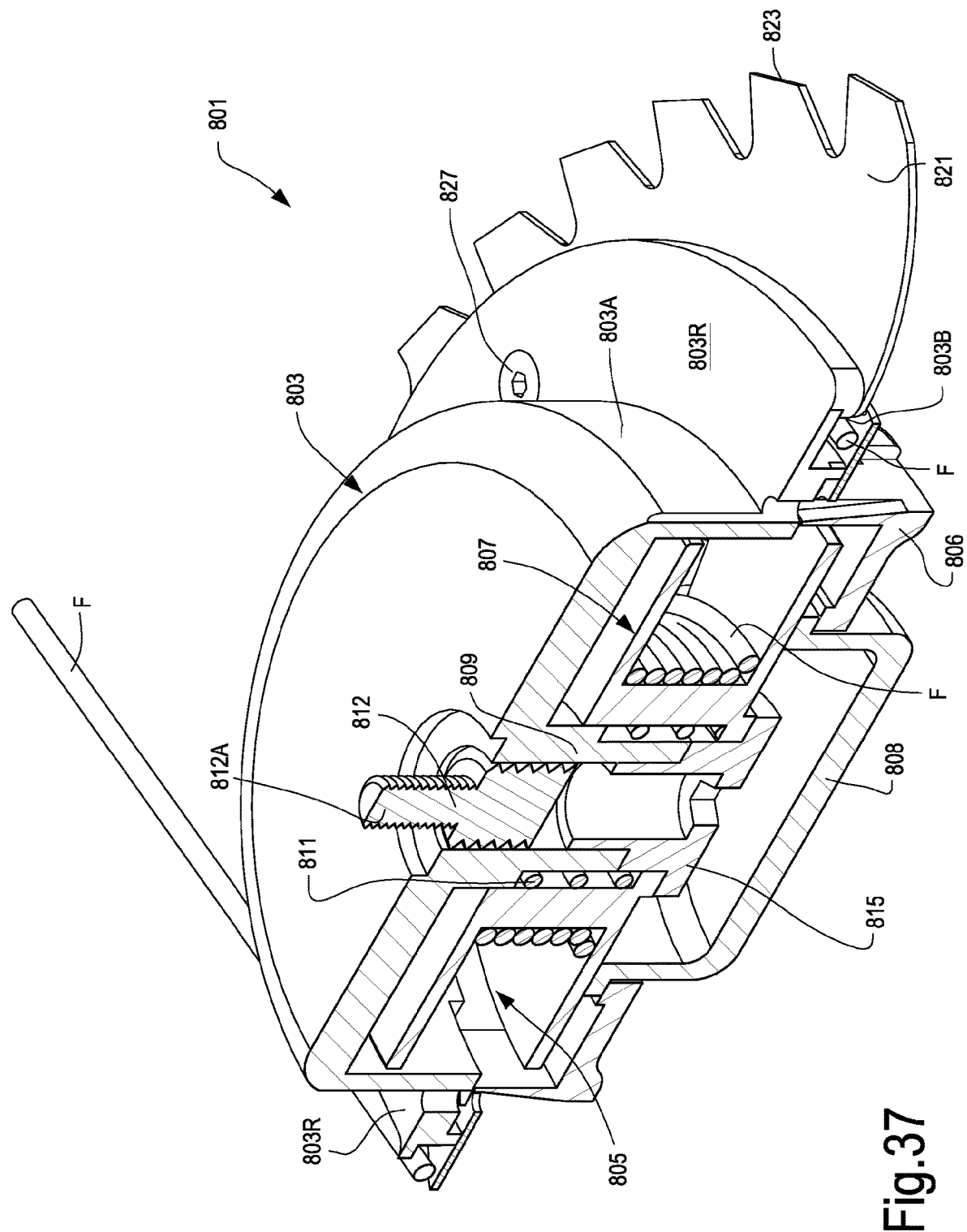
FIGS. 37-40 show a further embodiment of a grass cutting head.
Figure 38:
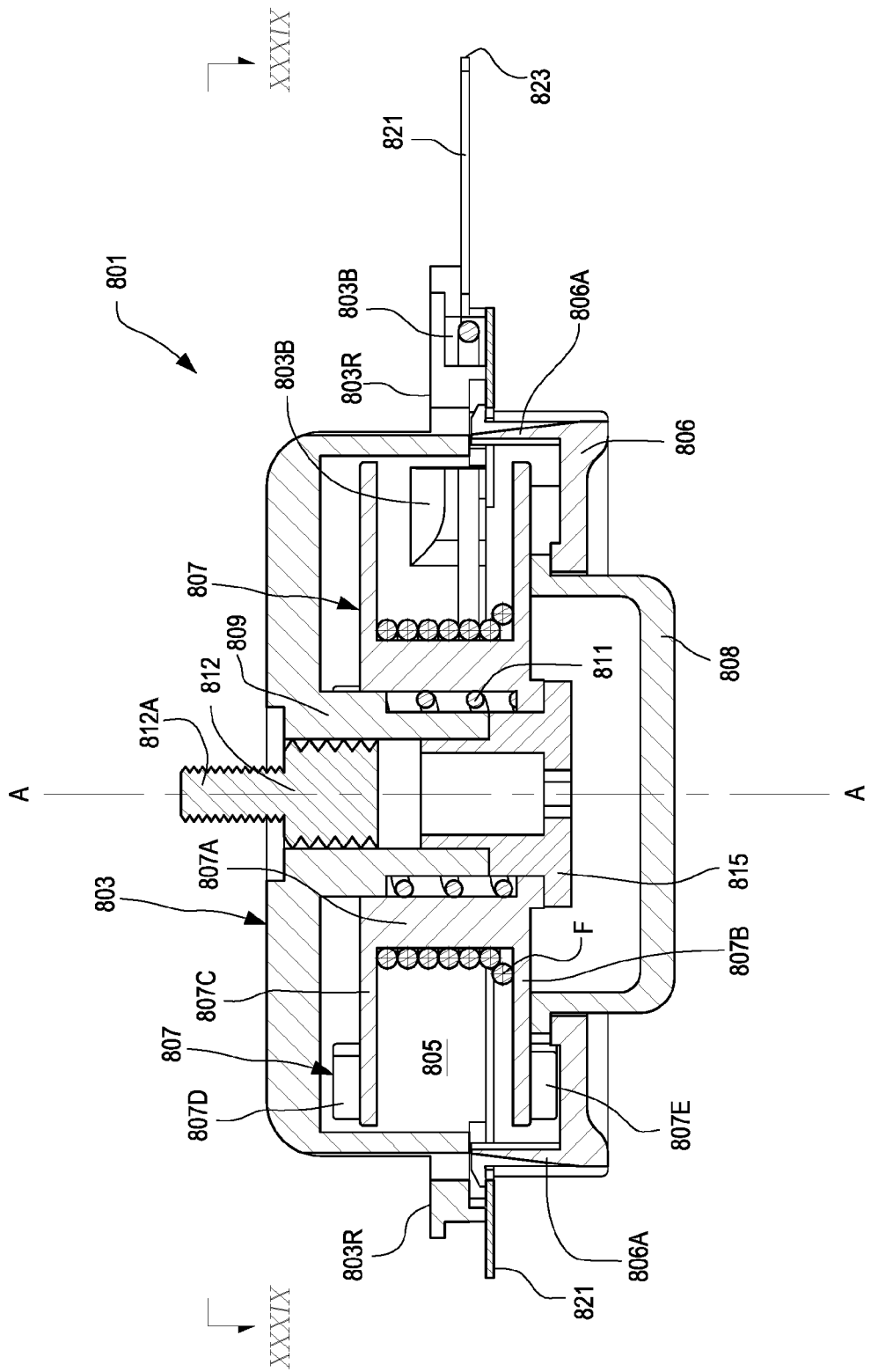
Figure 39:
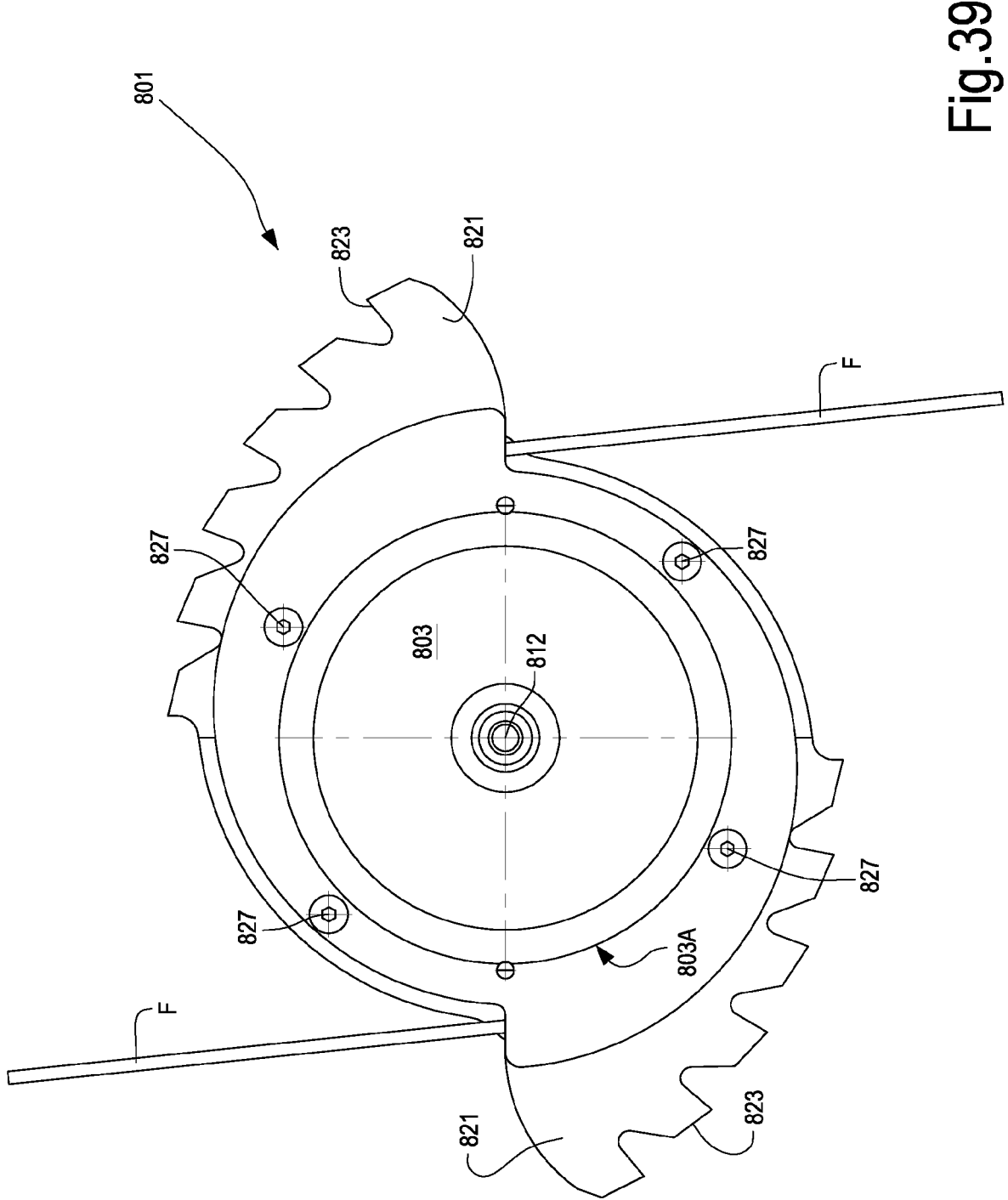
Figure 40:
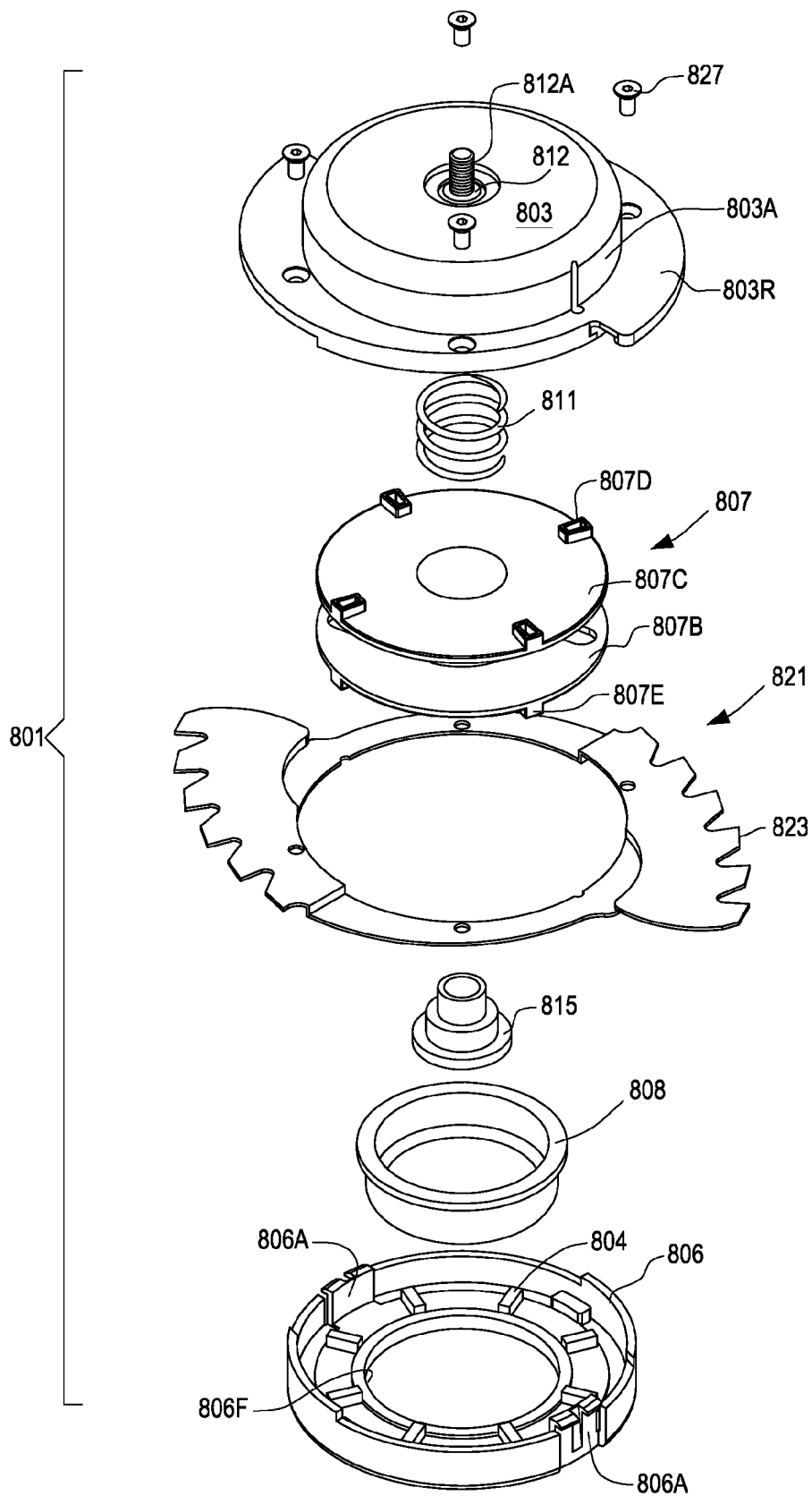

More in particular, FIG. 37 is an axonometric cross-section of the grass cutting head, indicated as a whole with number 801, FIG. 38 is an axial cross-section through the rotation axis A-A and FIG. 39 is a plan view according to XXXIX-XXXIX of FIG. 38. FIG. 40 is an exploded axonometric view of the head 801.

The head 801 comprises a housing 803, for example dome-shaped, with a side wall 803A and an annular projection or collar 803R defining exit holes or channels 803B for the cutting line F. The annular projection or collar 803R has a pattern shaped like spiral portions, so that the two ends of the cutting line F exit from the holes 803B substantially tangentially.

In some embodiments, the housing 803 is closed at the bottom by means of a lid 806. The lid 806 may comprise elastic tabs 806A (see in particular FIGS. 38 and 40), which engage, as described below, the housing 803 to close an inner space 805, inside which a stock of cutting line F can be contained, for instance wound around a spool 807. The spool 807 can have a body 807A, a first flange 807B and a second flange 807C.

Outer teeth provided on the upper flange 807C and on the lower flange 807B are indicated with 807D and 807E respectively. The teeth 807D and 807E co-act with abutments provided in the housing 803 and in the lid 806 respectively. These latter are indicated with 804 (see FIG. 40).

The spool 807 can be inserted onto a column 809 integral with the housing 803. A compression spring 811, for example a helical spring, an be arranged between the column 809 and the body 807A of the spool 807, and can be configured to push the spool 807 downwards to abut against an insert 815 that can be fastened to the column 809 for example by means of a screw coupling.

A cutting blade 821 provided with a cutting edge 823, for example a toothed edge, is fixed to the housing 803 by means, for example, of screws or other fastening members 827. In the illustrated embodiment, the blade 821 comprises sections or segments or sectors with cutting edges 823 extending approximately like a spiral from an annular body entirely surrounding the rotation axis A-A of the grass cutting head 801. In some embodiments, the cutting line 821 can be substantially equal to the cutting blade 521 illustrated in FIG. 28.

As shown in particular in the cross-section of FIG. 38, the lid 806 can engage the housing 803 by means of the elastic tabs 806A coupling the inner annular edge of the cutting blade 821, which is in turn fixed to the housing 803. In this way, the lid 806 and the housing 803 are coupled together. A button 808 can project downwards through a hole 806F of the lid 806 and can remain engaged by the grass cutting head 801 by means of an annular projection abutting against the edge surrounding the hole 806F of the lid 806.

The compression spring 811 pushes downwards not only the spool 807 but also the button 808. To elongate the cutting line it is sufficient to press repeatedly the button 808 against the ground during rotation of the grass cutting head 801, thus causing the alternate release of the teeth 807D, 807E from the respective abutments on the housing 803 and on the lid 806, and therefore the stepped rotation of the spool 807 due to the centrifugal force.

Figure 41:
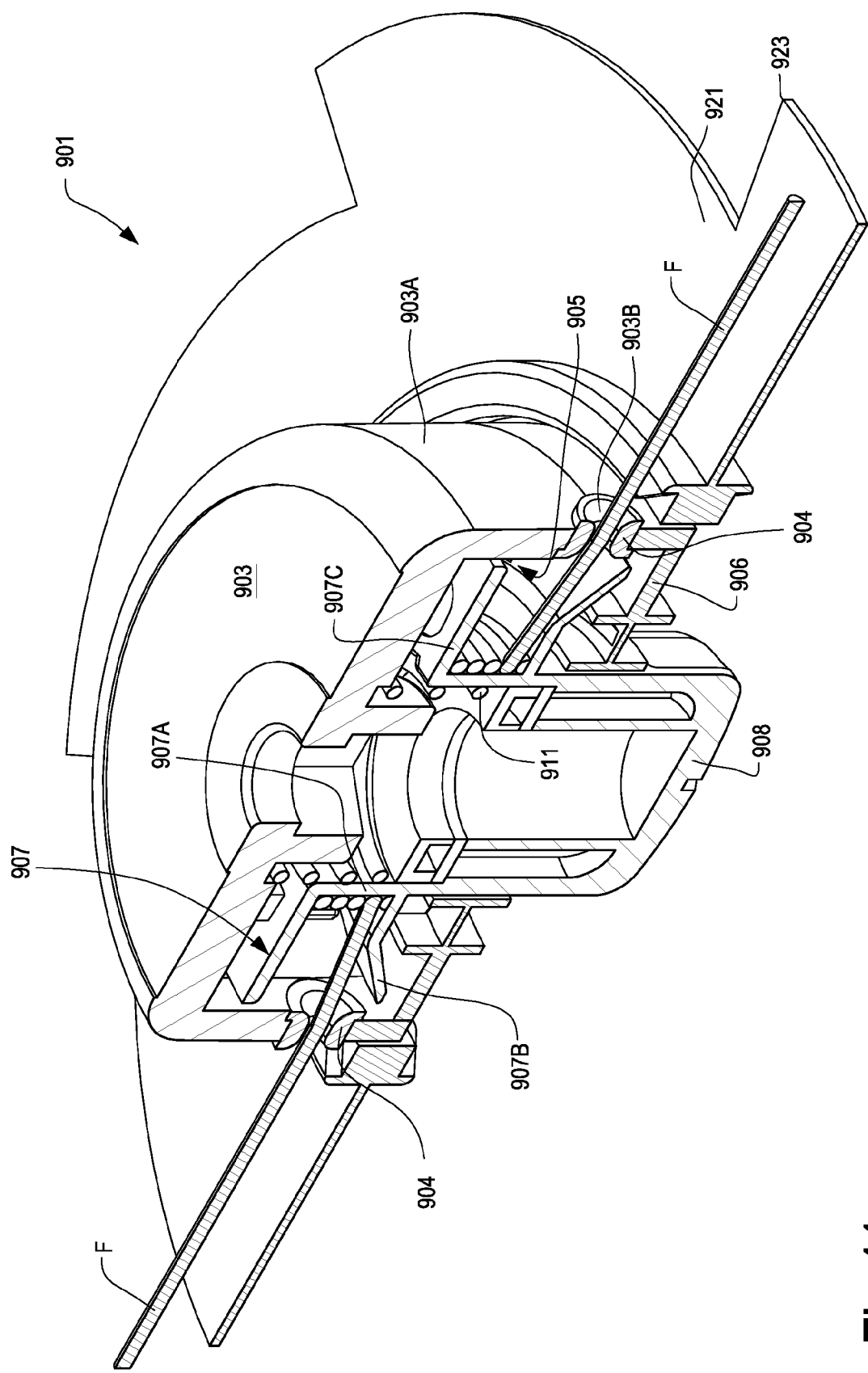
FIGS. 41-44 show a further embodiment of a grass cutting head.
Figure 42:
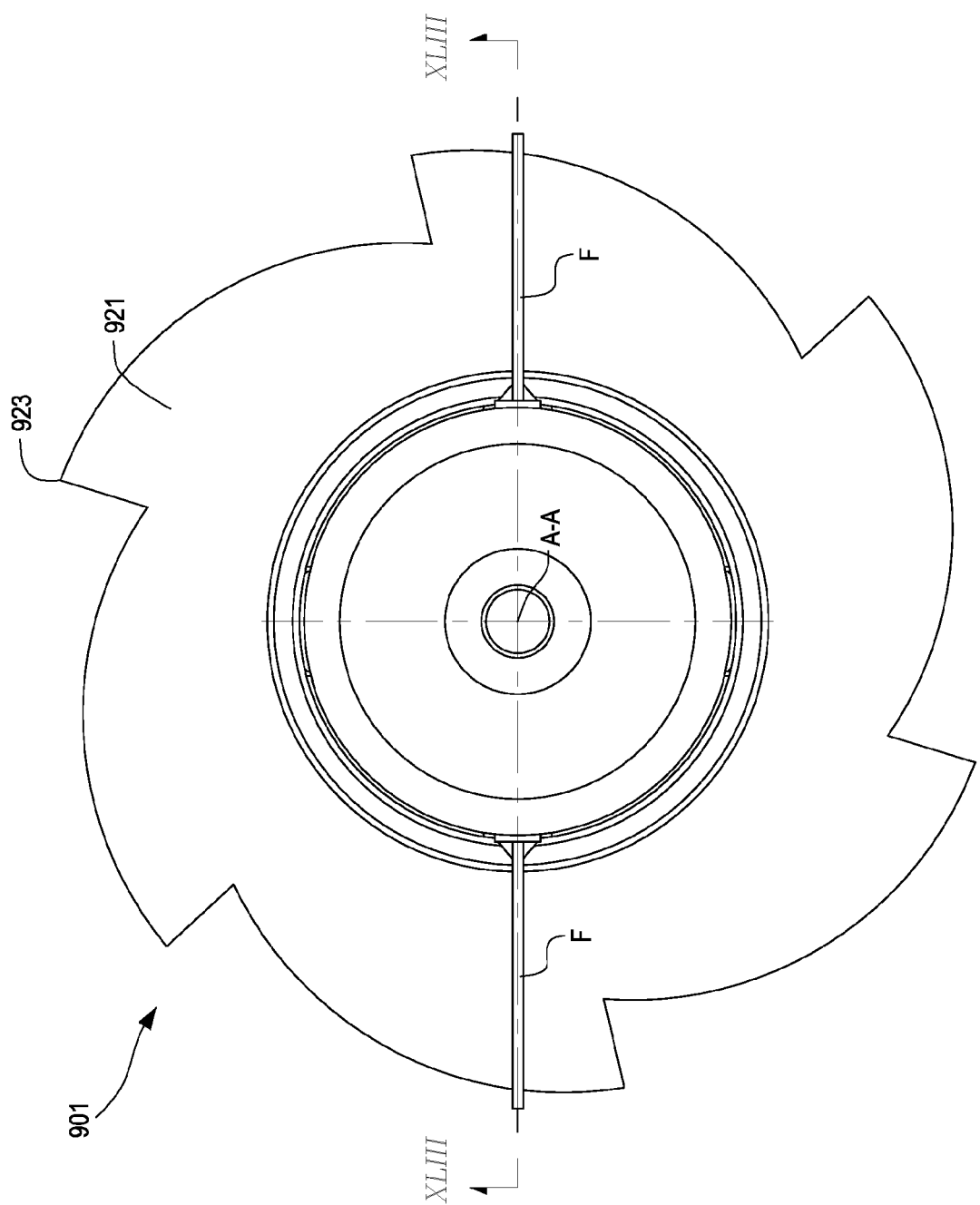
Figure 43:
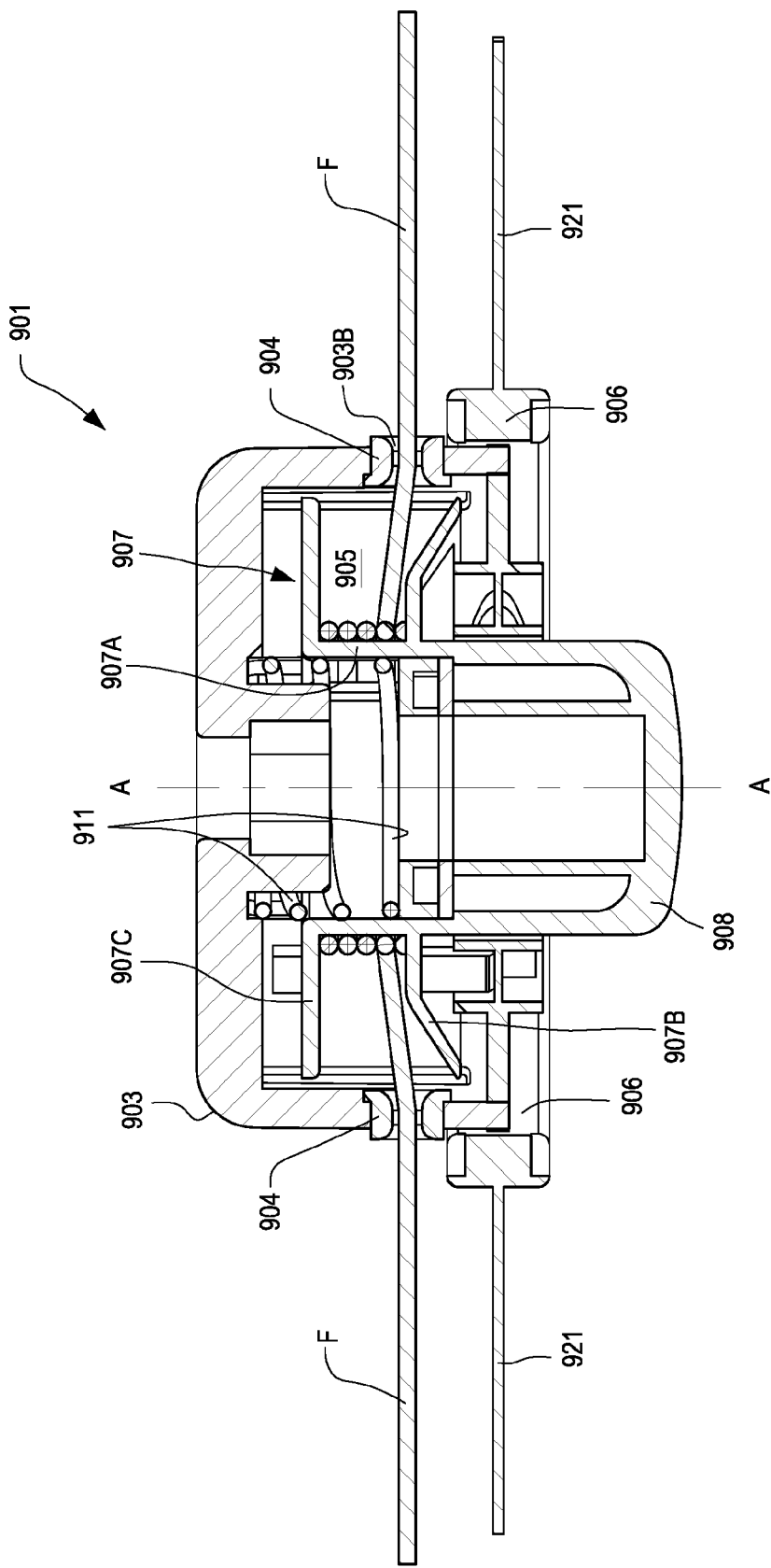
Figure 44:
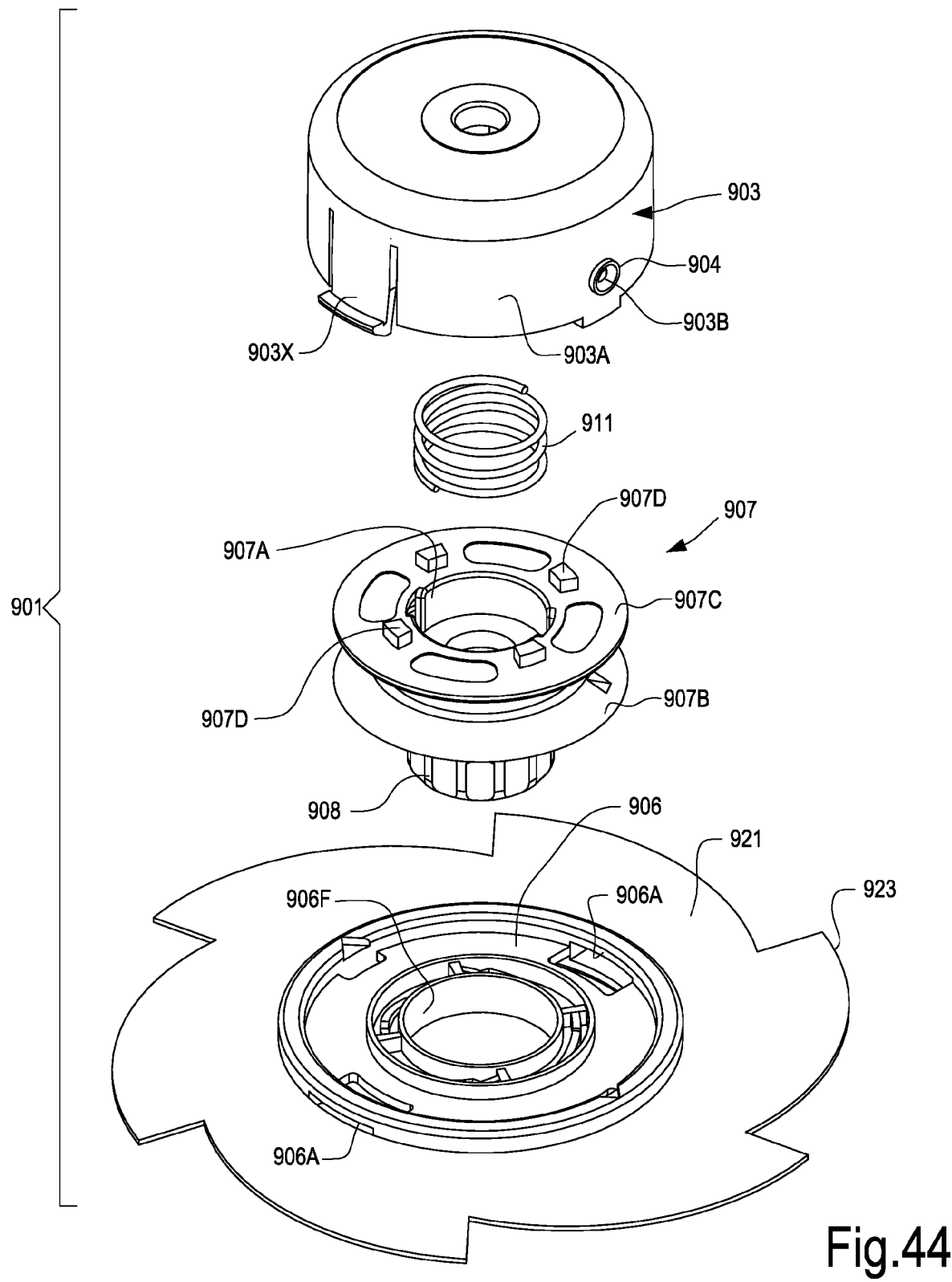

A further embodiment of a grass cutting head is shown in FIGS. 41-44. More in particular, FIG. 41 is an axonometric cross-section of the grass cutting head indicated as a whole with 901, and FIG. 42 is a plan view thereof. FIG. 43 is a cross-section according to XLIII-XLIII of FIG. 42, and FIG. 44 is an exploded axonometric view thereof.

The same or equivalent parts to those of the grass cutting head 801 illustrated in FIGS. 38-40 are indicated with the same reference numbers increased by 100.

The grass cutting head 901 comprises a housing 903 with an approximately cylindrical side wall 903A. Along this wall, holes 903B are provided for the exit of the ends of the cutting line F. In this embodiment, the holes 903B are radial and formed in bushings 904 mounted on the side wall 903A of the housing 903.

A space 905 for a stock of cutting line F is defined inside the housing 903. The cutting line can be wound around a spool 907 that can be housed in the housing 901. The spool 907 can comprise a central body 907A, a first flange 907B and, if necessary, a second flange 907C.

The flanges 907A and 907B can be provided with outer teeth, wherein 907D indicates the teeth provided on the upper flange 907C (FIG. 44).

In some embodiments, the spool 907 can be manufactured as a single piece with a knob 908 that projects at the bottom with respect to the housing 903 of the grass cutting head 901.

A compression spring 911 can push the spool 907 downwards with respect to the housing 903. The housing 903 can be closed, at the bottom, by a lid 906. In the illustrated embodiment, the lid 906 is manufactured as a single piece with a cutting blade 921 that can be provided with a cutting edge 923. The lid 906 can comprise a hole 906F, through which the button 908 projects downwards.

In the illustrated embodiment (see in particular FIGS. 41 and 43), the lid 906 and the cutting blade 921 are manufactured as a single piece made of the same material. For example, the may be made of metal, such as a light alloy, or steel.

In other embodiments, the lid 906 and the cutting blade 921 can be integral with each other, even if made of different materials. For example, the cutting blade 921 may be made of a metal, ferrous or non-ferrous, for instance a light alloy, steel or the like, whilst the lid 906 may be made of synthetic material, for example plastic, composite material, filled synthetic resin or other material. In some embodiments, the assembly of lid 906 and blade 921 may be co-molded, for instance inserting the cutting blade 921 inside a mold and then injecting therein a fluid synthetic resin that, cooling and polymerizing, forms the lid 906. In this way the two components 906 and 921 are coupled stably.

However, the mechanical coupling between the housing 903 and the assembly formed by the cutting blade 921 and the lid 906 may be produced in any suitable manner. In the illustrated embodiment, the coupling is provided by means of elastic tabs 903X, which are formed in a single piece with the housing 903 and can engage corresponding slots 906A of the lid 906.

In this embodiment, the cutting line is elongated in a way similar to that described above with reference to other embodiments, by pressing repeatedly the button 908 against the ground and thus causing the alternate axial movement of the spool 907 inside the housing 903.

Figure 45:
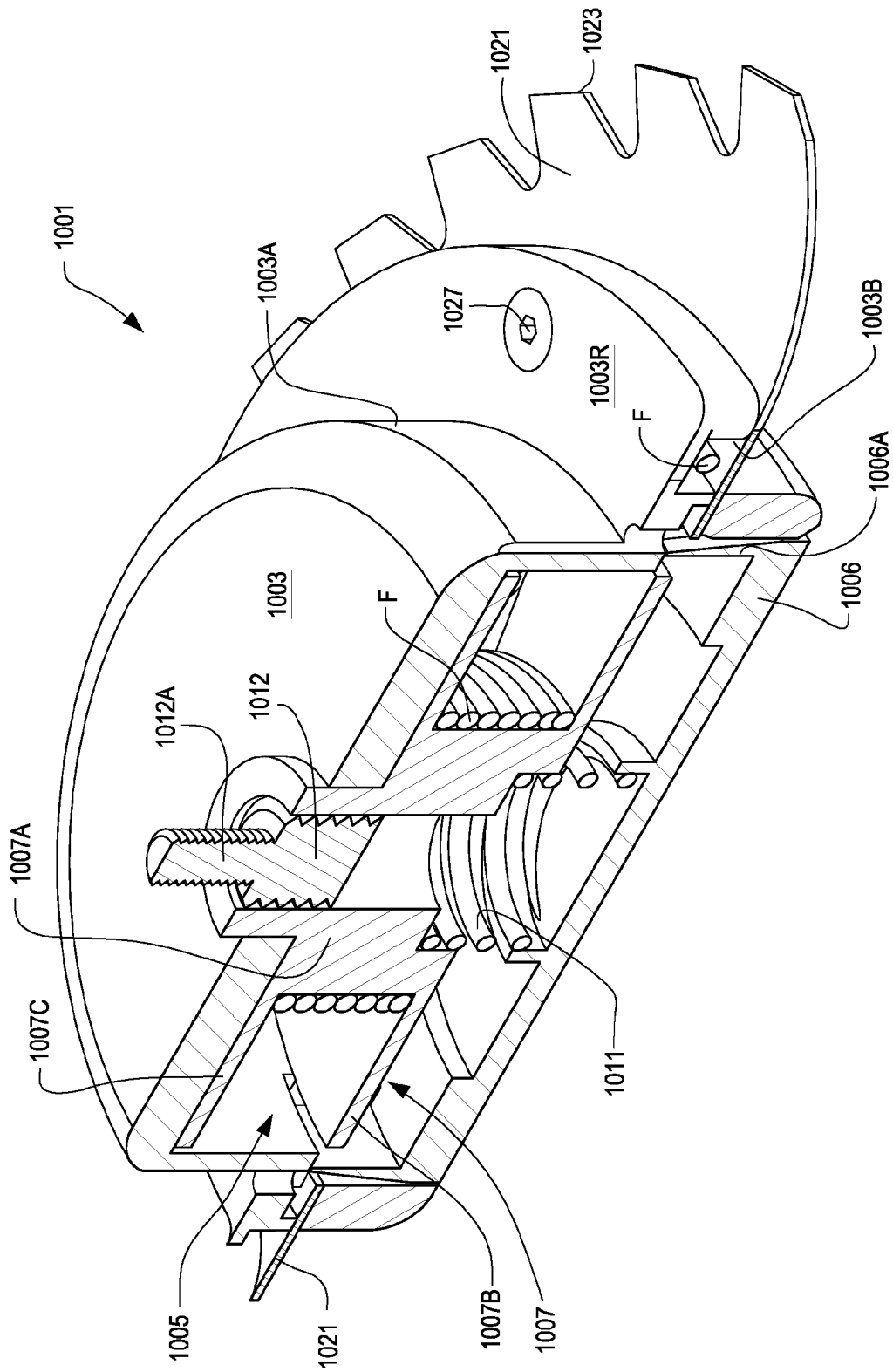
FIGS. 45-48 show a further embodiment of a grass cutting head.
Figure 46:
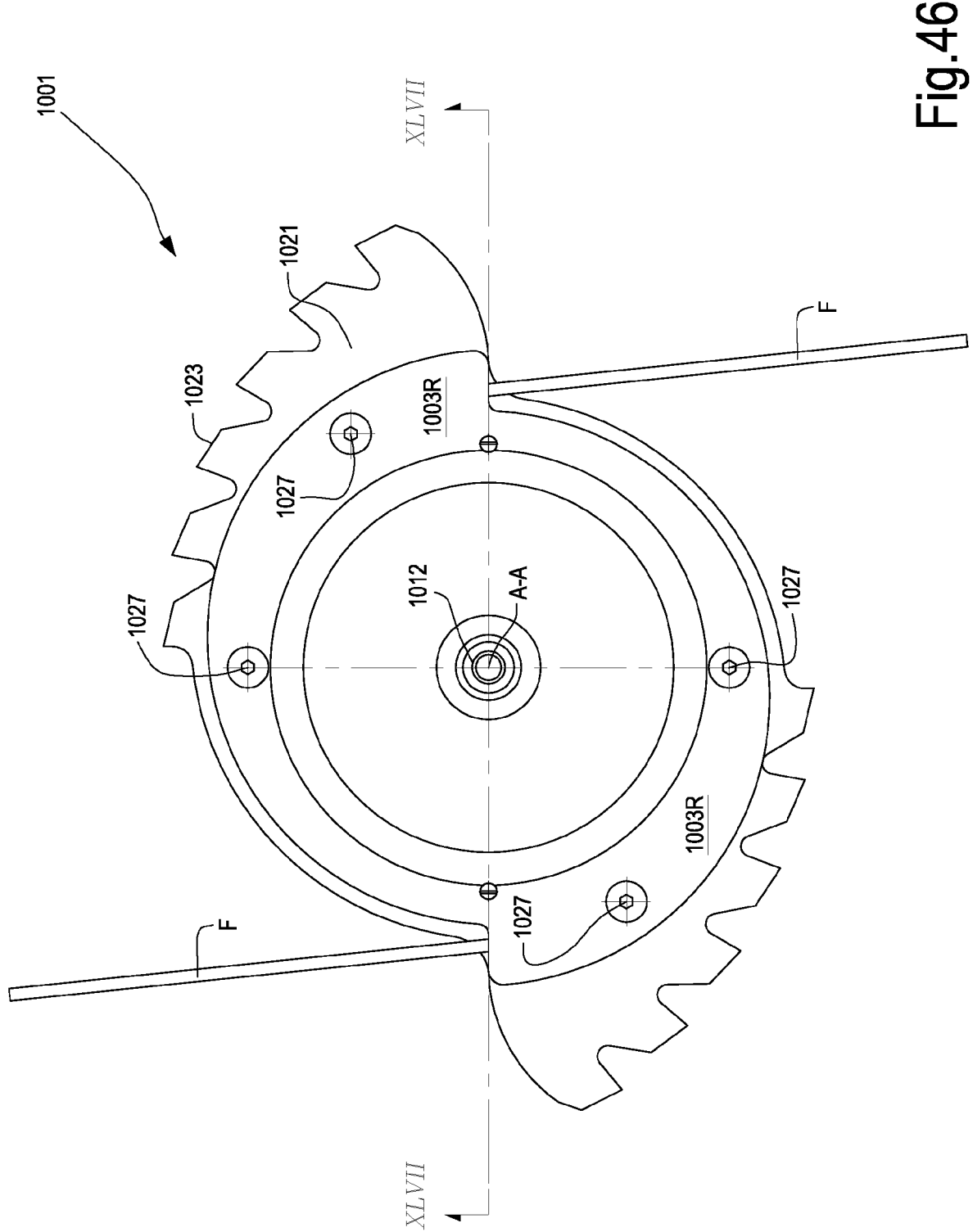
Figure 47:
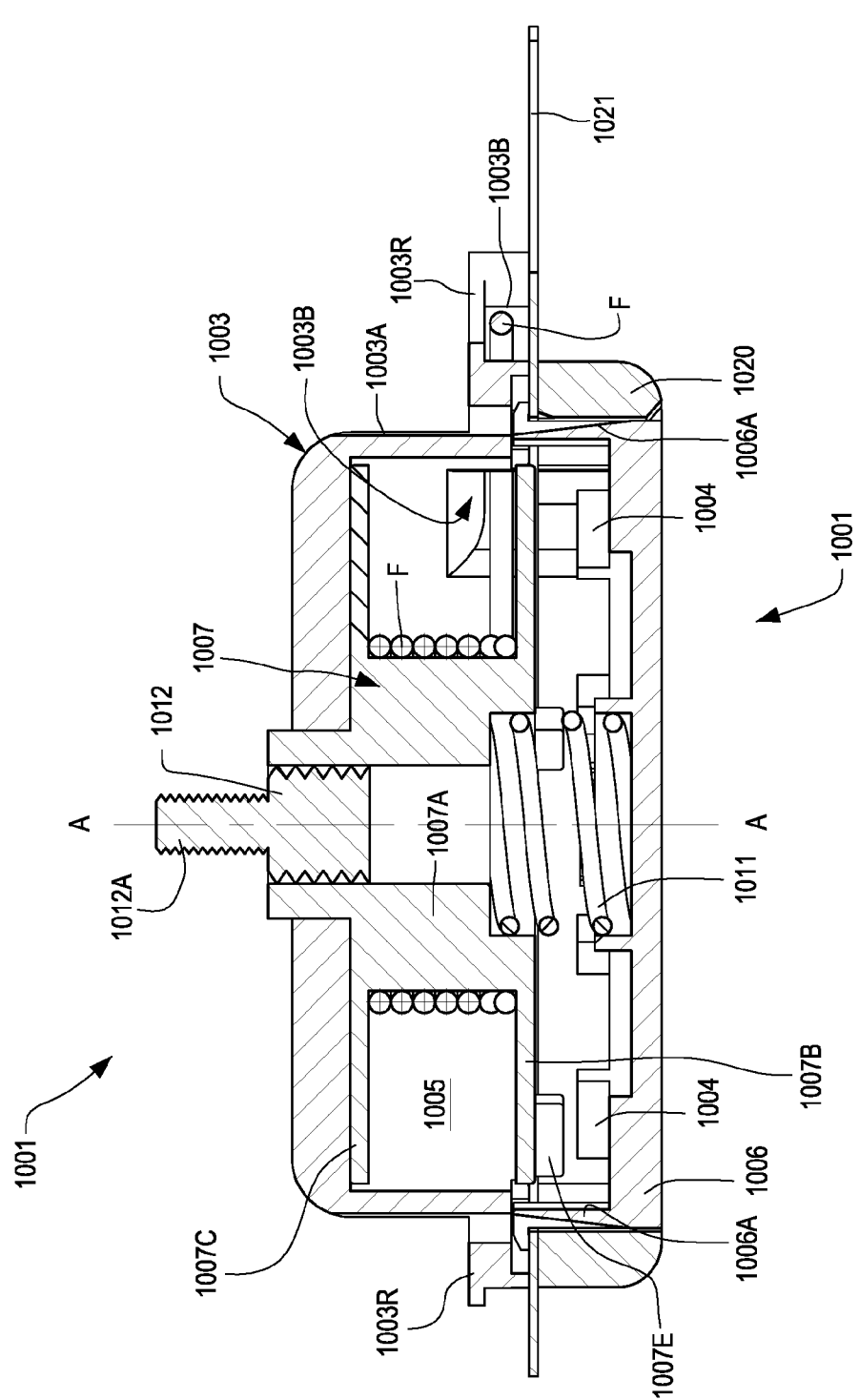
Figure 48:
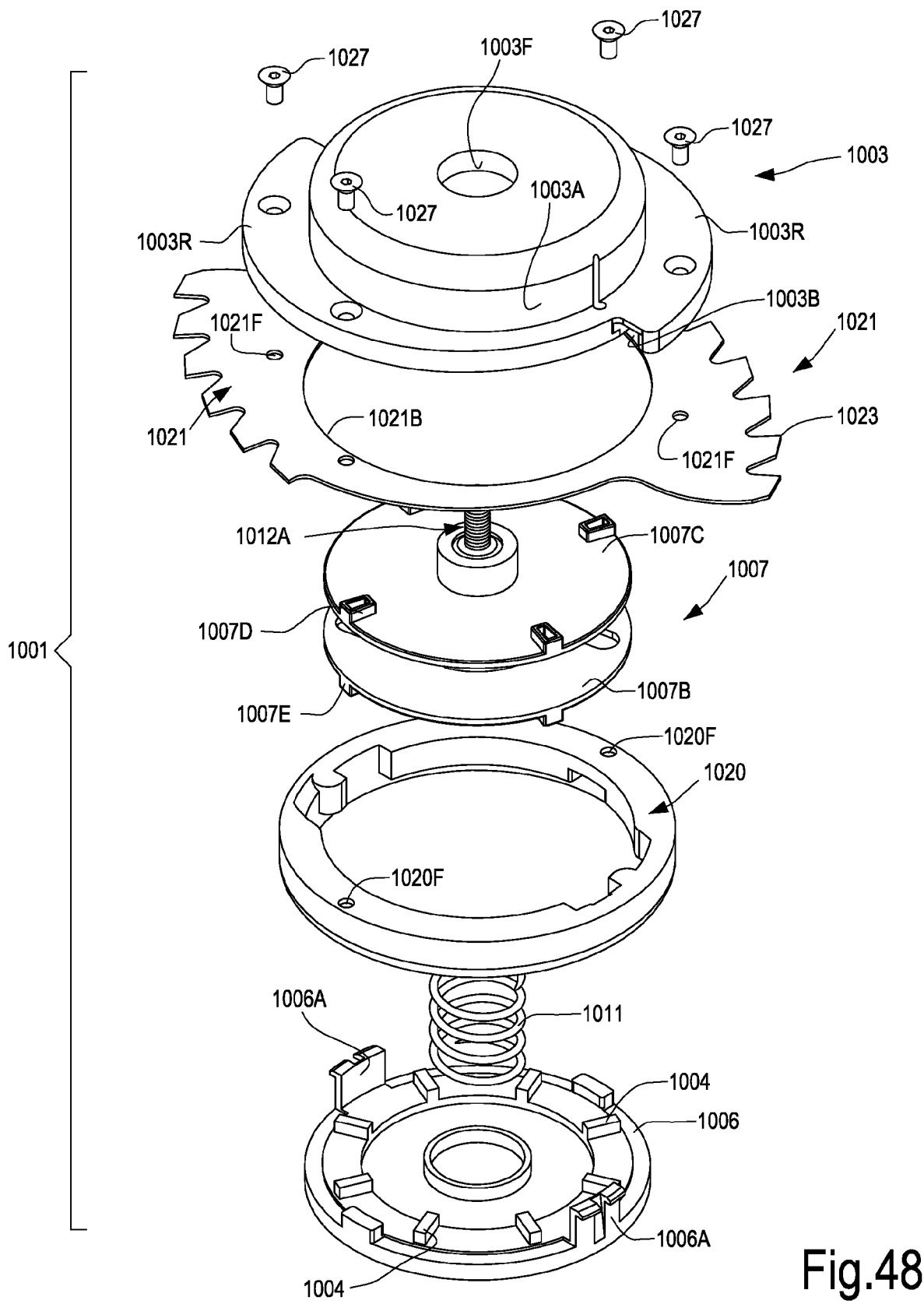

A further embodiment of a grass cutting head is shown in FIGS. 45-48. FIG. 45 is an axonometric cross-section of the grass cutting head, indicated as a whole with number 1001, and FIG. 46 is a plan view thereof. FIG. 47 is a cross-section according to XLVII-XLVII of FIG. 46, and FIG. 48 is an exploded axonometric view of the grass cutting head 1001.

The same numbers, increased by 100, indicate parts identical or equivalent to those of the embodiment of FIGS. 41-44.

The grass cutting head 1001 comprises a housing 1003, for instance dome-shaped, which can have a side wall 1003A with a side collar or projection 1003R. In the illustrated embodiment, the annular collar or projection 1003R has a pattern shaped like spiral portions and forms exit channels or holes 1003B for the cutting line F housed inside an inner space 1005 defined in the housing 1003. Therefore, in this embodiments the cutting line exits approximately tangentially.

A spool 1007, having a central body 1007A, a first flange 1007B and a second flange 107C, can be arranged inside the housing 1003. The cutting line F can be wound between the flanges 1007B, 1007C.

In some embodiments, teeth 1007D, 1007E are provided on the outer faces of the two flanges 1007C, 1007B, the teeth co-acting with corresponding abutments in the housing 1003 and in a lid 1006 closing the housing 1003. The drawing shows only the abutments 1004, associated with the lid 1006, with which the lower teeth 1007E of the spool 1007 co-act.

In some embodiments, a compression spring 1011, for instance a helical spring, is arranged between the spool 1007 and the lower lid 1006.

In some embodiments, the central body 1007A of the spool 1007 projects at the top through a hole 1003F provided in the housing 1003. A shaft 1012 can be torsionally and axially coupled to the body 1007A of the spool 1007, in order to transmit motion from a drive shaft of a brush cutter, or other machine, to the grass cutting head 1001. The reference number 1012A indicates a threaded coupling portion. In other embodiments a different mechanical coupling may be provided, for instance a bayonet coupling.

The housing 1003 can be completed by a ring 1020 arranged between the same housing 1003 and the lid 1006. A cutting blade 1021 with cutting edges 1023, for example subdivided into sectors, as shown in FIG. 48, is arranged between the housing 1003 (and more precisely the projection or collar 1003R) and the ring 1020. The cutting blade 1021 extends annularly, surrounding the rotation axis A-A of the grass cutting head 1001. The cutting blade 1021 has an inner round edge 1021B extending around the rotation axis A-A of the grass cutting head 1001.

In some embodiments, the cutting blade 1021 is fastened to the housing 1003 by means of screws 1027 or other fastening members, such as rivets or the like.

When mounted, as shown in particular in the cross-section of FIG. 47, the lid 1006 can be coupled to the housing 1003 above, engaging the elastic appendices 1006A with the inner round edge 1021B of the cutting blade 1021.

The ring 1020 can be fastened to the collar or projection 1003R of the housing 1003 by means of the screws 1027, or by means of rivets or other fastening means suitable to hold the cutting blade 1021. To this end, the cutting blade 1021 has through holes 1021F, through which the screws 1027 pass to engage corresponding threaded holes 1020F, shown in particular in FIG. 48, provided in the ring 1020.

In this embodiment again, the outer portions of cutting line F can be elongated by pressing the head 1001 against the ground during use, whilst the head rotates around its rotation axis A-A. As the spool 1007 is directly fixed to the drive shaft through the body 1007A and the insert 1012, pressing of the grass cutting head 1001 against the ground causes the compression of the spring 1011 and therefore the sliding downwards of the spool 1007 inside the housing 1003. The repeated pressing of the grass cutting head 1001 against the ground causes therefore an alternate movement of the spool, with reciprocal release and engagement between the teeth 1007D, 1007E and the respective abutments, adequately offset, provided on the housing 1003 and on the lid 1006, what causes, in a known manner, the elongation of the cutting line.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A line-type grass cutting head configured for rotation around a rotation axis, the line-type grass cutting head comprising:
    a housing comprising an upper portion and a lower removable cover, wherein the upper portion forms an inner space for a spool for winding a stock of cutting line;
    at least one hole in a side wall of the upper portion, through which the cutting line passes from the inner space towards an outside of the housing;
    a cutting line elongation mechanism, associated with the spool and projecting through the lower removable cover; and
    at least one cutting blade with at least one cutting edge rigidly fastened to the upper portion of the housing of the grass cutting head and coaxial therewith, for rigidly rotating with the cutting head, the cutting blade having an annular extension entirely surrounding the rotation axis of the grass cutting head, the spool being arranged coaxially with the cutting blade, the cutting blade having a central passage through which extends said spool, or a button of the cutting line elongation mechanism, that projects downwardly from the housing, the at least one hole being arranged adjacent to the cutting blade, the at least one cutting blade being disc-shaped, the at least one cutting blade having recesses to guide the cutting line.

2. A grass cutting head according to claim 1, wherein the at least one cutting blade has an annular body, the annular body of the at least one cutting blade being rigidly applied to the housing.

3. A grass cutting head according to claim 2, wherein the at least one cutting blade comprises cutting sectors arranged along a circumference of the annular body.

4. A grass cutting head according to claim 2, wherein the at least one cutting blade has a round cutting edge that extends around the rotation axis of the grass cutting head.

5. A grass cutting head according to claim 1, further comprising:
    another cutting blade, each cutting blade comprising a body and a cutting edge.

6. A grass cutting head according to claim 5, wherein the at least two cutting blades are substantially coplanar and angularly spaced from each other around the rotation axis of the grass cutting head.

7. A grass cutting head according to claim 1, further comprising:
    screws for fastening the at least one cutting blade to the housing, the at least one cutting blade having through holes for the screws.

8. A grass cutting head according to claim 1, wherein a ring is coupled to the housing, the at least one cutting blade being engaged between the housing and the ring.

9. A grass cutting head according to claim 8, wherein the housing is dome-shaped.

10. A grass cutting head according to claim 8, wherein the ring partially surrounds the inner space inside which the spool is housed.

11. A grass cutting head according to claim 8, wherein the ring and the housing are joined together by screws passing through holes provided in the at least one cutting blade, whereby the at least one cutting blade is joined to the housing of the grass cutting head.

12. A grass cutting head according to claim 8, wherein the ring is joined to an annular projection of the housing by screws passing through the at least one cutting blade.

13. A grass cutting head according to claim 1, wherein the housing comprises an annular projection, the at least one cutting blade being fastened to the housing at said annular projection.

14. A grass cutting head according to claim 1, further comprising:
    another cutting blade, the another cutting blade being substantially parallel to the at least one cutting blade, the another cutting blade being arranged substantially above the at least one cutting blade, the at least one cutting blade and the another cutting blade being spaced from each other along the rotation axis of the grass cutting head.

15. A grass cutting head according to claim 14, wherein the at least one hole for passage of the cutting line is arranged between the at least one cutting blade and the another cutting blade, so that the cutting line extends between the at least one cutting blade and the another cutting blade.

16. A grass cutting head according to claim 15, wherein at least one chip breaker is arranged between the at least one cutting blade and the another cutting blade.

17. A grass cutting head according to claim 1, wherein the at least one cutting edge is toothed.

18. A grass cutting head according to claim 1, wherein the cutting line elongation mechanism comprises an elastic member co-acting with the spool.

19. A line-type grass cutting head configured for rotation around a rotation axis, the line-type grass cutting head comprising:
    a housing comprising an upper portion and a lower detachable cover, the upper portion being configured to be connected to a rotary shaft of a trimmer, at least the upper portion defining an inner space for a spool for winding a stock of cutting line, the upper portion comprising a side wall, the side wall comprising at least one hole, wherein at least a portion of the cutting line extends from the inner space through the at least one hole to a position located outside of the housing;
    a cutting line elongation mechanism associated with the spool, at least a portion of the cutting line elongation mechanism extending through the lower detachable cover; and
    a cutting blade with at least one cutting edge rigidly connected to the upper portion of the housing, the cutting blade being rotatable with the housing about a rotation axis, the cutting blade having an annular extension, the annular extension extending about an entire circumference of the housing, at least a portion of the annular extension extending from a position located radially adjacent to the upper portion of the housing to a position located at a radially spaced location from the housing, at least a portion of the cutting blade being located adjacent to at least a portion of the cutting line located outside of the housing, wherein the annular extension is located adjacent to the upper portion of the housing, the spool being arranged coaxially with the cutting blade, the cutting blade having a central passage, wherein the spool extends through the central passage and a button of the cutting line elongation mechanism projects downwardly from the housing.

20. A grass cutting head according to claim 19, wherein the cutting blade has recesses to guide the cutting line.

\* \* \* \* \*